US012644497B2

(12) United States Patent
Kurihara

(10) Patent No.: US 12,644,497 B2
(45) Date of Patent: Jun. 2, 2026

(54) SHOCK ABSORBER

(71) Applicant: Hitachi Astemo, Ltd., Ibaraki (JP)

(72) Inventor: Yuki Kurihara, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 582 days.

(21) Appl. No.: 18/012,684

(22) PCT Filed: Jun. 10, 2021

(86) PCT No.: PCT/JP2021/022159
§ 371 (c)(1),
(2) Date: Dec. 23, 2022

(87) PCT Pub. No.: WO2022/004328
PCT Pub. Date: Jan. 6, 2022

(65) Prior Publication Data
US 2023/0304559 A1     Sep. 28, 2023

(30) Foreign Application Priority Data

Jun. 29, 2020    (JP) ................................. 2020-111148

(51) Int. Cl.
*F16F 7/09*         (2006.01)
*B60G 13/04*        (2006.01)
(Continued)

(52) U.S. Cl.
CPC ................ *F16F 7/09* (2013.01); *B60G 13/04* (2013.01); *B60G 13/08* (2013.01); *F16F 9/19* (2013.01);
(Continued)

(58) Field of Classification Search
CPC ........ F16F 7/09; F16F 9/19; F16F 9/36; F16F 2222/04; F16F 2222/12; F16F 2230/30;
(Continued)

(56) References Cited

U.S. PATENT DOCUMENTS 9,360,078 B2 *   6/2016   Yamashita ................ F16F 9/18
11,988,265 B2 *  5/2024   Nakagawa ................ F16F 9/19
(Continued)

FOREIGN PATENT DOCUMENTS

JP         2007-92926 A    4/2007
JP         4546860 B2      9/2010
(Continued)

OTHER PUBLICATIONS

International Search Report received in corresponding International Application No. PCT/JP2021/022159 dated Aug. 3, 2021.
(Continued)

*Primary Examiner* — Christopher P Schwartz
(74) *Attorney, Agent, or Firm* — MATTINGLY & MALUR, PC

(57) ABSTRACT

A shock absorber includes a cylinder and a movable piston rod inserted into the cylinder to be movable to generate a damping force and having one end which extends to the outside of the cylinder. A seal member is fixed to the cylinder to be in sliding contact with the piston rod, and a friction member generates a frictional force with respect to relative movement between the cylinder and the piston rod. The friction member includes first and second friction parts, respectively fixed to one of the cylinder and the piston rod to be in sliding contact with the other of the cylinder and the piston rod. The second friction part is configured to start to slide with respect to relative movement of the cylinder and the piston rod at a timing different from that of the first friction part and generate an adjustable frictional force.

6 Claims, 21 Drawing Sheets

(51) Int. Cl.
    *B60G 13/08*         (2006.01)
    *F16F 9/19*          (2006.01)
    *F16F 9/36*          (2006.01)

(52) U.S. Cl.
    CPC ............ *F16F 9/36* (2013.01); *B60G 2202/23* (2013.01); *B60G 2202/24* (2013.01); *B60G 2204/128* (2013.01); *B60G 2204/129* (2013.01); *B60G 2206/41* (2013.01); *B60G 2800/162* (2013.01); *F16F 2222/04* (2013.01); *F16F 2222/12* (2013.01); *F16F 2230/30* (2013.01); *F16F 2232/08* (2013.01); *F16F 2234/02* (2013.01)

(58) Field of Classification Search
    CPC .... B60G 13/04; B60G 13/08; B60G 2202/23; B60G 2202/24; B60G 2204/128; B60G 2204/129; B60G 2206/41; B60G 2800/162
    USPC .......................... 188/322.13–322.22; 277/550
    See application file for complete search history.

(56) References Cited

U.S. PATENT DOCUMENTS

| | | | |
|---|---|---|---|
| 2001/0023638 A1 | 9/2001 | Yamaguchi et al. | |
| 2011/0140369 A1* | 6/2011 | Lenhert ............... | F16J 15/3252 277/589 |

| | | | |
|---|---|---|---|
| 2014/0097572 A1* | 4/2014 | Hatch .................. | F16J 15/3252 277/353 |
| 2014/0216872 A1* | 8/2014 | Kani ..................... | F16J 15/3232 277/550 |
| 2015/0008647 A1* | 1/2015 | Bresso ................. | F16J 15/3232 277/565 |
| 2015/0204412 A1 | 7/2015 | Yamashita et al. | |
| 2016/0018002 A1* | 1/2016 | Lenhert ............... | F16J 15/3236 277/540 |
| 2021/0348668 A1 | 11/2021 | Nakagawa et al. | |

FOREIGN PATENT DOCUMENTS

| | | |
|---|---|---|
| JP | 5810220 B2 | 11/2015 |
| WO | 2020/095806 A1 | 5/2020 |

OTHER PUBLICATIONS

Written Opinion received in corresponding International Application No. PCT/JP2021/022159 dated Aug. 3, 2021.
Japanese Office Action received in corresponding Japanese Application No. 2022-533798 dated Jul. 4, 2023.

\* cited by examiner

SHOCK ABSORBER

TECHNICAL FIELD

The present invention relates to a shock absorber.

Priority is claimed on Japanese Patent Application No. 2020-111148 filed on Jun. 29, 2020, the content of which is incorporated herein by reference.

BACKGROUND ART

There are shock absorbers including a friction member that generates frictional resistance with respect to a moving piston rod in addition to a seal member that prevents leakage of a working liquid (see, for example, Patent Document 1 and 2).

CITATION LIST

Patent Document

[Patent Document 1]
  Japanese Patent No. 4546860
[Patent Document 2]
  Japanese Patent No. 5810220

SUMMARY OF INVENTION

Technical Problem

In shock absorbers, it is desired to change an acting force of a friction member smoothly.

Therefore, an objective of the present invention is to provide a shock absorber capable of changing an acting force of a friction member smoothly.

Solution to Problem

In order to achieve the above-described objective, a first aspect according to the present invention is configured such that a friction member includes a first friction part fixed to one of a cylinder and a piston rod to be in sliding contact with the other of the cylinder and the piston rod, and a second friction part fixed to one of the cylinder and the piston rod to be in sliding contact with the other of the cylinder and the piston rod and configured to start to slide with respect to relative movement of the cylinder and the piston rod at a timing different from that of the first friction part and generate an adjustable frictional force.

A second aspect according to the present invention is configured such that a friction member includes a first friction part formed of an elastic body and being in contact with a piston rod, and a second friction part formed of an elastic body made of the same material as the first friction part and having a portion being in contact with the piston rod that is different in shape from that of the first friction part.

A third aspect according to the present invention is configured such that a friction member includes a first friction part fixed to one of a first member and a second member to be in contact with the other of the first member and the second member, and a second friction part formed of a material different from that of the first friction part in coefficient of dynamic friction and coefficient of static friction and fixed to one of the first member and the second member to be in contact with the other of the first member and the second member.

Advantageous Effects of Invention

According to the above-described aspects of the present invention, it is possible to change an acting force of a friction member smoothly.

DESCRIPTION OF EMBODIMENTS

First Embodiment

Hereinafter, a first embodiment according to the present invention will be described with reference to FIGS. 1 to 7.

Figure 1:
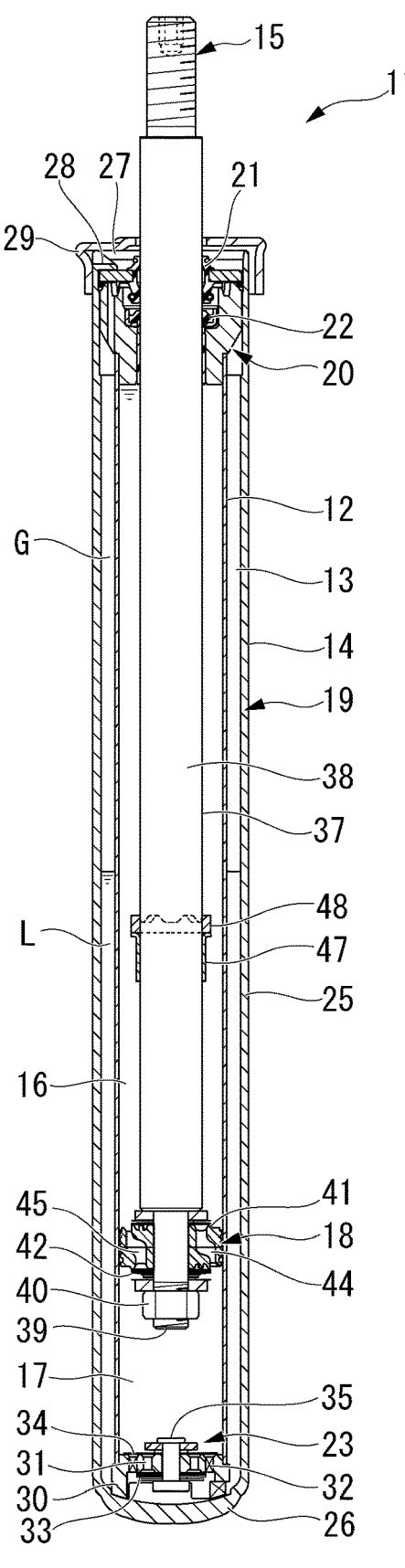
FIG. 1 is a cross-sectional view illustrating a shock absorber according to a first embodiment of the present invention.

A shock absorber 11 according to the first embodiment illustrated in FIG. 1 is a liquid-pressure shock absorber that uses a working liquid as a working fluid, and more specifically a hydraulic shock absorber that uses an oil fluid as a working liquid. The shock absorber 11 is used in, for example, suspension devices of automobiles.

The shock absorber 11 includes an inner tube 12, an outer tube 14 having a larger diameter than the inner tube 12 and coaxially disposed with the inner tube 12 to form a reservoir chamber 13 therebetween, a piston rod 15 disposed on a central axis of the inner tube 12 and having one side in an axial direction inserted into the inner tube 12 and the other side in the axial direction extending outward from the inner tube 12 and the outer tube 14, and a piston 18 connected to one end portion of the piston rod 15 to be slidably fitted in the inner tube 12 and partitioning the inside of the inner tube 12 into two chambers 16 and 17. In other words, the piston 18 is provided inside a cylinder 19 to be movable and partitions the inside of the cylinder 19 into two chambers 16 and 17. Also, the piston rod 15 is movably inserted into the cylinder 19 to be connected to the piston 18 and has one end extending to the outside of the cylinder 19. The shock absorber 11 is of a dual tube type in which the cylinder 19 includes the inner tube 12 and the outer tube 14.

The present invention is not limited to a dual tube type and can be used for liquid-pressure shock absorbers of a single tube type, and furthermore, can also be utilized for liquid-pressure shock absorbers using a damping force adjusting mechanism, or the like.

The piston rod 15 moves integrally with the piston 18 connected to one end portion, and the other end portion extends to the outside from the cylinder 19, that is, the inner tube 12 and the outer tube 14. In the cylinder 19, an oil fluid L is sealed as a working liquid in the inner tube 12, and the oil fluid L and a high pressure gas G are sealed as a working liquid in the reservoir chamber 13 between the inner tube 12 and the outer tube 14. Further, atmospheric-pressure air may be sealed in the reservoir chamber 13 in place of the high pressure gas G. In other words, the cylinder 19 has a working fluid therein.

The shock absorber 11 includes a rod guide 20 disposed at an end portion position of the cylinder 19 on a side from which the piston rod 15 protrudes and fixed to the cylinder 19, a seal member 21 disposed on an outer side (upper side in the vertical direction in FIGS. 1 and 2) with respect to the rod guide 20 in an inward and outward direction (vertical directions in FIGS. 1 and 2, hereinafter referred to as a cylinder inward and outward direction) in the axial direction of the cylinder 19 at an end portion position of the cylinder 19 on a side from which the piston rod 15 protrudes to be fixed to the cylinder 19, a friction member 22 provided between the seal member 21 and the rod guide 20 on an inner side (lower side in the vertical direction in FIGS. 1 and 2) with respect to the seal member 21 in the cylinder inward and outward direction, and a base valve 23 disposed at an end portion of the cylinder 19 in the axial direction on a side opposite to the rod guide 20, the seal member 21, and the friction member 22.

The rod guide 20, the seal member 21, and the friction member 22 are all annular, and the piston rod 15 is inserted through the inside of them to be slidable. The rod guide 20 guides movement of the piston rod 15 with respect to the cylinder 19 by supporting the piston rod 15 to be movable in the axial direction while restricting its movement in a radial direction.

The seal member 21 is in sliding contact with an outer circumferential portion of the piston rod 15 moving in the axial direction at its inner circumferential portion to prevent the oil fluid L in the inner tube 12 and the high pressure gas G and the oil fluid L of the reservoir chamber 13 in the outer tube 14 from leaking out of the cylinder 19 to the outside. In other words, the seal member 21 prevents the oil fluid L and the gas G in the cylinder 19 from leaking out of the shock absorber 11 to the outside. The seal member 21 is fixed to the cylinder 19 to be in contact with the piston rod 15.

The friction member 22 is fitted and fixed to the rod guide 20 at its outer circumferential portion and is in sliding contact with the outer circumferential portion of the piston rod 15 at its inner circumferential portion to generate frictional resistance on the piston rod 15, and is not for the purpose of sealing. The friction member 22 generates a frictional force in relative movement of the cylinder 19 and the piston rod 15. The friction member 22 is fixed to the cylinder 19 via the rod guide 20 to come into contact with the piston rod 15. The friction member 22 is provided at a position other than the piston 18 that is in sliding contact with the cylinder 19 and is different from a piston band that is provided on an outer circumference of the piston 18 to be in sliding contact with the cylinder 19.

The outer tube 14 of the cylinder 19 has a substantially bottomed cylindrical shape including a cylindrical barrel part 25 and a bottom part 26 that closes one end side of the barrel part 25 opposite to a protruding side of the piston rod 15. The barrel part 25 includes a locking part 28 that protrudes radially inward from a position of an opening 27 on a side from which the piston rod 15 protrudes. A cover 29 is attached to the opening 27 side of the outer tube 14 to cover the locking part 28 and the seal member 21. Further, in the present embodiment, a configuration in which the cover 29 is attached is illustrated and described, but the cover 29 may be omitted.

The inner tube 12 of the cylinder 19 has a cylindrical shape, in which one end side in the axial direction is supported in a fitted state by a base body 30 of the base valve 23 disposed on an inner side of the bottom part 26 of the outer tube 14, and the other end side in the axial direction is supported in a fitted state by the rod guide 20 fitted into the opening 27 of the outer tube 14.

Fluid passages 31 and 32 that allow communication between the chamber 17 in the inner tube 12 and the reservoir chamber 13 between the outer tube 14 and the inner tube 12 are formed in the base body 30 of the base valve 23. Also, a disc valve 33 as a compression side damping valve capable of opening and closing the fluid passage 31 on an inner side of the base body 30 in the radial direction is disposed in the base body 30 on the bottom part 26 side in the axial direction. Also, a disc valve 34 as a check valve capable of opening and closing the fluid passage 32 on an outer side of the base body 30 in the radial direction is disposed in the base body 30 on a side opposite to the bottom part 26 in the axial direction. These disc valves 33 and 34 are attached to the base body 30 with a rivet 35 that is inserted through the base body 30. Further, in the present embodiment, the disc valves 33 and 34 are configured to be attached to the base body 30 with the rivet 35 that is inserted through the base body 30, but may be attached to the base body 30 with a bolt inserted through the base body 30 and a nut.

The disc valve 33 allows a flow of the oil fluid L from the chamber 17 to the reservoir chamber 13 side through a passage hole (not illustrated) of the disc valve 34 and the fluid passage 31 to generate a damping force, while restricting a flow of the oil fluid L in a direction opposite thereto. In contrast, the disc valve 34 allows a flow of the oil fluid L from the reservoir chamber 13 to the chamber 17 side through the fluid passage 32 without resistance, while restricting a flow of the oil fluid L in a direction opposite thereto. That is, the disc valve 33 opens the fluid passage 31 when the piston rod 15 moves to a compression side which increases an amount of entry into the cylinder 19 to move the piston 18 to the chamber 17 side and cause a pressure in the chamber 17 to rise above a pressure in the reservoir chamber 13 by a predetermined value or more, and serves as a damping valve that generates a damping force at that time. Also, the disc valve 34 opens the fluid passage 32 when the piston rod 15 moves to an extension side which increases an amount of protrusion from the cylinder 19 to move the piston 18 to the chamber 16 side and cause a pressure in the chamber 17 to fall below a pressure in the reservoir chamber 13, but serves as a suction valve that allows the oil fluid L to flow from the reservoir chamber 13 to the chamber 17 at that time substantially without generating a damping force.

Further, a damping force on the extension side may be actively generated using the disc valve 34 as a check valve. Alternatively, orifices may be employed instead of these disc valves 33 and 34.

The piston rod 15 includes a main shaft part 38 having an outer circumferential surface 37 formed of a cylindrical surface with a constant diameter, and an inner end shaft part 39 having a diameter smaller than that of the main shaft part 38 at an end portion of the piston rod 15 on a side being inserted into the inner tube 12. A nut 40 is screwed onto the inner end shaft part 39, and the piston 18 and disc valves 41 and 42 on both sides of the piston 18 are attached to the inner end shaft part 39 by the nut 40.

The chamber 16 is formed between the piston 18 and the rod guide 20 and is a rod-side chamber through which the piston rod 15 passes. The chamber 17 is formed between the piston 18 and the base valve 23 and is a bottom-side chamber on the bottom part 26 side of the cylinder 19. The piston rod 15 does not pass through the inside of the chamber 17.

A stopper member 47 and a buffer 48, both of which are annular, are provided on the piston rod 15 at a portion of the main shaft part 38 between the piston 18 and the rod guide 20. The stopper member 47 is fitted to the main shaft part 38 with the main shaft part 38 of the piston rod 15 inserted through an inner circumferential side thereof. The buffer 48 is disposed between the stopper member 47 and the rod guide 20 with the main shaft part 38 of the piston rod 15 inserted therein.

Fluid passages 44 and 45 that allow the chamber 17 on the bottom part 26 side and the chamber 16 on a side opposite to the bottom part 26 of the inner tube 12 to communicate with each other are formed in the piston 18. Also, the disc valve 41 serving as a compression side damping valve capable of opening and closing the fluid passage 44 is provided in the piston 18 on a side opposite to the bottom part 26. Also, the disc valve 42 serving as an extension side damping valve capable of opening and closing the fluid passage 45 is provided in the piston 18 on the bottom part 26 side. In other words, the disc valves 41 and 42, both of which are damping valves, are provided in the piston 18.

The disc valve 41 allows a flow of the oil fluid L from the chamber 17 to the chamber 16 through the fluid passage 44 while restricting a flow of the oil fluid L in a direction opposite thereto. In contrast, the disc valve 42 allows a flow of the oil fluid L from the chamber 16 side to the chamber 17 through the fluid passage 45 while restricting a flow of the oil fluid L in a direction opposite thereto. Further, a fixed orifice (not illustrated) that allows the chamber 17 and the chamber 16 to communicate with each other through the fluid passage 44 even when the disc valve 41 is closed is provided between the disc valve 41 and the piston 18. Also, a fixed orifice (not illustrated) that allows the chamber 17 and the chamber 16 to communicate with each other through the fluid passage 45 even when the disc valve 42 is closed is provided between the disc valve 42 and the piston 18.

When the piston rod 15 moves to the compression side to move the piston 18 to the chamber 17 side and cause a pressure in the chamber 17 to rise above a pressure in the chamber 16 by a predetermined value or more, in a region in which a moving speed (hereinafter referred to as a piston speed) of the piston 18 is low, a fixed orifice (not illustrated) allows the oil fluid L to flow from the chamber 17 to the chamber 16 with a constant flow path area, and thereby a damping force due to orifice characteristics is generated. Further, in a region in which the piston speed is high, the disc valve 41 is separated from the piston 18 to open the fluid passage 44 and allow the oil fluid L to flow from the chamber 17 to the chamber 16 with a flow path area according to an amount of the separation from the piston 18, and thereby a damping force due to valve characteristics is generated.

When the piston rod 15 moves to the extension side to move the piston 18 to the chamber 16 side and cause a pressure in the chamber 16 to rise above a pressure in the chamber 17 by a predetermined value or more, in a region in which the piston speed is low, a fixed orifice (not illustrated) allows the oil fluid L to flow from the chamber 16 to the chamber 17 with a constant flow area, and thereby a damping force due to orifice characteristics is generated.

Also, in a region in which the piston speed is high, the disc valve 42 is separated from the piston 18 to open the fluid passage 45 and allow the oil fluid L to flow from the chamber 16 to the chamber 17 with a flow path area according to an amount of the separation from the piston 18, and thereby a damping force due to valve characteristics is generated.

Further, when the piston rod 15 moves to the extension side to increase an amount of protrusion from the cylinder 19, the oil fluid L correspondingly flows from the reservoir chamber 13 to the chamber 17 through the fluid passage 32 while opening the disc valve 34 of the base valve 23. Conversely, when the piston rod 15 moves to the compression side to increase an amount of entry into the cylinder 19, the oil fluid L correspondingly flows from the chamber 17 to the reservoir chamber 13 through the fluid passage 31 while opening the disc valve 33.

Thereby, a damping force is generated in the shock absorber 11 when the piston rod 15 moves in the cylinder 19.

The shock absorber 11 described above is provided for each wheel of a vehicle. At this time, one side of the cylinder 19 and piston rod 15 that are relatively movable is connected to a wheel side, and the other side of the cylinder 19 and piston rod 15 is connected to a vehicle body side. Specifically, the cylinder 19 (first member) is connected to the wheel side at the outer tube 14 thereof, and the piston rod 15 (second member) is connected to the vehicle body side. Therefore, in this case, the piston rod 15 is connected to the vehicle body side to be movable relative to the cylinder 19, and a damping force is generated when the piston rod 15 moves with respect to the cylinder 19.

Conversely, the other side of the cylinder 19 and the piston rod 15 may be connected to the wheel side, and the above-described one side of the cylinder 19 and the piston rod 15 may be connected to the vehicle body side. That is, specifically, the piston rod 15 (first member) may be connected to the wheel side, and the cylinder 19 (second member) may be connected to the vehicle body side at the outer tube 14 thereof. In this case, the cylinder 19 is connected to the vehicle body side to be movable relative to the piston rod 15, and a damping force is generated when the cylinder 19 moves with respect to the piston rod 15.

Figure 2:
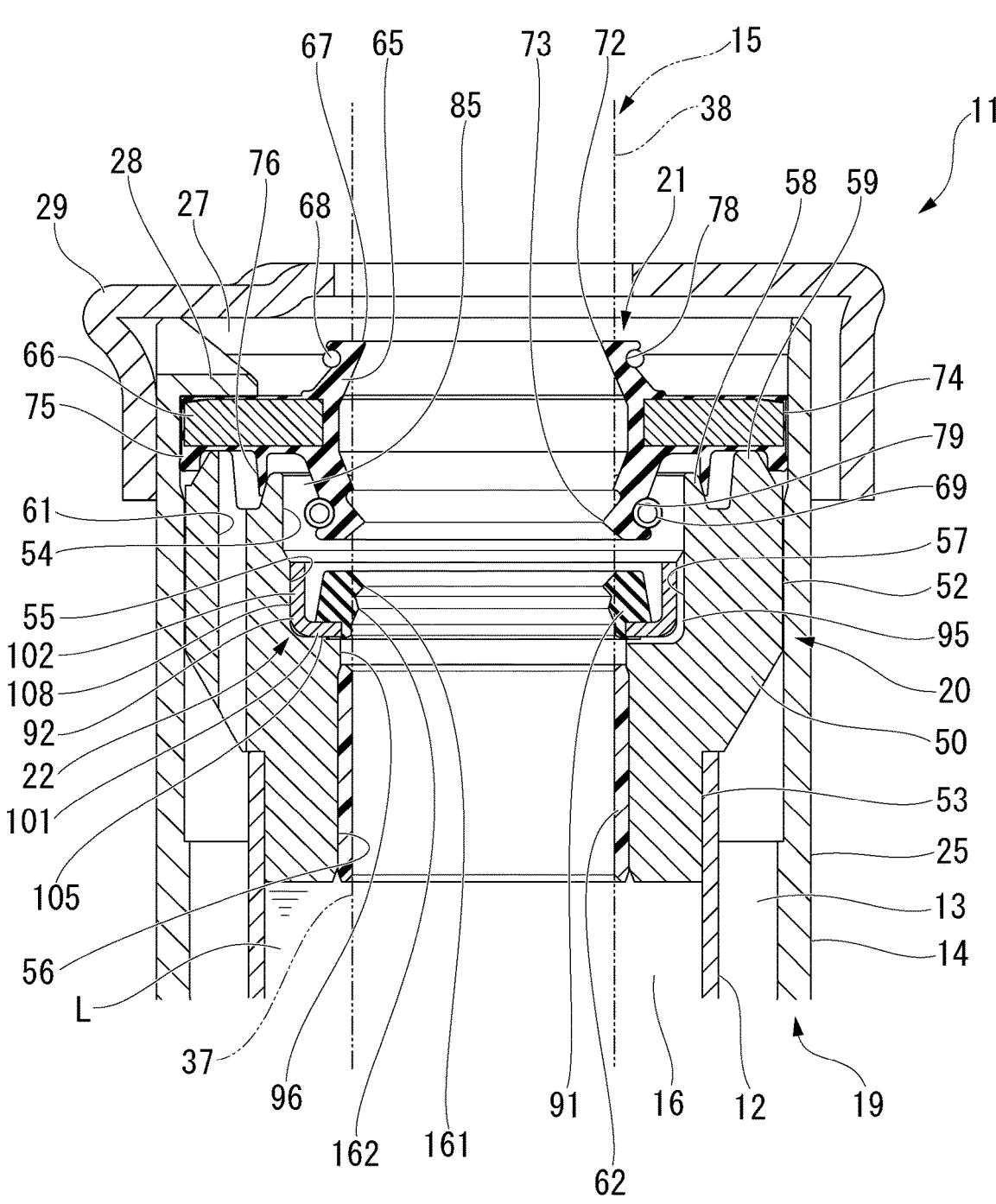
FIG. 2 is a cross-sectional view illustrating a vicinity of a rod guide of the shock absorber according to the first embodiment of the present invention.

As illustrated in FIG. 2, the rod guide 20 includes a rod guide main body 50 made of a metal having substantially a stepped cylindrical shape. The rod guide main body 50 includes a large outer diameter part 52 formed on one side in the axial direction, and a small outer diameter part 53 having a diameter smaller than that of the large outer diameter part 52 formed on the other side in the axial direction. The rod guide main body 50 is fitted to an inner circumferential portion of the barrel part 25 of the outer tube 14 at the large outer diameter part 52, and fitted to an inner circumferential portion of the inner tube 12 at the small outer diameter part 53. Thereby, the rod guide 20 is fixed to the cylinder 19.

In a center of the rod guide main body 50 in the radial direction, a large diameter hole portion 54 is formed on the large outer diameter part 52 side in the axial direction, an intermediate diameter hole portion 55 having a slightly smaller diameter than the large diameter hole portion 54 is formed on the small outer diameter part 53 side with respect to the large diameter hole portion 54 in the axial direction, and a small diameter hole portion 56 having a smaller diameter than the intermediate diameter hole portion 55 is formed on the small outer diameter part 53 side with respect to the intermediate diameter hole portion 55 in the axial direction.

The intermediate diameter hole portion 55 includes a communication groove 57 that is formed to be continuous on an inner circumferential surface and a bottom surface thereof. The communication groove 57 is formed over the entire length of the inner circumferential surface of the intermediate diameter hole portion 55 in the axial direction, and is formed over the entire length of the bottom surface of the intermediate diameter hole portion 55 in the radial direction. That is, the communication groove 57 is formed to connect an inner circumferential surface of the large diameter hole portion 54 and an inner circumferential surface of the small diameter hole portion 56.

A small diameter annular protruding part 58 and a large diameter annular protruding part 59 having a larger diameter than the small diameter annular protruding part 58 are both formed to protrude outward in the axial direction at an end portion of the rod guide main body 50 on the large outer diameter part 52 side in the axial direction. A communication hole 61 penetrating in the axial direction is formed in the rod guide main body 50 between the large diameter annular protruding part 59 and the small diameter annular protruding part 58 on the large diameter annular protruding part 59 side. The communication hole 61 communicates with the reservoir chamber 13 between the outer tube 14 and the inner tube 12.

The rod guide 20 includes the rod guide main body 50 and a cylindrical collar 62 that is fitted and fixed to an inner circumferential portion of the rod guide main body 50. The collar 62 is formed by coating an inner circumference of a cylindrical body made of a metal such as a SPCC material or a SPCE material with fluororesin-impregnated bronze. The collar 62 is fitted in the small diameter hole portion 56 of the rod guide main body 50. The piston rod 15 is inserted through the rod guide 20 to be in sliding contact with the inside of the collar 62 at the outer circumferential surface 37 of the main shaft part 38. The collar 62 is fitted and fixed in the small diameter hole portion 56 to be close to a side opposite to the intermediate diameter hole portion 55. In other words, the small diameter hole portion 56 has a portion in which the collar 62 is not present on the intermediate diameter hole portion 55 side.

The seal member 21 is disposed at one end portion of the cylinder 19 in the axial direction and is in pressure contact with the outer circumferential surface 37 of the main shaft part 38 of the piston rod 15 at the inner circumferential portion thereof to restrict the oil fluid L or the like leaking out from a gap between the rod guide 20 and the main shaft part 38 of the piston rod 15 to the outside. Further, FIG. 2 illustrates the rod guide 20 side of the shock absorber 11 with the piston rod 15 removed, and therefore the seal member 21 is in a natural state before the piston rod 15 is inserted therethrough, in other words, in a state of not coming into sliding contact with the piston rod 15. Therefore, the outer circumferential surface 37 of the main shaft part 38 of the piston rod 15 when inserted is illustrated by a virtual line (two-dot dashed line).

The seal member 21 includes an oil seal main body 67 which is an integrally formed product formed of a seal part 65 made of an elastic rubber material having good sliding ability such as nitrile rubber or fluoro-rubber and an annular member 66 having an annular shape made of a metal embedded in the seal part 65, an annular spring 68 fitted to an outer circumferential portion of the seal part 65 of the oil seal main body 67 on an outer side in the cylinder inward and outward direction, and an annular spring 69 fitted to an outer circumferential portion of the seal part 65 on an inner side in the cylinder inward and outward direction. The annular member 66 is a member for maintaining a shape of the seal part 65 and obtaining a strength for fixing the seal member 21 to the cylinder and the rod guide 20.

A portion on a radial inner side of the seal part 65 includes a dust lip 72 having an annular cylindrical shape extending in a direction away from the annular member 66 along the axial direction from the outer side in the cylinder inward and outward direction on an inner circumferential side of the annular member 66, and an oil lip 73 having an annular cylindrical shape extending in a direction away from the annular member 66 along the axial direction from an inner side in the cylinder inward and outward direction of the inner circumferential side of the annular member 66. Also, a portion on a radial outer side of the seal part 65 includes an outer circumferential seal 74 covering an outer circumferential surface of the annular member 66 at its outer end position, and an annular seal lip 75 extending inward in the cylinder inward and outward direction from the outer circumferential seal 74. Further, the seal part 65 includes a cylindrical check lip 76 protruding inward in the cylinder inward and outward direction on an inner side of a radial intermediate portion in the cylinder inward and outward direction.

The dust lip 72 as a whole has a tapered cylindrical shape in which an inner diameter thereof decreases with distance away from the annular member 66 to the outer side in the cylinder inward and outward direction, and an outer circumferential portion thereof includes an annular groove 78, into which the spring 68 described above is fitted, formed to be recessed radially inward. Further, in the present embodiment, an example using the spring 68 is illustrated, but the spring 68 may be omitted.

The oil lip 73 as a whole has a tapered cylindrical shape in which a diameter thereof decreases with distance away from the annular member 66 to the inner side in the cylinder inward and outward direction, and includes an annular groove 79 into which the spring 69 described above is fitted formed in an outer circumferential portion thereof to be recessed radially inward.

The seal member 21 is in sealing contact with an inner circumferential portion of the barrel part 25 of the outer tube 14 at the outer circumferential seal 74 in a state in which the dust lip 72 is disposed on an atmosphere side, that is, on the outer side in the cylinder inward and outward direction, and the oil lip 73 is disposed on the inner side in the cylinder inward and outward direction, and in this state, a position of the annular member 66 is sandwiched and locked between the large diameter annular protruding part 59 of the rod guide 20 and the swaged locking part 28 of the outer tube 14. At this time, the seal lip 75 of the seal member 21 is disposed between the large diameter annular protruding part 59 of the rod guide 20 and the outer tube 14 to be in sealing contact with them. Also, the oil lip 73 is disposed in the large diameter hole portion 54 of the rod guide 20 with a gap in the radial direction. The seal member 21 is fixed to the cylinder 19 by being sandwiched between the rod guide 20 and the locking part 28 of the cylinder 19.

Then, the main shaft part 38 of the piston rod 15 is inserted through the seal member 21 in a state of being attached to the cylinder 19 on an inner side of the dust lip 72 and the oil lip 73. In this state, one end of the piston rod 15 protrudes from one end of the cylinder 19. Also, in this state, the dust lip 72 is provided on one end side of the cylinder 19 from which the piston rod 15 protrudes, and the oil lip 73 is provided on an inner side of the dust lip 72 in the cylinder inward and outward direction.

The spring 68 fitted in the annular groove 78 of the dust lip 72 is for maintaining a fastening force of the dust lip 72 in a direction of close contact with the piston rod 15 in a constant state, and is also used for adjusting the fastening force to satisfy design specifications. The spring 69 fitted in the annular groove 79 of the oil lip 73 adjusts a fastening force of the oil lip 73 in a direction of close contact with the piston rod 15.

The check lip 76 of the seal part 65 can be in sealing contact with an outer circumferential side of the small diameter annular protruding part 58 of the rod guide 20 over the entire circumference with a predetermined fastening allowance. Here, the oil fluid L leaking out from the chamber 16 through a gap between the rod guide 20 and the piston rod 15 is accumulated in a chamber 85 formed mainly by the large diameter hole portion 54 on the gap side with respect to the check lip 76 of the seal member 21. The check lip 76 is positioned between the chamber 85 and the communication hole 61 of the rod guide 20 and opens when a pressure in the chamber 85 is higher than a pressure in the reservoir chamber 13 by a predetermined amount to allow the oil fluid L accumulated in the chamber 85 to flow into the reservoir chamber 13 through the communication hole 61. That is, the check lip 76 functions as a check valve that allows a flow of the oil fluid L only in a direction from the chamber 85 to the reservoir chamber 13 and restricts a flow of the oil fluid L and the gas G in the opposite direction.

The seal member 21 described above maintains airtightness by the dust lip 72 in close contact with the piston rod 15 due to its fastening allowance and a tightening force of the spring 68, and thereby entry of foreign substances adhering to the piston rod 15 at the time of being exposed to the outside is mainly restricted by the dust lip 72. Also, the oil lip 73 also is in close contact with the piston rod 15 due to its fastening allowance and a tightening force of the spring 69 to maintain airtightness. The oil lip 73 scrapes off the oil fluid L adhering to the piston rod 15 when the piston rod 15 advances to the outside to restrict its leakage to the outside and keep it in the chamber 85.

Figure 3:
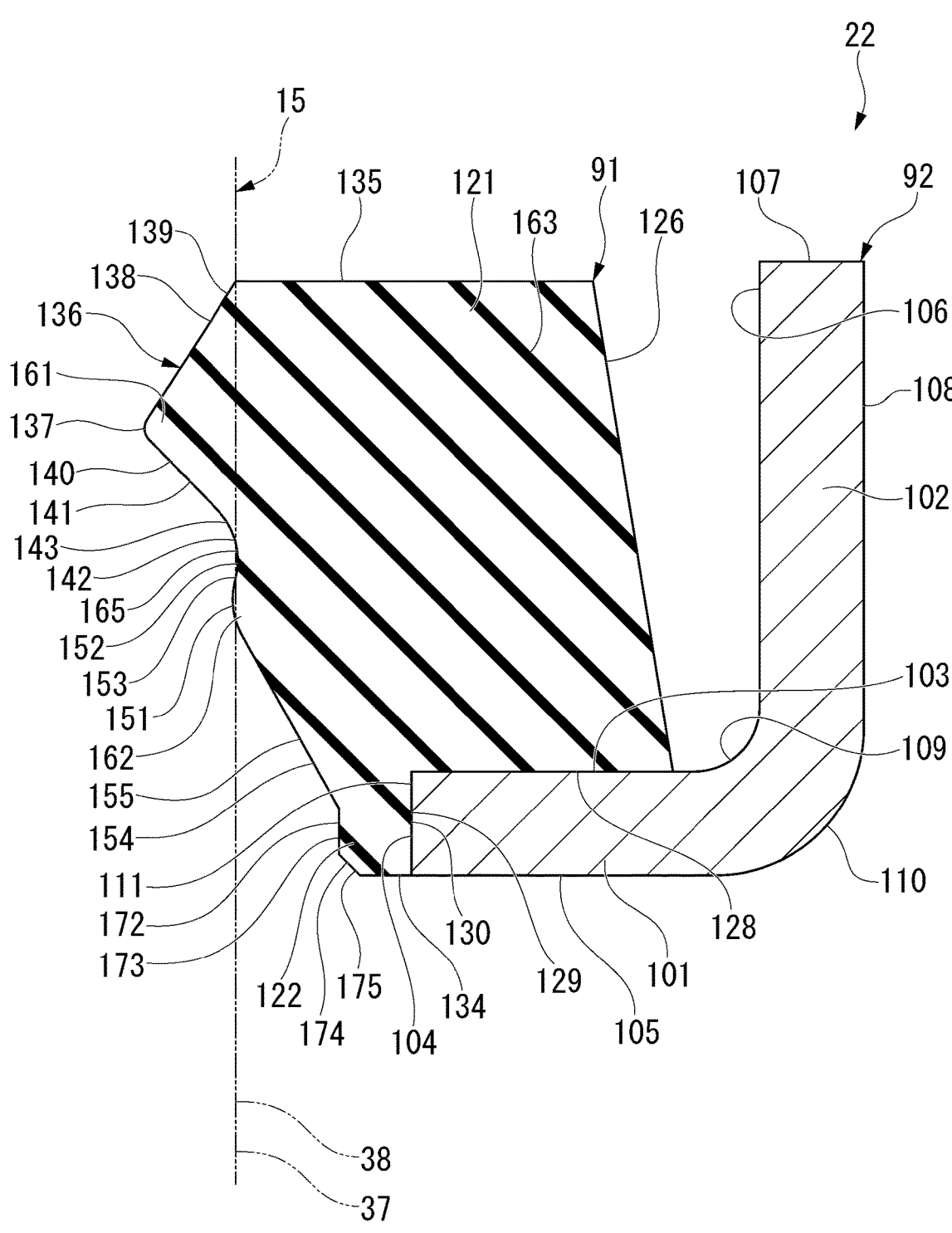
FIG. 3 is a one-side cross-sectional view illustrating a friction member of the shock absorber according to the first embodiment of the present invention.
Figure 4:
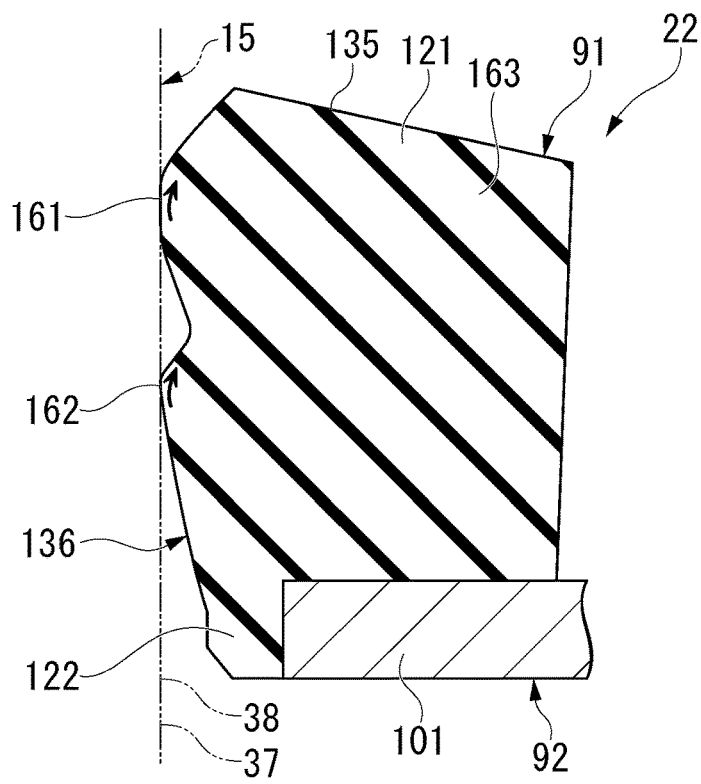
FIG. 4 is a one-side cross-sectional view illustrating a deformed state of the friction member of the shock absorber according to the first embodiment of the present invention in an extension stroke.

The friction member 22 is fitted and fixed in the intermediate diameter hole portion 55 of the rod guide 20, and is therefore disposed on an inner side with respect to the seal member 21 in the cylinder inward and outward direction, that is, further inside in the cylinder 19. The friction member 22 is in pressure contact with the outer circumferential surface 37 of the main shaft part 38 of the piston rod 15 at its inner circumferential portion, and therefore generates frictional resistance to the piston rod 15. Further, FIGS. 2 and 3 illustrate a state in which the piston rod 15 is removed, and the friction member 22 is also in a natural state before the piston rod 15 is inserted therethrough. In other words, the natural state of the friction member 22 is a state in which it is not in sliding contact with the piston rod 15. Then, in FIGS. 2 and 3, the outer circumferential surface 37 of the main shaft part 38 of the piston rod 15 in a case of being inserted is illustrated by a virtual line (two-dot dashed line).

As illustrated in FIG. 2, the friction member 22 is an integral product formed of an annular friction member main body part 91 made of an elastic rubber material such as nitrile rubber or fluoro-rubber, and an annular base part 92 made of a metal to which the friction member main body part 91 is fixed. The friction member main body part 91 has a seamless integral shape and is formed of the same material in its entirety. The base part 92 also has a seamless integral shape and is made of the same material in its entirety. The friction member 22 is fitted in the intermediate diameter hole portion 55 of the rod guide 20 at the base part 92, and is in sliding contact with the outer circumferential surface 37 of the main shaft part 38 of the piston rod 15 at the friction member main body part 91. The base part 92 is one for maintaining a shape of the friction member main body part 91 and obtaining a strength for fixing the friction member 22 to the rod guide 20.

With the friction member 22 fitted, a communication passage 95 using the communication groove 57 formed in the intermediate diameter hole portion 55 is formed between the intermediate diameter hole portion 55 of the rod guide 20 and the friction member 22. The communication passage 95 allows communication between the small diameter hole portion 56 side and the large diameter hole portion 54 side of the rod guide 20. That is, the communication passage 95 allows constant communication between a chamber 96 formed on the intermediate diameter hole portion 55 side with respect to the collar 62 in the small diameter hole portion 56 and the chamber 85 in the large diameter hole portion 54 to reduce a differential pressure of them. In other words, the communication passage 95 allows both sides of the friction member 22 in the axial direction to communicate with each other to reduce a differential pressure of both sides of the friction member 22 in the axial direction.

The chamber 96 in the small diameter hole portion 56 communicates with the chamber 16 through a minute gap between the collar 62 and the piston rod 15. Therefore, the communication passage 95 allows the chambers 85 and the chamber 16 to communicate with each other to reduce a differential pressure of them. That is, the friction member 22 does not actively serve the role of a seal.

Further, in place of or in addition to the communication passage 95, a communication passage that reduces a differential pressure between both sides in the axial direction may be provided on an inner circumference of the friction member 22. Also, even if the communication passage 95 is not in constant communication, for example, a check valve from the inside of the cylinder 19 to the outside may be provided. The point is that the friction member 22 may be used unless it acts as perfect seal.

The friction member 22 in a natural state will be described mainly with reference to FIG. 3. As the cross section of one side illustrated in FIG. 3, the base part 92 of the friction member 22 has a bottomed cylindrical shape constituted by an annular disc part 101 having a flat bored disc shape, and a cylindrical fixing part 102 extending from an outer circumferential side of the annular disc part 101 to one side in the axial direction. The fixing part 102 extends in the axial direction with the annular disc part 101 side as a base end and is formed coaxially with the annular disc part 101. The fixing part 102 extends from the outer circumferential side of the annular disc part 101 to only one side in the axial direction. The annular disc part 101 and the fixing part 102 have the same central axis, and the fixing part 102 extends perpendicular to the annular disc part 101. The base part 92 is formed by, for example, press forming from, for example, a flat plate-shaped material.

The annular disc part 101 has an inner bottom surface 103 formed of a circular flat surface on the fixing part 102 side in the axial direction, an inner end surface 104 formed of a cylindrical surface on a side opposite to the fixing part 102 in the radial direction, and an outer bottom surface 105 formed of a circular flat surface on a side opposite to the fixing part 102 in the axial direction. An inner circumferential end portion of the inner bottom surface 103 extends radially outward from one end portion of the inner end surface 104 in the axial direction, and an inner circumferential end portion of the outer bottom surface 105 extends radially outward from the other end portion of the inner end surface 104 in the axial direction.

The fixing part 102 has an inner circumferential surface 106 formed of a cylindrical surface on the annular disc part 101 side in the radial direction, a distal end surface 107 formed of a circular flat surface on a side opposite to the annular disc part 101 in the axial direction, and an outer circumferential surface 108 formed of a cylindrical surface on a side opposite to the annular disc part 101 in the radial direction. The distal end surface 107 extends radially outward from an end portion of the inner circumferential surface 106 on a side opposite to the annular disc part 101 in the axial direction, and the distal end surface 107 extends radially inward from an end portion of the outer circumferential surface 108 on a side opposite to the annular disc part 101 in the axial direction. The fixing part 102 includes an annular inner R chamfer 109 connecting the inner bottom surface 103 and the inner circumferential surface 106 on a side at which they are close to each other, and an annular outer R chamfer 110 connecting the outer bottom surface 105 and the outer circumferential surface 108 on a side at which they are close to each other.

In the base part 92, the inner bottom surface 103, the inner end surface 104, the outer bottom surface 105, the inner circumferential surface 106, the distal end surface 107, the outer circumferential surface 108, the inner R chamfer 109, and the outer R chamfer 110 have the same central axis, and the inner bottom surface 103, the outer bottom surface 105, and the distal end surface 107 extend perpendicular to the central axis described above. An inner end of the base part 92 having the smallest diameter is the inner end surface 104 of the annular disc part 101. Therefore, the inner end surface 104 has the smallest diameter also in the annular disc part 101 of the base part 92. An inner circumferential portion 111 of the annular disc part 101 includes the inner end surface 104 and is the inner circumferential portion 111 of the base part 92.

The friction member main body part 91 has an annular shape that is made to coincide with the base part 92 in central axis, and includes a main body part 121 formed on a radially inner side of the fixing part 102 of the base part 92 and on the fixing part 102 side in the axial direction of the annular disc part 101, and an inner covering part 122 formed on an inner circumferential side of the annular disc part 101 by protruding outward in the axial direction from an end portion of an inner circumferential portion of the main body part 121 on the annular disc part 101 side in the axial direction.

The main body part 121 is spaced radially inward from the inner circumferential surface 106 of the fixing part 102 of the base part 92 in an entire surface of its outer circumferential surface 126, and is fixed to the inner bottom surface 103 of the annular disc part 101 of the base part 92 by a base end side fixing surface 128 that extends radially inward from one end portion of the outer circumferential surface 126 in the axial direction. The outer circumferential surface 126 has a tapered shape in which a diameter thereof becomes larger toward the base end side fixing surface 128 in the axial direction and is exposed without being fixed to the base part 92. Therefore, the friction member main body part 91 is provided to overlap an inner circumferential side of the cylindrical fixing part 102 in the axial direction as a whole and be spaced apart from the fixing part 102 in the radial direction as a whole.

The inner covering part 122 is fixed to the inner end surface 104 of the annular disc part 101 of the base part 92 by an inner circumferential fixing surface 129 extending in the axial direction from an end portion of the base end side fixing surface 128 on a side opposite to the outer circumferential surface 126. A portion of the friction member main body part 91 in contact with the base part 92 is fixed to the base part 92 in its entire surface. Of the inner covering part 122, an inner circumferential connection part 130 including the inner circumferential fixing surface 129 is connected to the inner circumferential portion 111 of the annular disc part 101.

The friction member main body part 91 has an end surface 134 that is exposed without being fixed to the base part 92 at an end portion of the inner covering part 122 on a side opposite to the main body part 121. The end surface 134 is coplanar with the outer bottom surface 105 of the annular disc part 101. Also, the friction member main body part 91 has a distal end surface 135 that is exposed without being fixed to the base part 92 on a side of the main body part 121 opposite to the base end side fixing surface 128 in the axial direction. The friction member main body part 91 also has an inner circumferential surface 136 that is exposed without being fixed to the base part 92 on an inner circumferential side of the main body part 121 and the inner covering part 122. The distal end surface 135 is a flat surface parallel to the inner bottom surface 103.

The friction member main body part 91 has an inner circumferential portion that includes an annular minimum inner diameter part 137 having a minimum diameter in the friction member main body part 91 and a minimum diameter even in the friction member 22, a distal end side tapered part 139 having a tapered inner circumferential surface 138 that becomes larger in diameter with distance away from the minimum inner diameter part 137 toward the distal end surface 135 side in the axial direction from the minimum inner diameter part 137, an intermediate tapered part 141 having a tapered inner circumferential surface 140 that becomes larger in diameter with distance away from the minimum inner diameter part 137 toward a side opposite to the distal end surface 135 in the axial direction from the minimum inner diameter part 137, and an intermediate inclined part 143 having a curved inner circumferential surface 142 that becomes larger in diameter with distance away from the intermediate tapered part 141 toward a side opposite to the distal end surface 135 in the axial direction from the intermediate tapered part 141. The distal end surface 135 extends outward in the radial direction from an end portion of the inner circumferential surface 138 of the distal end side tapered part 139 on a side opposite to the minimum inner diameter part 137.

Also, the inner circumferential portion of the friction member main body part 91 includes an annular intermediate inner diameter part 151 having a larger diameter than the minimum inner diameter part 137, an intermediate tapered part 153 having a tapered inner circumferential surface 152 that becomes larger in diameter with distance away from the intermediate inner diameter part 151 toward the distal end surface 135 side in the axial direction from the intermediate inner diameter part 151, and a base end side tapered part 155 having a tapered inner circumferential surface 154 that becomes larger in diameter with distance away from the intermediate inner diameter part 151 toward a side opposite to the distal end surface 135 in the axial direction from the intermediate inner diameter part 151. The inner circumferential surface 152 of the intermediate tapered part 153 extends from an end portion of the inner circumferential surface 142 of the intermediate inclined part 143 toward a side opposite to the minimum inner diameter part 137.

The inner circumferential surface 152 of the intermediate tapered part 153 is inclined in the same direction as the inner circumferential surface 138 of the distal end side tapered part 139 with respect to the central axis of the friction member 22, and a degree of the taper is smaller than that of the inner circumferential surface 138 and the taper is gradual. The inner circumferential surface 154 of the base end side tapered part 155 is inclined in the same direction as the inner circumferential surface 140 of the intermediate tapered part 141 with respect to the central axis of the friction member 22, and a degree of the taper is smaller than that of the inner circumferential surface 140 and the taper is gradual.

In the friction member main body part 91, the minimum inner diameter part 137, and the distal end side tapered part 139, the intermediate tapered part 141, and the intermediate inclined part 143 on both sides of the minimum inner diameter part 137 in the axial direction constitute a first lip part 161 (friction part). Therefore, the first lip part 161 includes the minimum inner diameter part 137, and the inner circumferential surface 138 and the inner circumferential surfaces 140 and 142 on both sides of the minimum inner diameter part 137 in the axial direction.

Also, in the friction member main body part 91, the intermediate inner diameter part 151, and the intermediate tapered part 153 and the base end side tapered part 155 on both sides of the intermediate inner diameter part 151 in the axial direction constitute a second lip part 162 (friction part). Therefore, the second lip part 162 includes the intermediate inner diameter part 151, and the inner circumferential surface 152 and the inner circumferential surface 154 on both sides of the intermediate inner diameter part 151 in the axial direction.

The first lip part 161 and the second lip part 162 are both annular. The first lip part 161 and the second lip part 162 protrude radially inward from an annular base part 163 of the friction member main body part 91 excluding the first lip part 161 and the second lip part 162. Due to formation of the first lip part 161 and the second lip part 162, the friction member main body part 91 has an annular recessed part 165 therebetween that is recessed radially outward with respect to the minimum inner diameter part 137 and the intermediate inner diameter part 151.

The friction member main body part 91 has a seamless integral shape and is formed of the same elastic material in its entirety. Since the first lip part 161 and the second lip part 162 are included in the friction member main body part 91, they are formed of an elastic body of the same material.

The minimum inner diameter part 137 has a smaller diameter than the intermediate inner diameter part 151. Therefore, the first lip part 161 in which the minimum inner diameter part 137 has a minimum inner diameter thereof has an inner diameter smaller than an inner diameter of the second lip part 162 in which the intermediate inner diameter part 151 has a minimum inner diameter. The first lip part 161 has an amount of protrusion from the base part 163 in the radial direction larger than that of the second lip part 162, and has a volume larger than that of the second lip part 162. Therefore, the first lip part 161 is more likely to be elastically deformed and has a lower rigidity than the second lip part 162. In other words, the second lip part 162 is less likely to be elastically deformed and has a higher rigidity than the first lip part 161. The second lip part 162 protrudes inward in the radial direction of the friction member 22 from a straight line connecting a boundary position between the inner bottom surface 103 and the inner end surface 104 of the base part 92, which is a supporting point of deformation of the friction member main body part 91, and the minimum inner diameter part 137.

Also, the inner circumferential portion of the friction member main body part 91 includes a constant diameter part 173 having a cylindrical surface-shaped inner circumferential surface 172 extending in the axial direction from an end portion of the inner circumferential surface 154 on a side opposite to the intermediate inner diameter part 151, and a tapered part 175 having a tapered inner circumferential surface 174 that is on a side of the inner circumferential surface 172 opposite to the inner circumferential surface 154 and becomes larger in diameter with distance away from the inner circumferential surface 172. The end surface 134 extends radially outward from a side of the inner circumferential surface 174 opposite to the inner circumferential surface 172. The constant diameter part 173 and the tapered part 175 are included in the base part 163 excluding the first lip part 161 and the second lip part 162 of the friction member main body part 91.

The inner circumferential portion of the friction member main body part 91 is constituted only by the distal end side tapered part 139, the minimum inner diameter part 137, the intermediate tapered part 141, the intermediate inclined part 143, the intermediate tapered part 153, the intermediate inner diameter part 151, the base end side tapered part 155, the constant diameter part 173, and the tapered part 175 described above. In the inner circumferential portion of the friction member main body part 91, a boundary portion between the distal end side tapered part 139 and the intermediate tapered part 141 is the minimum inner diameter part 137 that has a smallest diameter.

Of the first lip part 161 and the second lip part 162, the first lip part 161 is disposed farther from the annular disc part 101 of the base part 92 than the second lip part 162 in the axial direction of the friction member 22.

The inner circumferential surface 138, the minimum inner diameter part 137, the inner circumferential surface 140, the inner circumferential surface 142, the inner circumferential surface 152, the intermediate inner diameter part 151, the inner circumferential surface 154, the inner circumferential surface 172, and the inner circumferential surface 174 all have an annular shape that is continuous over the entire circumference of the friction member main body part 91 in a circumferential direction. Therefore, the first lip part 161, the second lip part 162, and the recessed part 165 also all have an annular shape that is continuous over the entire circumference of the friction member main body part 91 in the circumferential direction. In the friction member main body part 91, the outer circumferential surface 126, the distal end surface 135, the inner circumferential surface 138, the minimum inner diameter part 137, the inner circumferential surface 140, the inner circumferential surface 142, the inner circumferential surface 152, the intermediate inner diameter part 151, the inner circumferential surface 154, the inner circumferential surface 172, the inner circumferential surface 174, and the end surface 134 are made to coincide with the base part 92 in central axis.

Both the minimum inner diameter part 137 and the intermediate inner diameter part 151 have diameters smaller than an outer diameter of the main shaft part 38 of the piston rod 15, that is, a diameter of the outer circumferential surface 37. Therefore, after the piston rod 15 is inserted, both the minimum inner diameter part 137 and the intermediate inner diameter part 151 are in contact with the main shaft part 38 of the piston rod 15 with a fastening allowance. In other words, after the piston rod 15 is inserted, both the first lip part 161 and the second lip part 162 are in contact with the main shaft part 38 of the piston rod 15 with a fastening allowance. After the piston rod 15 is inserted, the friction member 22 has a gap formed in the radial direction between the recessed part 165 and the main shaft part 38 of the piston rod 15.

As illustrated in FIG. 2, the friction member 22 having the above-described structure is fixed when the fixing part 102 of the base part 92 is fitted into the intermediate diameter hole portion 55, which is a portion to be fixed, from the large diameter hole portion 54 side of the rod guide 20 in a posture of protruding outward from the annular disc part 101 in the cylinder inward and outward direction. At this time, in the friction member 22, the fixing part 102 of the base part 92 is fitted to the inner circumferential surface of the intermediate diameter hole portion 55 at the outer circumferential surface 108, and the annular disc part 101 comes in contact with the bottom surface of the intermediate diameter hole portion 55 at the outer bottom surface 105. On the inner circumferential side of the friction member main body part 91, the first lip part 161 is disposed on an outer side in the cylinder inward and outward direction with respect to the second lip part 162.

Then, the main shaft part 38 of the piston rod 15 is inserted through the inside of the friction member main body part 91 of the friction member 22 with a predetermined fastening allowance. Therefore, the friction member 22 is in close contact with the main shaft part 38 of the piston rod 15 at the first lip part 161 and the second lip part 162 while the friction member main body part 91 is elastically deformed outward in the radial direction.

As described above, the friction member 22 is fixed to the cylinder 19, which is one of the cylinder 19 and the piston rod 15, via the rod guide 20 so that the first lip part 161 thereof is in sliding contact with the piston rod 15, which is the other of the cylinder 19 and the piston rod 15. Also, the friction member 22 is fixed to the cylinder 19, which is one of the cylinder 19 and the piston rod 15, via the rod guide 20 so that the second lip part 162 thereof also is in sliding contact with the piston rod 15, which is the other of the cylinder 19 and the piston rod 15.

In the friction member 22, the first lip part 161 and the second lip part 162 have inner diameters different from each other when they are not in sliding contact with the piston rod 15, and specifically, an inner diameter of the first lip part 161 is smaller than an inner diameter of the second lip part 162. The first lip part 161 and the second lip part 162 of the friction member 22 are formed of an elastic body of the same material and come into contact with the piston rod 15. The first lip part 161 and the second lip part 162 have different shapes at portions in contact with the piston rod 15.

As described above, in the shock absorber 11 of the first embodiment described above, when the piston rod 15 moves to the extension side, a damping force of orifice characteristics due to the fixed orifice (not illustrated) is generated in a region in which the piston speed is low, and a damping force of valve characteristics is generated while the disc valve 42 illustrated in FIG. 1 is separated from the piston 18 to allow the oil fluid L to flow through the fluid passage 45 in a region in which the piston speed is high. Also, when the piston rod 15 moves to the compression side, a damping force of orifice characteristics due to the fixed orifice (not illustrated) is generated in a region in which the piston speed is low, and a damping force of valve characteristics is generated while the disc valve 41 is separated from the piston 18 to allow the oil fluid L to flow through the fluid passage 44 in a region in which the piston speed is high.

In contrast to the hydraulic damping region in which a hydraulic damping force due to the fixed orifice (not illustrated) and the disc valves 41 and 42 described above is generated, in a region in which the piston speed is even lower, basically a damping force due to the fixed orifice (not illustrated) and the disc valves 41 and 42 is hardly generated, and therefore an elastic force and frictional resistance to the piston rod 15 due to the seal member 21 and the friction member 22, which are constantly generated, and frictional resistance to the inner tube 12 of the piston 18 are main sources of the damping force. In such a friction region, an acting force of the friction member 22 on the piston rod 15, that is, a reaction force (axial force) generated on the piston rod 15 by the friction member 22, can be optimized by setting the friction member 22.

Specifically, in the friction member 22 to which the piston rod 15 is fitted, both the first lip part 161 and the second lip part 162 come in contact with the outer circumferential surface 37 of the main shaft part 38. Then, when the piston rod 15 moves to the extension side from a state in which it is stopped with respect to the cylinder 19, at the beginning of the movement, both the first lip part 161 and the second lip part 162 are elastically deformed to follow the piston rod 15 without slipping as illustrated by the arrow in FIG. 4. At this time, the first lip part 161 and the second lip part 162 apply an elastic force to the piston rod 15. Therefore, during this period, both the first lip part 161 and the second lip part 162 are in a dynamic spring region (a region in which they follow the piston rod 15 and shake their neck before slipping).

Figure 5:
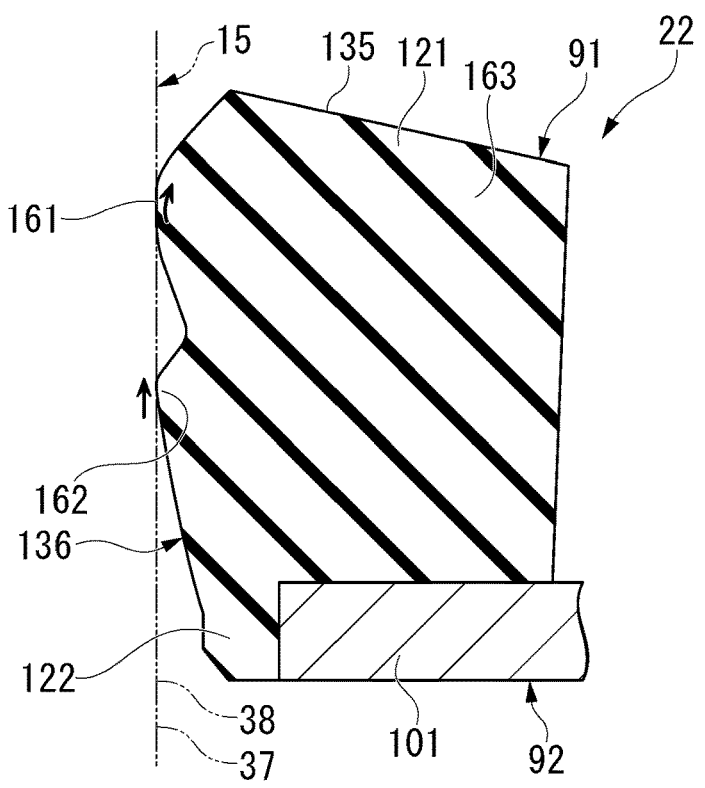
FIG. 5 is a one-side cross-sectional view illustrating a deformed state of the friction member of the shock absorber according to the first embodiment of the present invention in the extension stroke.

Thereafter, as illustrated by the arrow in FIG. 5, of the first lip part 161 and the second lip part 162, while the first lip part 161 with a low rigidity is elastically deformed and follows the piston rod 15 without slipping to continuously apply an elastic force, the second lip part 162 with a high rigidity slides with respect to the piston rod 15 to generate a frictional force. Therefore, during this period, the first lip part 161 is in the dynamic spring region, and the second lip part 162 is in a dynamic friction region (a region in which it slides with respect to the piston rod 15 to apply a frictional force).

Figure 6:
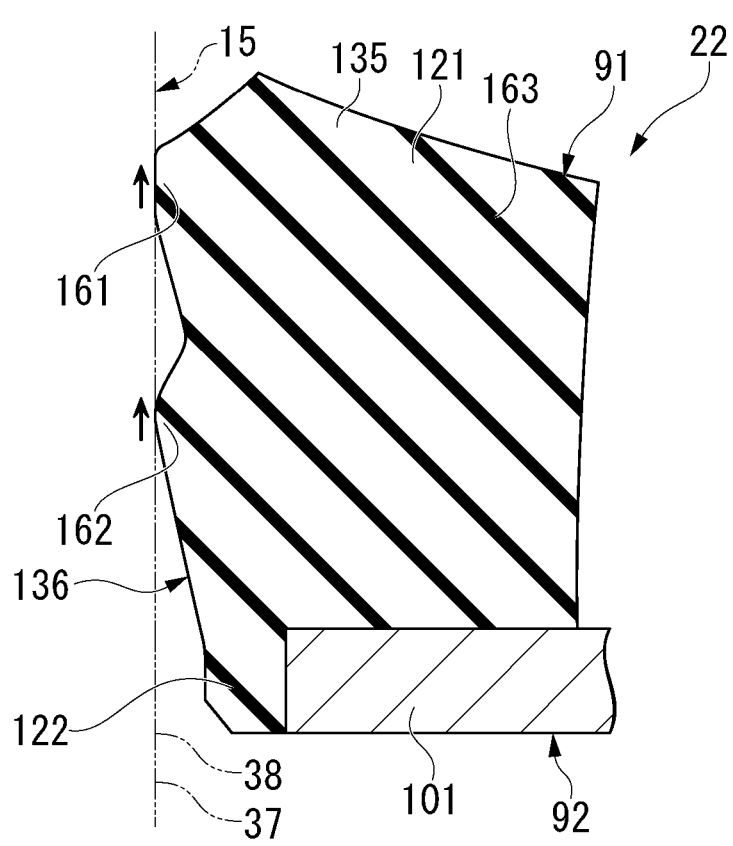
FIG. 6 is a one-side cross-sectional view illustrating a deformed state of the friction member of the shock absorber according to the first embodiment of the present invention in the extension stroke.

Thereafter, as illustrated by the arrow in FIG. 6, both the first lip part 161 and the second lip part 162 slide with respect to the piston rod 15 to generate a frictional force. Therefore, during this period, the first lip part 161 and the second lip part 162 are both in the dynamic friction region.

Also, the same applies when the piston rod 15 moves to the compression side from a state in which it is stopped with respect to the cylinder 19. That is, at the beginning of the movement, both the first lip part 161 and the second lip part 162 are elastically deformed to follow the piston rod 15 without slipping. At this time, the first lip part 161 and the second lip part 162 apply an elastic force to the piston rod 15. Thereafter, of the first lip part 161 and the second lip part 162, while the first lip part 161 with a low rigidity is elastically deformed and follows the piston rod 15 without slipping to continuously apply an elastic force, the second lip part 162 with a high rigidity slides with respect to the piston rod 15 to generate a frictional force. Thereafter, both the first lip part 161 and the second lip part 162 slide with respect to the piston rod 15 to generate a frictional force.

That is, in the friction member 22, the first lip part 161 starts to slide with respect to the relative movement of the cylinder 19 and the piston rod 15 at a timing different from that of the second lip part 162, and generates an adjustable frictional force. In other words, in the friction member 22, the second lip part 162 starts to slide with respect to the relative movement of the cylinder 19 and the piston rod 15 at a timing different from that of the first lip part 161, and generates an adjustable frictional force.

The above-described Patent Document 1 describes a liquid-pressure shock absorber that includes a friction member in sliding contact with a piston rod, and a communication passage allowing both sides of the friction member in the axial direction to communicate with each other. Also, as such a friction member, the above-described Patent Document 2 describes a friction member including an annular friction member main body part, and a base part made of a metal formed of a bottom part having a bored disc shape and a cylindrical part having a cylindrical shape.

Incidentally, in the friction member described above, transition from the dynamic spring region to the dynamic friction region is made such that an acting force on the piston rod gradually increases due to deformation of the lip in the dynamic spring region, and when the lip starts to slide and enters the dynamic friction region, the acting force applied to the piston rod becomes almost constant. Since the transition is transmitted to the vehicle body of the vehicle in which the shock absorber is mounted as sprung vibration, it is desired to make the transition gentle to smoothly change the acting force of the friction member on the piston rod.

On the other hand, in the friction member 22 of the shock absorber 11 of the first embodiment, the second lip part 162 starts to slide with respect to the relative movement of the cylinder 19 and the piston rod 15 at a timing different from that of the first lip part 161 and generates an adjustable frictional force. Therefore, the acting force of the friction member 22 on the piston rod 15 can be changed smoothly. Therefore, ride comfort of the vehicle in which the shock absorber 11 is mounted can be made satisfactory.

In other words, since the first lip part 161 and the second lip part 162 of the friction member 22 are formed of an elastic body of the same material and have different shapes at portions in contact with the piston rod 15, the first lip part 161 and the second lip part 162 start to slide with respect to the relative movement of the cylinder 19 and the piston rod 15 at a timing different from each other to generate a frictional force. Therefore, the acting force of the friction member 22 on the piston rod 15 can be changed smoothly.

Figure 7:
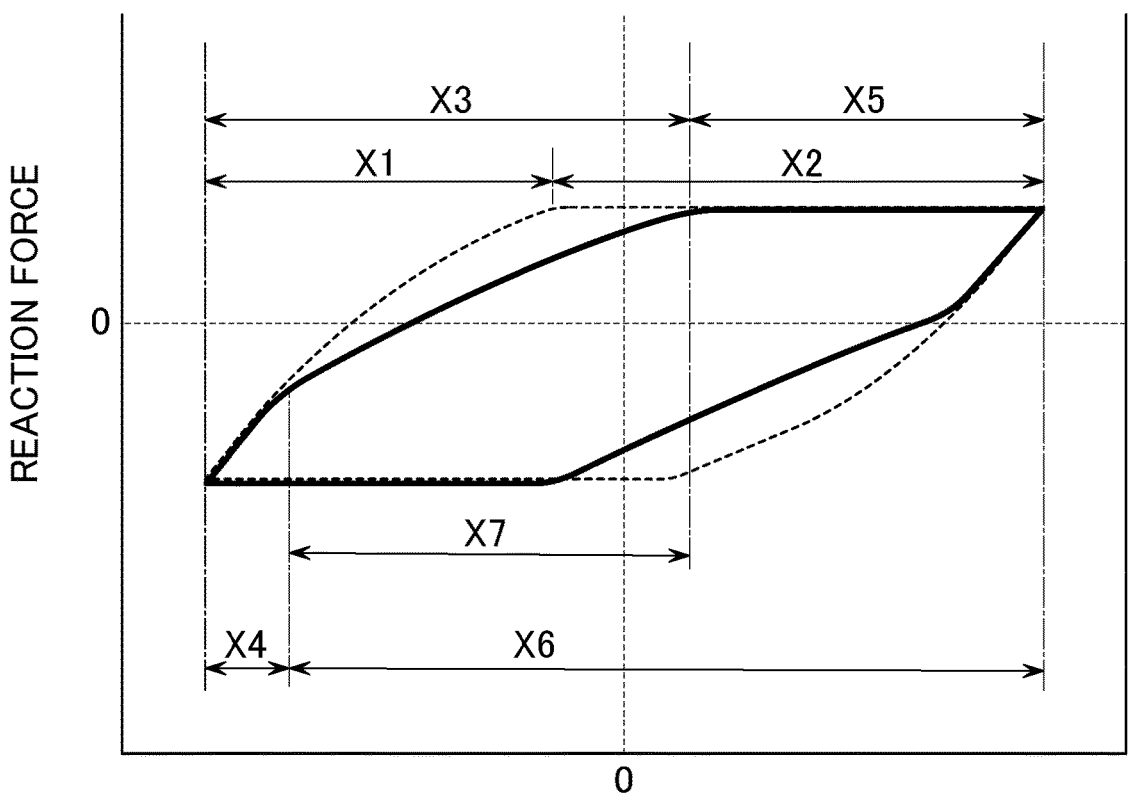
FIG. 7 is a Lissajous waveform diagram showing characteristics of a reaction force with respect to a stroke of a piston rod due to the friction member of the shock absorber according to the first embodiment of the present invention and a friction member of a comparative example.

Here, the Lissajous waveform illustrated by the solid line in FIG. 7 indicates characteristics of a reaction force with respect to a stroke of the piston rod 15 generated due to the friction member 22 of the shock absorber 11 of the first embodiment. On the other hand, the Lissajous waveform illustrated by the broken line in FIG. 7 indicates characteristic of a reaction force with respect to a stroke of a piston rod generated due to a conventional friction member.

As illustrated by the broken line in FIG. 7, the conventional friction member transitions, for example, from a first range X1, which is in a dynamic spring region of an extension stroke and in which a rate of increase in a reaction force with respect to a stroke of the piston rod is high, to a second range X2, which is in a dynamic friction region and in which a reaction force with respect to the stroke of the piston rod is substantially constant. Therefore, in the conventional friction member, a change in the reaction force of the piston rod becomes large.

On the other hand, as illustrated by the solid line in FIG. 7, in the friction member 22 of the shock absorber 11 of the first embodiment, a region X7 in which the first lip part 161 is in a dynamic spring region X3, the second lip part 162 is in a dynamic friction region X6, and a rate of increase in the reaction force with respect to the stroke of the piston rod 15 is lower than that in a region X4 can be provided between a region in which the dynamic spring region X3 of the first lip part 161 and the dynamic spring region X4 of the second lip part 162 in the extension stroke overlap and in which the rate of increase in the reaction force with respect to the stroke of the piston rod 15 is high, that is, the region X4, and a region in which a dynamic friction region X5 of the first lip part 161 and the dynamic friction region X6 of the second lip part 162 overlap and in which the reaction force with respect to the stroke of the piston rod 15 is substantially constant, that is, the region X5. Therefore, the reaction force of the piston rod 15, that is, the acting force of the friction member 22 on the piston rod 15 can be changed smoothly.

That is, the friction member 22 can maintain a rigidity (dynamic frictional force) with respect to a start of movement of the piston rod 15 and make transition from the dynamic spring region to the dynamic friction region smooth. The friction member 22 can secure an axial force acting on the piston rod 15 by maintaining the rigidity with respect to a start of movement of the piston rod 15, and thus can secure steering stability. Also, shaking in a fine amplitude region can be moderated by making the transition from the dynamic spring region to the dynamic friction region smooth, and ride comfort of the vehicle in which the shock absorber 11 is mounted can be made satisfactory.

The friction member 22 of the shock absorber 11 of the first embodiment exhibits substantially the same characteristics also in a compression stroke as illustrated by the solid line in FIG. 7.

Also, since the first lip part 161 and the second lip part 162 are formed of an elastic body of the same material and each start to slide with respect to the piston rod 15 at a timing different from each other when inner diameters and shapes in a state of not being in sliding contact with the piston rod 15 are made different, a timing of starting to slide with respect to the piston rod 15 can be made different with a simple structure.

In addition, characteristics of the friction member 22 can be easily changed and adjusted by adjusting a difference in inner diameter of the first lip part 161 and the second lip part 162, and a difference in inner diameter of the boundary position between the inner bottom surface 103 and the inner end surface 104 of the base part 92, which is a supporting point of deformation of the friction member main body part 91, and the second lip part 162. In addition, since spring characteristics can be changed by adjusting an amount of protrusion of the second lip part 162 from the inner circumferential surface 172 of the base part 163, tuning that matches characteristics of the vehicle in which the shock absorber 11 is mounted can be facilitated.

Second Embodiment

Next, a second embodiment according to the present invention will be described mainly on the basis of FIG. 8, focusing on differences from the first embodiment. Further, parts common to those in the first embodiment will be denoted by the same terms and the same reference signs.

Figure 8:
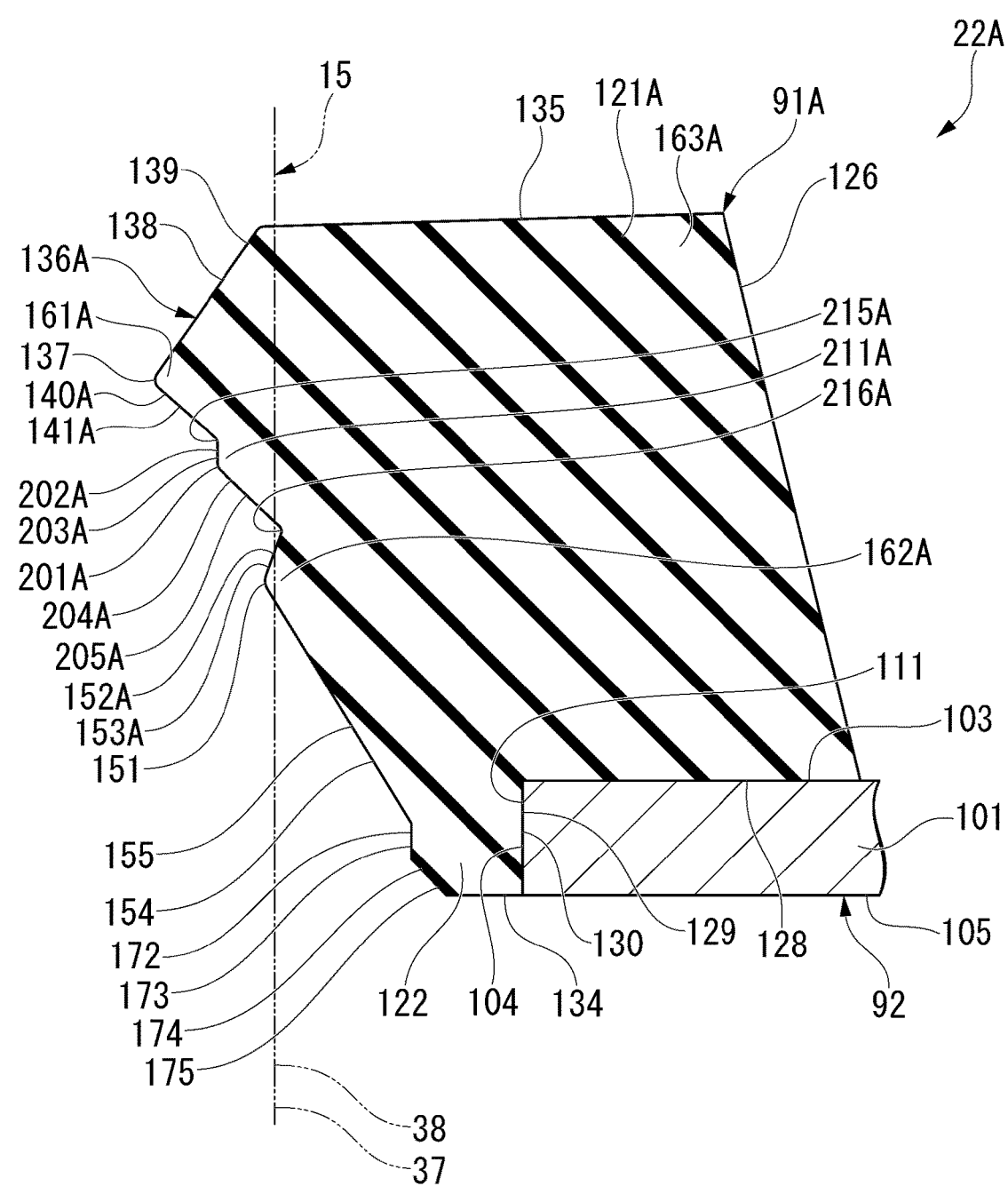
FIG. 8 is a one-side cross-sectional view illustrating a friction member of a shock absorber according to a second embodiment of the present invention.

In the second embodiment, instead of the friction member 22 of the first embodiment, a friction member 22A whose cross section on one side is illustrated in FIG. 8 is provided. Further, also in FIG. 8, the friction member 22A in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22A of the second embodiment includes a base part 92 similar to that of the first embodiment, and a friction member main body part 91A that is partially different from the friction member main body part 91 of the first embodiment. The friction member main body part 91A includes a main body part 121A that is partially different from the main body part 121 of the first embodiment, and an inner covering part 122 that is similar to that of the first embodiment. The friction member main body part 91A has an inner circumferential surface 136A that is partially different from the inner circumferential surface 136 of the first embodiment.

The friction member main body part 91A has an inner circumferential portion that includes a minimum inner diameter part 137, a distal end side tapered part 139, an intermediate inner diameter part 151, a base end side tapered part 155, a constant diameter part 173, and a tapered part 175, all of which are similar to those in the first embodiment. The inner circumferential portion of the friction member main body part 91A includes an intermediate tapered part 141A having a tapered inner circumferential surface 140A that becomes larger in diameter with distance away from the minimum inner diameter part 137 toward a side opposite to a distal end surface 135 in an axial direction from the minimum inner diameter part 137, and an intermediate tapered part 153A having a tapered inner circumferential surface 152A that becomes larger in diameter with distance away from the intermediate inner diameter part 151 toward the distal end surface 135 side in the axial direction from the intermediate inner diameter part 151.

The inner circumferential portion of the friction member main body part 91A includes an intermediate inner diameter part 201A provided between the minimum inner diameter part 137 and the intermediate inner diameter part 151 and having a diameter larger than that of the minimum inner diameter part 137 and smaller than that of the intermediate inner diameter part 151, an intermediate tapered part 203A having a tapered inner circumferential surface 202A that becomes larger in diameter with distance away from the intermediate inner diameter part 201A toward the distal end surface 135 side in the axial direction from the intermediate inner diameter part 201A, and an intermediate tapered part 205A having a tapered inner circumferential surface 204A that becomes larger in diameter with distance away from the intermediate inner diameter part 201A toward a side opposite to the distal end surface 135 in the axial direction from the intermediate inner diameter part 201A. The inner circumferential surface 202A of the intermediate tapered part 203A extends from an end portion of the inner circumferential surface 140A of the intermediate tapered part 141A on a side opposite to the minimum inner diameter part 137. The inner circumferential surface 204A of the intermediate tapered part 205A extends from an end portion of the inner circumferential surface 152A of the intermediate tapered part 153A on a side opposite to the intermediate inner diameter part 151.

In the friction member main body part 91A, the minimum inner diameter part 137, and the distal end side tapered part 139 and the intermediate tapered part 141A on both sides of the minimum inner diameter part 137 in the axial direction constitute a first lip part 161A. Therefore, the first lip part 161A includes the minimum inner diameter part 137, and an inner circumferential surface 138 and the inner circumferential surface 140A on both sides of the minimum inner diameter part 137 in the axial direction.

Also, in the friction member main body part 91A, the intermediate inner diameter part 151, and the intermediate tapered part 153A and the base end side tapered parts 155 on both sides of the intermediate inner diameter part 151 in the axial direction constitute a second lip part 162A. Therefore, the second lip part 162A includes the intermediate inner diameter part 151, and the inner circumferential surface 152A and an inner circumferential surface 154 on both sides of the intermediate inner diameter part 151 in the axial direction.

Also, in the friction member main body part 91A, the intermediate inner diameter part 201A, and the intermediate tapered part 203A and the intermediate tapered part 205A on both sides of the intermediate inner diameter part 201A in the axial direction constitute a third lip part 211A. Therefore, the third lip part 211A includes the intermediate inner diameter part 201A, and the inner circumferential surface 202A and the inner circumferential surface 204A on both sides of the intermediate inner diameter part 201A in the axial direction.

The first lip part 161A, the second lip part 162A, and the third lip part 211A are all annular. The first lip part 161A, the second lip part 162A, and the third lip part 211A protrude radially inward from an annular base part 163A of the friction member main body part 91A excluding those lip parts. Due to formation of the first lip part 161A and the third lip part 211A, the friction member main body part 91A has an annular recessed part 215A therebetween that is recessed radially outward with respect to the minimum inner diameter part 137 and the intermediate inner diameter part 201A. Due to formation of the second lip part 162A and the third lip part 211A, the friction member main body part 91A has an annular recessed part 216A therebetween that is recessed radially outward with respect to the intermediate inner diameter part 151 and the intermediate inner diameter part 201A.

The friction member main body part 91A has a seamless integral shape and is formed of the same elastic material in its entirety. Since the first lip part 161A, the second lip part 162A, and the third lip part 211A are included in the friction member main body part 91A, they are formed of an elastic body of the same material.

The first lip part 161A in which the minimum inner diameter part 137 has a minimum inner diameter thereof has an inner diameter smaller than an inner diameter of the second lip part 162A in which the intermediate inner diameter part 151 has a minimum inner diameter thereof. An amount of protrusion of the first lip part 161A from the base part 163A in a radial direction is larger than that of the second lip part 162A.

The minimum inner diameter part 137 has a smaller diameter than the intermediate inner diameter part 201A. Therefore, the first lip part 161A in which the minimum inner diameter part 137 has the minimum inner diameter thereof has an inner diameter smaller than an inner diameter of the third lip part 211A in which the intermediate inner diameter part 201A has a minimum inner diameter. An amount of protrusion of the first lip part 161A from the base part 163A in the radial direction is larger than that of the third lip part 211A.

The intermediate inner diameter part 151 has a larger diameter than the intermediate inner diameter part 201A. The second lip part 162A in which the intermediate inner diameter part 151 has a minimum inner diameter thereof has an inner diameter larger than an inner diameter of the third lip part 211A in which the intermediate inner diameter part 201A has a minimum inner diameter thereof. An amount of protrusion of the second lip part 162A from the base part 163A in the radial direction is larger than that of the third lip part 211A.

In the friction member main body part 91A, the first lip part 161A is more likely to be elastically deformed and has a lower rigidity than the second lip part 162A. Also, in the friction member main body part 91A, the second lip part 162A is more likely to be elastically deformed and has a lower rigidity than the third lip part 211A.

The inner circumferential portion of the friction member main body part 91A is constituted only by the distal end side tapered part 139, the minimum inner diameter part 137, the intermediate tapered part 141A, the intermediate tapered part 203A, the intermediate inner diameter part 201A, the intermediate tapered part 205A, the intermediate tapered part 153A, the intermediate inner diameter part 151, the base end side tapered part 155, the constant diameter part 173, and the tapered part 175 described above. In the inner circumferential portion of the friction member main body part 91A, a boundary portion between the distal end side tapered part 139 and the intermediate tapered part 141A is the minimum inner diameter part 137 that has a smallest diameter.

Of the first lip part 161A, the second lip part 162A, and the third lip part 211A, the first lip part 161A is disposed on a side farthest from an annular disc part 101 of the base part 92, the second lip part 162A is disposed on a side closest to the annular disc part 101, and the third lip part 211A is disposed therebetween in the axial direction of the friction member main body part 91A.

Similarly to the inner circumferential surface 138 and the inner circumferential surface 154, the inner circumferential surface 140A, the inner circumferential surface 202A, the intermediate inner diameter part 201A, the inner circumferential surface 204A, and the inner circumferential surface 152A also have an annular shape that is continuous over the entire circumference of the friction member main body part 91A in a circumferential direction. Therefore, the first lip part 161A, the second lip part 162A, the third lip part 211A, the recessed part 215A, and the recessed part 216A also all have an annular shape that is continuous over the entire circumference of the friction member main body part 91A in the circumferential direction. The inner circumferential surface 140A, the inner circumferential surface 202A, the intermediate inner diameter part 201A, the inner circumferential surface 204A, and the inner circumferential surface 152A are made to coincide with the base part 92 in central axis.

All the minimum inner diameter part 137, the intermediate inner diameter part 151, and the intermediate inner diameter part 201A have diameters smaller than an outer diameter of the main shaft part 38 of the piston rod 15, that is, a diameter of the outer circumferential surface 37. Therefore, after the piston rod 15 is inserted, the minimum inner diameter part 137, the intermediate inner diameter part 151, and the intermediate inner diameter part 201A are all in contact with the main shaft part 38 of the piston rod 15 with a fastening allowance. In other words, after the piston rod 15 is inserted, the first lip part 161A, the second lip part 162A, and the third lip part 211A are all in contact with the main shaft part 38 of the piston rod 15 with a fastening allowance. After the piston rod 15 is inserted, the friction member 22A has gaps formed in the radial direction between the recessed part 215A and the recessed part 216A, and the main shaft part 38 of the piston rod 15.

The friction member 22A is fixed to a cylinder 19 via a rod guide 20 so that all of the first lip part 161A, the second lip part 162A, and the third lip part 211A are in sliding contact with the piston rod 15.

In the friction member 22A, the first lip part 161A, the second lip part 162A, and the third lip part 211A all have different inner diameters when they are not in sliding contact with the piston rod 15, and specifically, an inner diameter of the first lip part 161A is smaller than an inner diameter of third lip part 211A, and an inner diameter of the third lip part 211A is smaller than an inner diameter of second lip part 162A. In the friction member 22A, the first lip part 161A, the second lip part 162A, and the third lip part 211A are formed of an elastic body of the same material and come into contact with the piston rod 15. The first lip part 161A, the second lip part 162A, and the third lip part 211A all have different shapes at portions in contact with the piston rod 15.

The friction member 22A of the second embodiment described above is configured so that, when the piston rod 15 moves to, for example, an extension side from a state in which it is stopped with respect to the cylinder 19, at the beginning of the movement, the first lip part 161A, the second lip part 162A, and the third lip part 211A are all elastically deformed and follow the piston rod 15 without slipping. At this time, all of the first lip part 161A, the second lip part 162A, and the third lip part 211A apply an elastic force to the piston rod 15. Therefore, during this period, the first lip part 161A, the second lip part 162A, and the third lip part 211A are all in a dynamic spring region.

Thereafter, of the first lip part 161A, the second lip part 162A, and the third lip part 211A, while the first lip part 161A and the second lip part 162A with a low rigidity are elastically deformed to follow the piston rod 15 without slipping to continuously apply an elastic force, the third lip part 211A with a highest rigidity slides with respect to the piston rod 15 to generate a frictional force. Therefore, during this period, the first lip part 161A and the second lip part 162A are in the dynamic spring region, and the third lip part 211A is in a dynamic friction region.

Thereafter, of the first lip part 161A, the second lip part 162A, and the third lip part 211A, while the first lip part 161A having a lowest rigidity is elastically deformed and follows the piston rod 15 without slipping to continuously apply an elastic force, the second lip part 162A and the third lip part 211A having a higher rigidity than that slide with respect to the piston rod 15 to generate a frictional force. Therefore, during this period, the first lip part 161A is in the dynamic spring region, and the second lip part 162A and the third lip part 211A are in the dynamic friction region.

Thereafter, all of the first lip part 161A, the second lip part 162A, and the third lip part 211A slide with respect to the piston rod 15 to generate a frictional force. Therefore, during this period, the first lip part 161A, the second lip part 162A, and the third lip part 211A are all in the dynamic friction region.

The same applies to a compression stroke.

That is, in the friction member 22A, the first lip part 161A, the second lip part 162A, and the third lip part 211A each start to slide with respect to relative movement of the cylinder 19 and the piston rod 15 at a timing different from each other and generate an adjustable frictional force.

In the second embodiment, the first lip part 161A, the second lip part 162A, and the third lip part 211A of the friction member 22A each have a different shape at a portion in contact with the piston rod 15 and start to slide with respect to the relative movement of the cylinder 19 and the piston rod 15 at a timing different from each other to generate a frictional force. Therefore, an acting force of the friction member 22A on the piston rod 15 can be changed more smoothly than in the first embodiment. Therefore, ride comfort of the vehicle can be made more satisfactory than in the first embodiment.

For the lip part that comes in contact with the piston rod 15, two lip parts of the first lip part 161 and the second lip part 162 are provided in the first embodiment, and three lip parts of the first lip part 161A, the second lip part 162A, and the third lip part 211A are provided in the second embodiment, but four or more lip parts may be provided.

Third Embodiment

Next, a third embodiment according to the present invention will be described mainly on the basis of FIG. 9, focusing on differences from the first embodiment. Further, parts common to those in the first embodiment will be denoted by the same terms and the same reference signs.

Figure 9:
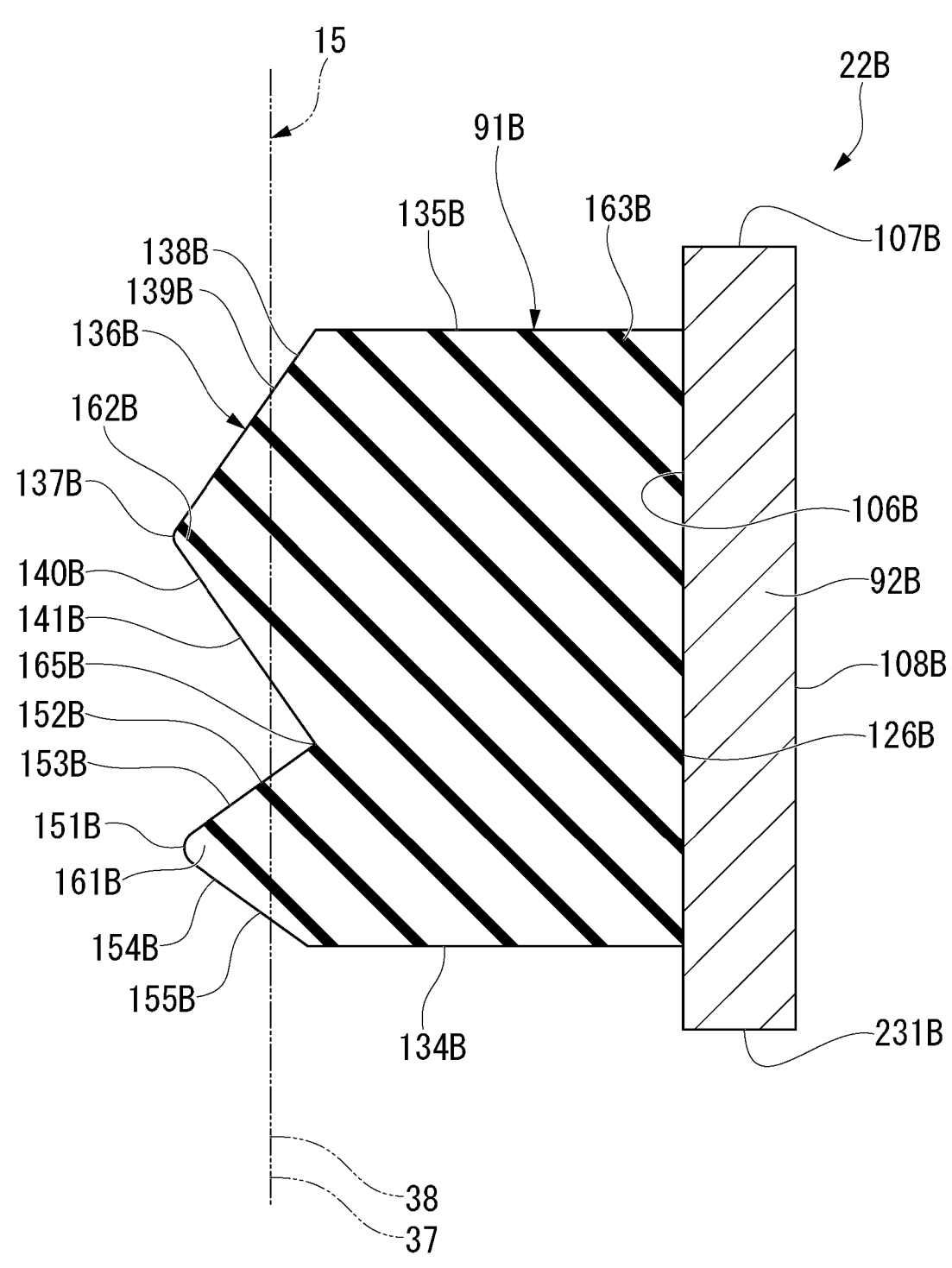
FIG. 9 is a one-side cross-sectional view illustrating a friction member of a shock absorber according to a third embodiment of the present invention.

In the third embodiment, instead of the friction member 22 of the first embodiment, a friction member 22B whose cross section on one side is illustrated in FIG. 9 is provided. Further, also in FIG. 9, the friction member 22B in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22B of the third embodiment includes a base part 92B different from the base part 92 of the first embodiment, and a friction member main body part 91B different from the friction member main body part 91 of the first embodiment.

The base part 92B of the friction member 22B has a cylindrical shape. The base part 92B includes an inner circumferential surface 106B formed of a cylindrical surface, a distal end surface 107B formed of a circular flat surface on one side in an axial direction, an outer circumferential surface 108B formed of a cylindrical surface, and a base end surface 231B formed of a circular flat surface on the other side in the axial direction. The distal end surface 107B and the base end surface 231B extend parallel to each other, and the inner circumferential surface 106B and the outer circumferential surface 108B extend coaxially and perpendicular to the distal end surface 107B and the base end surface 231B.

The friction member main body part 91B has an annular shape that is made to coincide with the base part 92B in central axis. An outer circumferential surface 126B of the friction member main body part 91B is fixed to the inner circumferential surface 106B of the base part 92B in its entire surface. The friction member main body part 91B has a distal end surface 135B extending parallel to the distal end surface 107B of the base part 92B. The friction member main body part 91B has an end surface 134B extending parallel to the base end surface 231B of the base part 92B. In the friction member main body part 91B, the distal end surface 135B, the end surface 134B, and an inner circumferential surface 136B are exposed without being fixed to the base part 92B.

In the friction member main body part 91B, an inner circumferential portion thereof includes an annular minimum inner diameter part 137B having a minimum diameter in the friction member main body part 91B and a minimum diameter even in the friction member 22B, a distal end side tapered part 139B having a tapered inner circumferential surface 138B that becomes larger in diameter with distance away from the minimum inner diameter part 137B toward the distal end surface 135B side in the axial direction from the minimum inner diameter part 137B, and an intermediate tapered part 141B having a tapered inner circumferential surface 140B that becomes larger in diameter with distance away from the minimum inner diameter part 137B toward a side opposite to the distal end surface 135B in the axial direction from the minimum inner diameter part 137B. The distal end surface 135B extends outward in a radial direction from an end portion of the inner circumferential surface 138B of the distal end side tapered part 139B on a side opposite to the minimum inner diameter part 137B.

Also, the inner circumferential portion of the friction member main body part 91B includes an annular minimum inner diameter part 151B having the same diameter as the minimum inner diameter part 137B, an intermediate tapered part 153B having a tapered inner circumferential surface 152B that becomes larger in diameter with distance away from the minimum inner diameter part 151B toward the distal end surface 135B side in the axial direction from the minimum inner diameter part 151B, and a base end side tapered part 155B having a tapered inner circumferential surface 154B that becomes larger in diameter with distance away from the minimum inner diameter part 151B toward a side opposite to the distal end surface 135B in the axial direction from the minimum inner diameter part 151B. The end surface 134B extends radially outward from an end portion on a side of the inner circumferential surface 154B of the base end side tapered part 155B opposite to the minimum inner diameter part 151B. The inner circumferential surface 152B of the intermediate tapered part 153B extends from an end portion on a side of the inner circumferential surface 140B of the intermediate tapered part 141B opposite to the minimum inner diameter part 137B.

The inner circumferential surface 152B of the intermediate tapered part 153B is inclined in the same direction as the inner circumferential surface 138B of the distal end side tapered part 139B with respect to the central axis of the friction member 22B, and a degree of the taper is larger than that of the inner circumferential surface 138B and the taper is steep. The inner circumferential surface 154B of the base end side tapered part 155B is inclined in the same direction as the inner circumferential surface 140B of the intermediate tapered part 141B with respect to the central axis of the friction member 22B, and a degree of the taper is larger than that of the inner circumferential surface 140B and the taper is steep.

In the friction member main body part 91B, the minimum inner diameter part 151B, and the intermediate tapered part 153B and the base end side tapered part 155B on both sides of the minimum inner diameter part 151B in the axial direction constitute a first lip part 161B (friction part). Therefore, the first lip part 161B includes the minimum inner diameter part 151B, and the inner circumferential surface 152B and the inner circumferential surface 154B on both sides of the minimum inner diameter part 151B in the axial direction.

Also, the minimum inner diameter part 137B, and the distal end side tapered part 139B and the intermediate tapered part 141B on both sides of the minimum inner diameter part 137B in the axial direction constitute a second lip part 162B (friction part). Therefore, the second lip part 162B includes the minimum inner diameter part 137B, and the inner circumferential surface 138B and the inner circumferential surface 140B on both sides of the minimum inner diameter part 137B in the axial direction.

The first lip part 161B and the second lip part 162B are both annular. The first lip part 161B and the second lip part 162B protrude radially inward from an annular base part 163B of the friction member main body part 91B excluding the first lip part 161B and the second lip part 162B. Due to formation of the first lip part 161B and the second lip part 162B, the friction member main body part 91B has an annular recessed part 165B therebetween that is recessed radially outward with respect to the minimum inner diameter part 137B and the minimum inner diameter part 151B.

The friction member main body part 91B has a seamless integral shape and is formed of the same elastic material in its entirety. Since the first lip part 161B, and the second lip part 162B are included in the friction member main body part 91B, they are formed of an elastic body of the same material.

The minimum inner diameter part 137B and the minimum inner diameter part 151B have the same diameter. Therefore, the first lip part 161B and the second lip part 162B have the same inner diameter. The first lip part 161B and the second lip part 162B have the same amount of protrusion from the base part 163B. A length of the second lip part 162B in the axial direction is larger than a length of the first lip part 161B in the axial direction. A volume of the second lip part 162B is larger than a volume of the first lip part 161B. The first lip part 161B is more likely to be elastically deformed and has a lower rigidity than the second lip part 162B.

The inner circumferential portion of the friction member main body part 91B is constituted only by the distal end side tapered part 139B, the minimum inner diameter part 137B, the intermediate tapered part 141B, the intermediate tapered part 153B, the minimum inner diameter part 151B, and the base end side tapered part 155B described above. In the inner circumferential portion of the friction member main body part 91B, a boundary portion between the distal end side tapered part 139B and the intermediate tapered part 141B is the minimum inner diameter part 137B that has a smallest diameter, and a boundary portion between the intermediate tapered part 153B and the base end side tapered part 155B is the minimum inner diameter part 151B that has a smallest diameter.

The inner circumferential surface 138B, the minimum inner diameter part 137B, the inner circumferential surface 140B, the inner circumferential surface 152B, the minimum inner diameter part 151B, and the inner circumferential surface 154B all have an annular shape that is continuous over the entire circumference of the friction member main body part 91B in the circumferential direction. Therefore, the first lip part 161B, the second lip part 162B, and the recessed part 165B also all have an annular shape that is continuous over the entire circumference of the friction member main body part 91B in the circumferential direction. In the friction member main body part 91B, the outer circumferential surface 126B, the distal end surface 135B, the inner circumferential surface 138B, the minimum inner diameter part 137B, the inner circumferential surface 140B, the inner circumferential surface 152B, the minimum inner diameter part 151B, the inner circumferential surface 154B, and the end surface 134B are made to coincide with the base part 92B in central axis.

Both the minimum inner diameter part 137B and the minimum inner diameter part 151B have diameters smaller than an outer diameter of the main shaft part 38 of the piston rod 15, that is, a diameter of the outer circumferential surface 37. Therefore, after the piston rod 15 is inserted, both the minimum inner diameter part 137B and the minimum inner diameter part 151B are in contact with the main shaft part 38 of the piston rod 15 with a fastening allowance. In other words, after the piston rod 15 is inserted, both the first lip part 161B and the second lip part 162B are in contact with the main shaft part 38 of the piston rod 15 with a fastening allowance. After the piston rod 15 is inserted, the friction member 22B has a gap formed in the radial direction between the recessed part 165B and the main shaft part 38 of the piston rod 15.

The friction member 22B having the above-described structure is fixed when the base part 92B is fitted into the intermediate diameter hole portion 55 of the rod guide 20 illustrated in FIG. 2 in a state in which the second lip part 162B is disposed on an outer side of the first lip part 161B in a cylinder inward and outward direction.

Then, the main shaft part 38 of the piston rod 15 is inserted through the inside of the friction member main body part 91B of the friction member 22B with a predetermined fastening allowance. Therefore, the friction member 22B is in close contact with the main shaft part 38 of the piston rod 15 at the first lip part 161B and the second lip part 162B while the friction member main body part 91B is elastically deformed outward in the radial direction. The friction member 22B is fixed to a cylinder 19 via the rod guide 20 such that both the first lip part 161B and the second lip part 162B are in sliding contact with the piston rod 15.

In the friction member 22B, the first lip part 161B and the second lip part 162B have the same inner diameter and different axial lengths when they are not in sliding contact with the piston rod 15, and specifically, an axial length of the second lip part 162B is larger than an axial length of the first lip part 161B. In the friction member 22B, the first lip part 161B and the second lip part 162B are formed of an elastic body of the same material and come into contact with the piston rod 15. The first lip part 161B and the second lip part 162B have different shapes at portions in contact with the piston rod 15.

The friction member 22B of the third embodiment described above is configured so that when the piston rod 15 moves to, for example, an extension side from a state in which it is stopped with respect to the cylinder 19, at the beginning of the movement, both the first lip part 161B and the second lip part 162B are elastically deformed to follow the piston rod 15 without slipping. At this time, both the first lip part 161B and the second lip part 162B apply an elastic force to the piston rod 15. Therefore, during this period, both the first lip part 161B and the second lip part 162B are in a dynamic spring region.

Thereafter, of the first lip part 161B and the second lip part 162B, while the first lip part 161B with a low rigidity is elastically deformed and follows the piston rod 15 without slipping to continuously apply an elastic force, the second lip part 162B with a high rigidity slides with respect to the piston rod 15 to generate a frictional force. Therefore, during this period, the first lip part 161B is in the dynamic spring region, and the second lip part 162B is in a dynamic friction region.

Thereafter, both the first lip part 161B and the second lip part 162B slide with respect to the piston rod 15 to generate a frictional force. Therefore, during this period, the first lip part 161B and the second lip part 162B are both in the dynamic friction region.

The same applies to a compression stroke.

That is, in the friction member 22B, the first lip part 161B and the second lip part 162B each start to slide with respect to relative movement of the cylinder 19 and the piston rod 15 at a timing different from each other and generate an adjustable frictional force.

In the third embodiment, the first lip part 161B and the second lip part 162B of the friction member 22B each start to slide with respect to the relative movement of the cylinder 19 and the piston rod 15 at a timing different from each other to generate a frictional force. Therefore, an acting force of the friction member 22B on the piston rod 15 can be changed smoothly. Therefore, ride comfort of the vehicle can be made satisfactory as in the first embodiment.

In the third embodiment, the first lip part 161B and the second lip part 162B of the friction member 22B are formed of an elastic body of the same material and are made different in rigidity by making axial lengths thereof different, and thereby timings at which they start to slide with respect to the piston rod 15 are made different. Therefore, a timing of starting to slide with respect to the piston rod 15 can be made different with a simple structure.

Fourth Embodiment

Next, a fourth embodiment according to the present invention will be described mainly on the basis of FIG. 10, focusing on differences from the first embodiment. Further, parts common to those in the first embodiment will be denoted by the same terms and the same reference signs.

Figure 10:
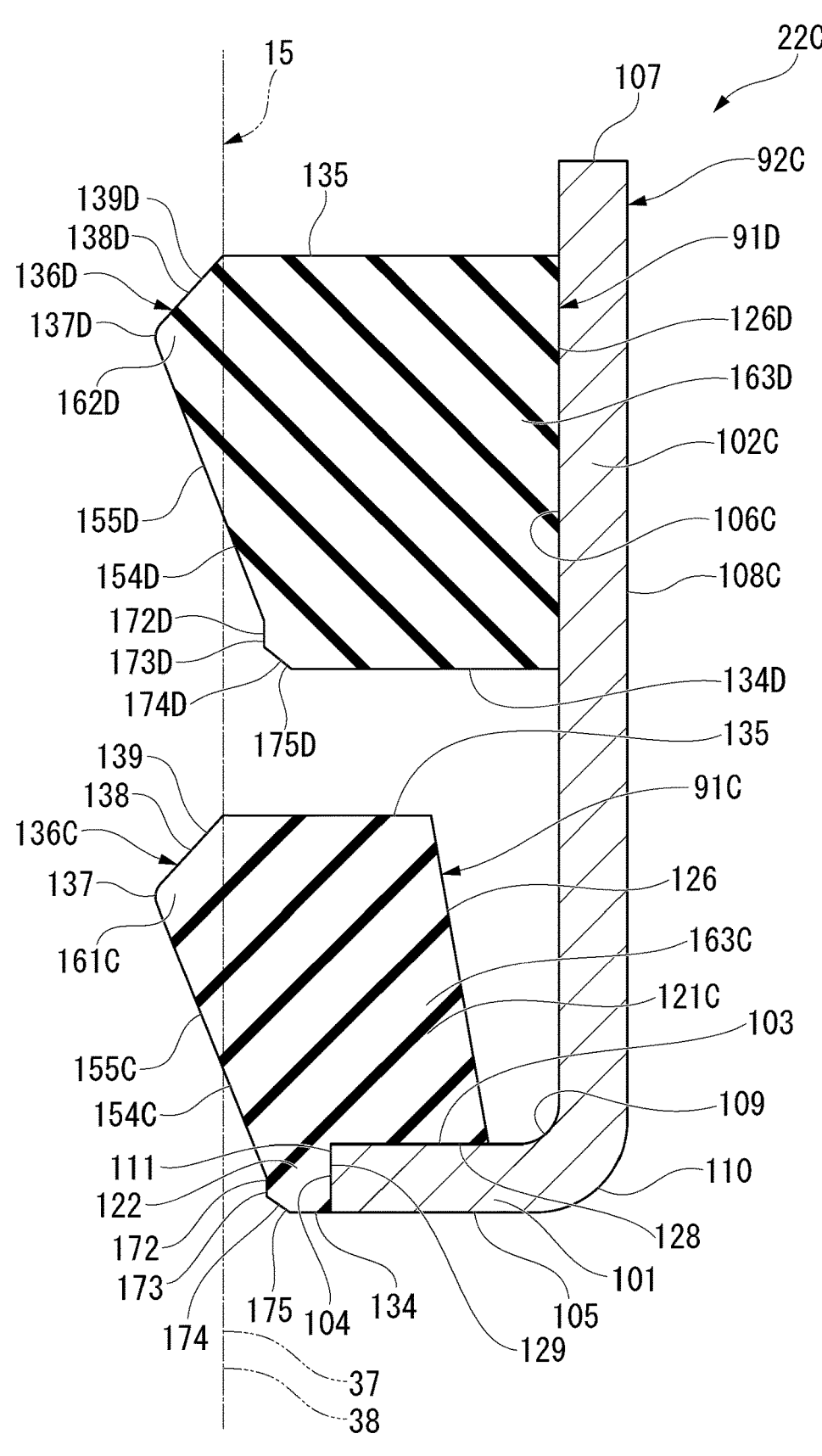
FIG. 10 is a one-side cross-sectional view illustrating a friction member of a shock absorber according to a fourth embodiment of the present invention.

In the fourth embodiment, instead of the friction member 22 of the first embodiment, a friction member 22C whose cross section on one side is illustrated in FIG. 10 is provided. Further, also in FIG. 10. the friction member 22C in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22C of the fourth embodiment includes a base part 92C that is partially different from the base part 92 of the first embodiment, an annular friction member main body part 91C that is partially different from the friction member main body part 91 of the first embodiment, and an annular friction member main body part 91D that is different from the friction member main body part 91C. The base part 92C and the friction member main body parts 91C and 91D are integrated.

The base part 92C includes an annular disc part 101 similar to that of the first embodiment, and a cylindrical fixing part 102C which is longer than the fixing part 102 of the first embodiment in an axial direction. That is, the fixing part 102C has an inner circumferential surface 106C that is longer than the inner circumferential surface 106 in the axial direction, and an outer circumferential surface 108C that is longer than the outer circumferential surface 108 in the axial direction.

The friction member main body part 91C includes a main body part 121C that is partially different from the main body part 121 of the first embodiment, and an inner covering part 122 that is similar to that of the first embodiment.

The friction member main body part 91C has an inner circumferential surface 136C that is partially different from the inner circumferential surface 136 of the first embodiment. In the friction member main body part 91C, an inner circumferential portion thereof includes a minimum inner diameter part 137, a distal end side tapered part 139, a constant diameter part 173, and a tapered part 175, all of which are similar to those in the first embodiment.

The inner circumferential portion of the friction member main body part 91C includes a base end side tapered part 155C having a tapered inner circumferential surface 154C that becomes larger in diameter with distance away from the minimum inner diameter part 137 toward a side opposite to a distal end surface 135 in an axial direction from the minimum inner diameter part 137. An inner circumferential surface 172 of the constant diameter part 173 extends from an end portion of the inner circumferential surface 154C on a side opposite to the minimum inner diameter part 137.

In the friction member main body part 91C, the minimum inner diameter part 137, and the distal end side tapered part 139 and the base end side tapered part 155C on both sides of the minimum inner diameter part 137 in the axial direction constitute a first lip part 161C (friction part). Therefore, the first lip part 161C includes the minimum inner diameter part 137, and an inner circumferential surface 138 and the inner circumferential surface 154C on both sides of the minimum inner diameter part 137 in the axial direction. The first lip part 161C has an annular shape that is continuous over the entire circumference of the friction member main body part 91C. The first lip part 161C protrudes radially inward from an annular base part 163C of the friction member main body part 91C excluding the first lip part 161C.

The friction member main body part 91D is made of the same elastic rubber material as the friction member main body part 91C having good sliding ability such as nitrile rubber or fluoro-rubber, and has an annular shape that is made to coincide with the base part 92C in central axis. An outer circumferential surface 126D of the friction member main body part 91D is fixed to the inner circumferential surface 106C of the base part 92C in its entire surface. The friction member main body part 91D has a distal end surface 135D extending parallel to a distal end surface 107 of the base part 92C on a side opposite to the friction member main body part 91C in the axial direction. The friction member main body part 91D has an end surface 134D extending parallel to the distal end surface 135D on the friction member main body part 91C side in the axial direction. In the friction member main body part 91D, the distal end surface 135D, the end surface 134D, and an inner circumferential surface 136D are exposed without being fixed to the base part 92C.

The inner circumferential surface 136D at an inner circumferential portion of the friction member main body part 91D has the same shape as the inner circumferential surface 136C of the friction member main body part 91C. That is, the friction member main body part 91D includes a minimum inner diameter part 137D similar to the minimum inner diameter part 137, an inner circumferential surface 138D similar to the inner circumferential surface 138, an inner circumferential surface 154D similar to the inner circumferential surface 154C, an inner circumferential surface 172D similar to the inner circumferential surface 172, and an inner circumferential surface 174D similar to an inner circumferential surface 174. Therefore, the friction member main body part 91D includes a distal end side tapered part 139D similar to the distal end side tapered part 139, a base end side tapered part 155D similar to the base end side tapered part 155C, a constant diameter part 173D similar to the constant diameter part 173, and a tapered part 175D similar to the tapered part 175.

In the friction member main body part 91D, the minimum inner diameter part 137D, and the distal end side tapered part 139D and the base end side tapered part 155D on both sides of the minimum inner diameter part 137D in the axial direction constitute a second lip part 162D (friction part). Therefore, the second lip part 162D includes the minimum inner diameter part 137D, and the inner circumferential surface 138D and the inner circumferential surface 154D on both sides of the minimum inner diameter part 137D in the axial direction. The second lip part 162D has an annular shape. The second lip part 162D protrudes radially inward from an annular base part 163D of the friction member main body part 91D excluding the second lip part 162D.

The minimum inner diameter part 137 of the friction member main body part 91C and the minimum inner diameter part 137D of the friction member main body part 91D have the same diameter, and therefore the first lip part 161C and the second lip part 162D have the same inner diameter. The friction member main body part 91D is fixed to the fixing part 102C of the base part 92C, and the friction member main body part 91D is not fixed to the fixing part 102C. Therefore, the first lip part 161C is more likely to be elastically deformed and has a lower rigidity than the second lip part 162D. A difference in rigidity, that is, a ratio of rigidity between the first lip part 161C and the second lip part 162D is preferably, for example, 1:10 or more.

The friction member 22C having the above-described structure is fixed when the fixing part 102C of the base part 92C is fitted into the intermediate diameter hole portion 55 of the rod guide 20 illustrated in FIG. 2 in a state in which the friction member main body part 91C having the first lip part 161C is disposed on an inner side of the friction member main body part 91D having the second lip part 162D in a cylinder inward and outward direction.

Then, the main shaft part 38 of the piston rod 15 is inserted through the inside of the friction member main body parts 91C and 91D of the friction member 22C with a predetermined fastening allowance. Therefore, the friction member 22C is in close contact with the main shaft part 38 of the piston rod 15 at the first lip part 161C and the second lip part 162D while both the friction member main body parts 91C and 91D are elastically deformed outward in the radial direction. The friction member 22C is fixed to the cylinder 19 via the rod guide 20 such that both the first lip part 161C and the second lip part 162D are in sliding contact with the piston rod 15.

In the friction member 22C, the first lip part 161C and the second lip part 162D have the same inner diameter, axial length, and shape when they are not in sliding contact with the piston rod 15, but differ in rigidity. Specifically, a rigidity of the first lip part 161C is lower than a rigidity of the second lip part 162D. In the friction member 22C, the first lip part 161C and the second lip part 162D are formed of an elastic body of the same material and come into contact with the piston rod 15. Shapes of portions at which the first lip part 161C and the second lip part 162D are supported by the base part 92C are different.

The friction member 22C of the fourth embodiment described above is configured so that, when the piston rod 15 moves to, for example, an extension side from a state in which it is stopped with respect to the cylinder 19, at the beginning of the movement, both the first lip part 161C and the second lip part 162D are elastically deformed to follow the piston rod 15 without slipping. At this time, both the first lip part 161C and the second lip part 162C apply an elastic force to the piston rod 15. Therefore, during this period, both the first lip part 161C and the second lip part 162C are in a dynamic spring region.

Thereafter, of the first lip part 161C and the second lip part 162D, while the first lip part 161C with a low rigidity is elastically deformed and follows the piston rod 15 without slipping to continuously apply an elastic force, the second lip part 162D with a high rigidity slides with respect to the piston rod 15 to generate a frictional force. Therefore, during this period, the first lip part 161C is in the dynamic spring region, and the second lip part 162D is in a dynamic friction region.

Thereafter, both the first lip part 161C and the second lip part 162D slide with respect to the piston rod 15 to generate a frictional force. Therefore, during this period, the first lip part 161C and the second lip part 162D are both in the dynamic friction region.

The same applies to a compression stroke.

That is, in the friction member 22C, the first lip part 161C and the second lip part 162D each start to slide with respect to relative movement of the cylinder 19 and the piston rod 15 at a timing different from each other and generate an adjustable frictional force. Therefore, an acting force of the friction member 22C on the piston rod 15 can be changed smoothly. Therefore, ride comfort of the vehicle can be made satisfactory as in the first embodiment.

In the fourth embodiment, the friction member main body part 91C having the first lip part 161C and the friction member main body part 91D having the second lip part 162D of the friction member 22C are made different in rigidity, and thereby timings at which they start to slide with respect to the piston rod 15 are made different. Therefore, a timing of starting to slide with respect to the piston rod 15 can be made different with a simple structure.

In the fourth embodiment, since the friction member main body part 91C having the first lip part 161C and the friction member main body part 91D having the second lip part 162D in the friction member 22C are separately formed with a space therebetween, respective characteristics can be easily adjusted individually.

Fifth Embodiment

Next, a fifth embodiment according to the present invention will be described mainly on the basis of FIG. 11, focusing on differences from the third embodiment. Further, parts common to those in the third embodiment will be denoted by the same terms and the same reference signs.

Figure 11:
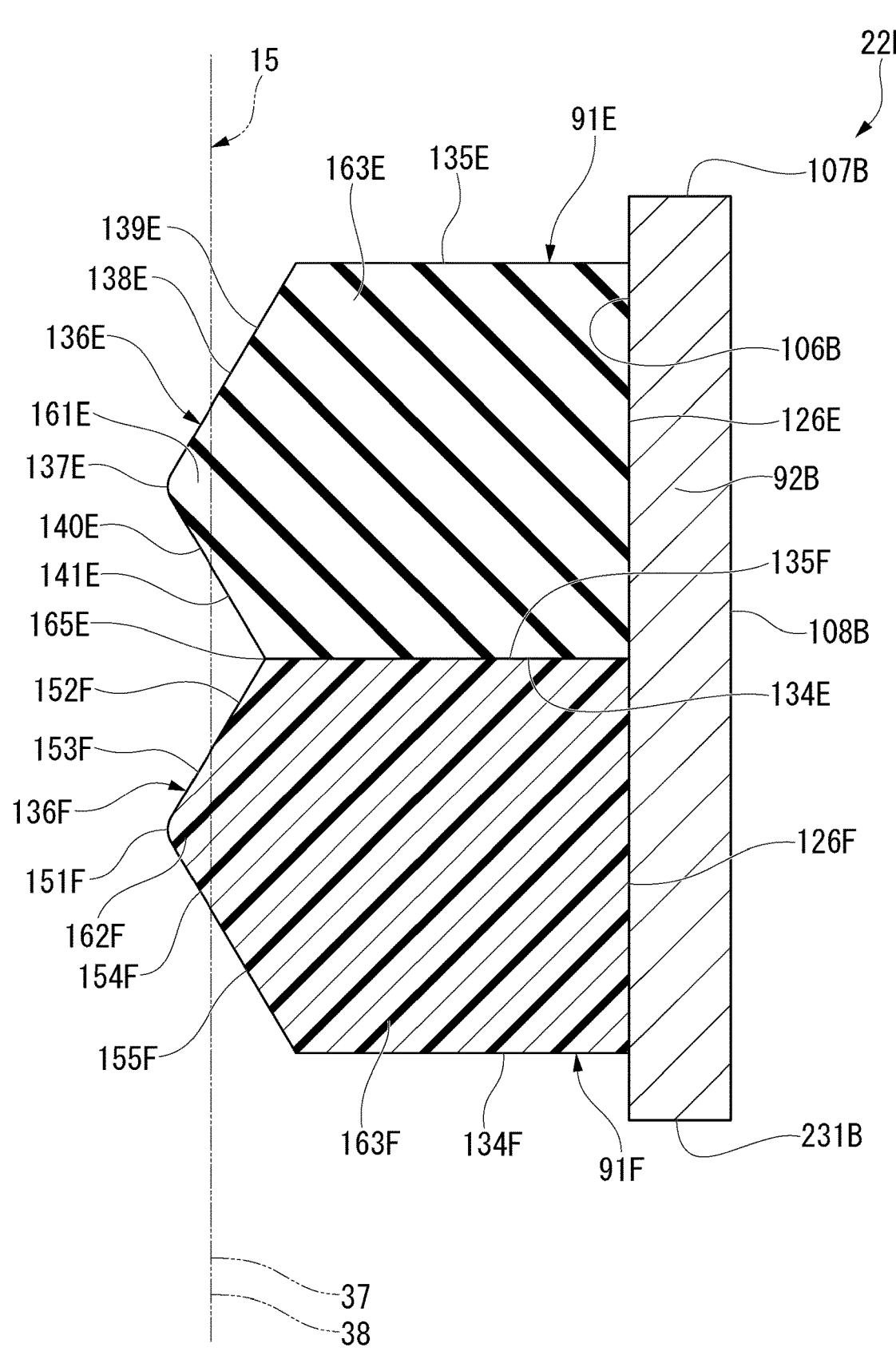
FIG. 11 is a one-side cross-sectional view illustrating a friction member of a shock absorber according to a fifth embodiment of the present invention.

In the fifth embodiment, instead of the friction member 22B of the third embodiment, a friction member 22E whose cross section on one side is illustrated in FIG. 11 is provided. Further, also in FIG. 11. the friction member 22E in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22E of the fifth embodiment includes a base part 92B similar to that of the third embodiment, and a friction member main body part 91E and a friction member main body part 91F that are different from the friction member main body part 91B of the third embodiment.

As in the friction member main body part 91B, the friction member main body part 91E is made of an elastic rubber material having good sliding ability such as nitrile rubber or fluoro-rubber, and has an annular shape that is made to coincide with the base part 92B in central axis. An outer circumferential surface 126E of the friction member main body part 91E is fixed to an inner circumferential surface 106B of the base part 92B in its entire surface. The friction member main body part 91E has a distal end surface 135E extending parallel to a distal end surface 107B of the base part 92B. The friction member main body part 91E has an end surface 134E parallel to the distal end surface 135E. In the friction member main body part 91E, the distal end surface 135E and the inner circumferential surface 136E are exposed without being fixed to the base part 92B.

In the friction member main body part 91E, an inner circumferential portion thereof includes an annular minimum inner diameter part 137E having a minimum diameter in the friction member main body part 91E and a minimum diameter even in the friction member 22E, a distal end side tapered part 139E having a tapered inner circumferential surface 138E that becomes larger in diameter with distance away from the minimum inner diameter part 137E toward the distal end surface 135E side in the axial direction from the minimum inner diameter part 137E, and an intermediate tapered part 141E having a tapered inner circumferential surface 140E that becomes larger in diameter with distance away from the minimum inner diameter part 137E toward a side opposite to the distal end surface 135E in the axial direction from the minimum inner diameter part 137E. The distal end surface 135E extends outward in a radial direction from an end portion of the inner circumferential surface 138E of the distal end side tapered part 139E on a side opposite to the minimum inner diameter part 137E. The end surface 134E extends outward in the radial direction from an end portion of the inner circumferential surface 140E of the intermediate tapered part 141E on a side opposite to the minimum inner diameter part 137E.

The friction member main body part 91F is made of a plastic material such as nylon or Pelprene, and has an annular shape that is made to coincide with the base part 92B in central axis. An outer circumferential surface 126F of the friction member main body part 91F is fixed to the inner circumferential surface 106B of the base part 92B in its entire surface. The friction member main body part 91F has a distal end surface 135F that is fixed to the end surface 134E of the friction member main body part 91E. The friction member main body part 91F has an end surface 134F parallel to the distal end surface 135F. The end surface 134F extends parallel to a base end surface 231B of the base part 92B. In the friction member main body part 91F, the end surface 134F and the inner circumferential surface 136F are exposed without being fixed to the base part 92B.

In the friction member main body part 91F, an inner circumferential portion thereof includes an annular minimum inner diameter part 151F having a minimum diameter in the friction member main body part 91F and a minimum diameter even in the friction member 22E, an intermediate tapered part 153F having a tapered inner circumferential surface 152F that becomes larger in diameter with distance away from the minimum inner diameter part 151F toward the distal end surface 135F side in the axial direction from the minimum inner diameter part 151F, and a base end side tapered part 155F having a tapered inner circumferential surface 154F that becomes larger in diameter with distance away from the minimum inner diameter part 151F toward the end surface 134F side in the axial direction from the minimum inner diameter part 151F. The distal end surface 135F extends outward in the radial direction from an end portion of the inner circumferential surface 152F of the intermediate tapered part 153F on a side opposite to the minimum inner diameter part 151F. The end surface 134F extends outward in the radial direction from an end portion of the inner circumferential surface 154F of the base end side tapered part 155F on a side opposite to the minimum inner diameter part 151F. The inner circumferential surface 152F of the intermediate tapered part 153F extends from an end portion of the inner circumferential surface 140E of the intermediate tapered part 141E on a side opposite to the minimum inner diameter part 137E.

The distal end surface 135F of the friction member main body part 91F is adhered to the end surface 134E of the friction member main body part 91E. The friction member main body part 91E and the friction member main body part 91F are mirror-symmetrical with respect to the end surface 134E and the distal end surface 135F. Therefore, the friction member main body part 91E and the friction member main body part 91F have the same length in the axial direction.

In the friction member main body part 91E, the minimum inner diameter part 137E, and the distal end side tapered part 139E and the intermediate tapered part 141E on both sides of the minimum inner diameter part 137E in the axial direction constitute a first lip part 161E (friction part). Therefore, the first lip part 161E includes the minimum inner diameter part 137E, and the inner circumferential surface 138E and the inner circumferential surface 140E on both sides of the minimum inner diameter part 137E in the axial direction.

In the friction member main body part 91F, the minimum inner diameter part 151F, and the intermediate tapered part 153F and the base end side tapered part 155F on both sides of the minimum inner diameter part 151F in the axial direction constitute a second lip part 162F (friction part). Therefore, the second lip part 162F includes the minimum inner diameter part 151F, and the inner circumferential surface 152F and the inner circumferential surface 154F on both sides of the minimum inner diameter part 151F in the axial direction.

The first lip part 161E and the second lip part 162F are both annular. The first lip part 161E protrudes radially inward from an annular base part 163E of the friction member main body part 91E excluding the first lip part 161E. The second lip part 162F protrudes radially inward from an annular base part 163F of the friction member main body part 91F excluding the second lip part 162F. Due to formation of the first lip part 161E and the second lip part 162F, the friction member 22E has an annular recessed part 165E therebetween that is recessed radially outward with respect to the minimum inner diameter part 137E and the minimum inner diameter part 151F.

The friction member main body part 91E and the friction member main body part 91F are formed of materials that are different in coefficient of dynamic friction and coefficient of static friction. Since the first lip part 161E is included in the friction member main body part 91E and the second lip part 162F is included in the friction member main body part 91F, the second lip part 162F is formed of a material different from that of the first lip part 161E in coefficient of dynamic friction and coefficient of static friction. The first lip part 161E made of a rubber material has both coefficients of static friction and dynamic friction higher than those of the second lip part 162F made of a plastic material.

The minimum inner diameter part 137E and the minimum inner diameter part 151F have the same diameter. Therefore, the first lip part 161E and the second lip part 162F have the same inner diameter. An amount of protrusion of the first lip part 161E from the base part 163E in the radial direction is the same as an amount of protrusion of the second lip part 162F from the base part 163F in the radial direction. A length of the first lip part 161E in the axial direction is equal to a length of the second lip part 162F in the axial direction. In the friction member 22E, the first lip part 161E made of a rubber material is more likely to be elastically deformed and has a lower rigidity than the second lip part 162F made of a plastic material.

An inner circumferential portion of the friction member main body part 91E and the friction member main body part 91F is constituted only by the distal end side tapered part 139E, the minimum inner diameter part 137E, the intermediate tapered part 141E, the intermediate tapered part 153F, the minimum inner diameter part 151F, and the base end side tapered part 155F described above. In the inner circumferential portion of the friction member main body part 91E and the friction member main body part 91F, a boundary portion between the distal end side tapered part 139E and the intermediate tapered part 141E is the minimum inner diameter part 137E that has a smallest diameter, and a boundary portion between the intermediate tapered part 153F and the base end side tapered part 155F is the minimum inner diameter part 151F that has a smallest diameter.

The inner circumferential surface 138E, the minimum inner diameter part 137E, the inner circumferential surface 140E, the inner circumferential surface 152F, the minimum inner diameter part 151F, and the inner circumferential surface 154F all have an annular shape that is continuous over the entire circumference of the friction member main body part 91E and friction member main body part 91F in the circumferential direction. Therefore, the first lip part 161E, the second lip part 162F, and the recessed part 165E also all have an annular shape that is continuous over the entire circumference of the friction member main body part 91E and friction member main body part 91F in the circumferential direction. In the friction member main body part 91E and the friction member main body part 91F, the outer circumferential surfaces 126E and 126F, the distal end surfaces 135E and 135F, the inner circumferential surface 138E, the minimum inner diameter part 137E, the inner circumferential surface 140E, the inner circumferential surface 152F, the minimum inner diameter part 151F, the inner circumferential surface 154F, and the end surfaces 134E and 134F are made to coincide with the base part 92B in central axis.

Both the minimum inner diameter part 137E and the minimum inner diameter part 151F have a diameter smaller than an outer diameter of the main shaft part 38 of the piston rod 15, that is, a diameter of the outer circumferential surface 37. Therefore, after the piston rod 15 is inserted, both the minimum inner diameter part 137E and the minimum inner diameter part 151F are in contact with the main shaft part 38 of the piston rod 15 with a fastening allowance. In other words, after the piston rod 15 is inserted, both the first lip part 161E and the second lip part 162F are in contact with the main shaft part 38 of the piston rod 15 with a fastening allowance. After the piston rod 15 is inserted, the friction member 22E has a gap formed in the radial direction between the recessed part 165E and the main shaft part 38 of the piston rod 15.

The friction member 22E having the above-described structure is fixed when the base part 92B is fitted into the intermediate diameter hole portion 55 of the rod guide 20 illustrated in FIG. 2 in a state in which the first lip part 161E is disposed on an outer side of the second lip part 162F in a cylinder inward and outward direction.

Then, the main shaft part 38 of the piston rod 15 is inserted through the inside of the friction member main body part 91E and the friction member main body part 91F of the friction member 22E with a predetermined fastening allowance. Therefore, the friction member main body part 91E and the friction member main body part 91F of the friction member 22E come into close contact with the main shaft part 38 of the piston rod 15 at the first lip part 161E and the second lip part 162F. The friction member 22E is fixed to the cylinder 19 via the rod guide 20 such that both the first lip part 161E and the second lip part 162F are in sliding contact with the piston rod 15.

The first lip part 161E and the second lip part 162F have the same inner diameter and axial length as each other when they are not in sliding contact with the piston rod 15, and thus the friction member 22E has a mirror-symmetrical shape. In the friction member 22E, the first lip part 161E and the second lip part 162F are formed of materials having different coefficients of static friction and coefficients of dynamic friction, and come into contact with the piston rod 15.

The friction member 22E of the fifth embodiment described above is configured so that, when the piston rod 15 moves to, for example, an extension side from a state in which it is stopped with respect to the cylinder 19, at the beginning of the movement, both the first lip part 161E and the second lip part 162F are elastically deformed to follow the piston rod 15 without slipping. At this time, both the first lip part 161E and the second lip part 162F apply an elastic force to the piston rod 15. Therefore, during this period, both the first lip part 161E and the second lip part 162F are in the dynamic spring region.

Thereafter, of the first lip part 161E and the second lip part 162F, while the first lip part 161E with a low rigidity is elastically deformed and follows the piston rod 15 without slipping to continuously apply an elastic force, the second lip part 162F with a low rigidity slides with respect to the piston rod 15 to generate a frictional force. Therefore, during this period, the first lip part 161E is in the dynamic spring region, and the second lip part 162F is in a dynamic friction region.

Thereafter, both the first lip part 161E and the second lip part 162F slide with respect to the piston rod 15 to generate a frictional force. Therefore, during this period, the first lip part 161E and the second lip part 162F are both in the dynamic friction region.

The same applies to a compression stroke.

That is, in the friction member 22E, the first lip part 161E and the second lip part 162F each start to slide with respect to relative movement of the cylinder 19 and the piston rod 15 at a timing different from each other and generate an adjustable frictional force. Therefore, an acting force of the friction member 22E on the piston rod 15 can be changed smoothly. Therefore, ride comfort of the vehicle can be made satisfactory as in the first embodiment.

In the fifth embodiment, since the first lip part 161E and the second lip part 162F of the friction member 22E are formed of materials having different coefficients of dynamic friction and coefficients of static friction, timings at which the first lip part 161E and the second lip part 162F start to slide with respect to the piston rod 15 can be easily made different.

Sixth Embodiment

Next, a sixth embodiment according to the present invention will be described mainly on the basis of FIG. 12, focusing on differences from the fifth embodiment. Further, parts common to those in the fifth embodiment will be denoted by the same terms and the same reference signs.

Figure 12:
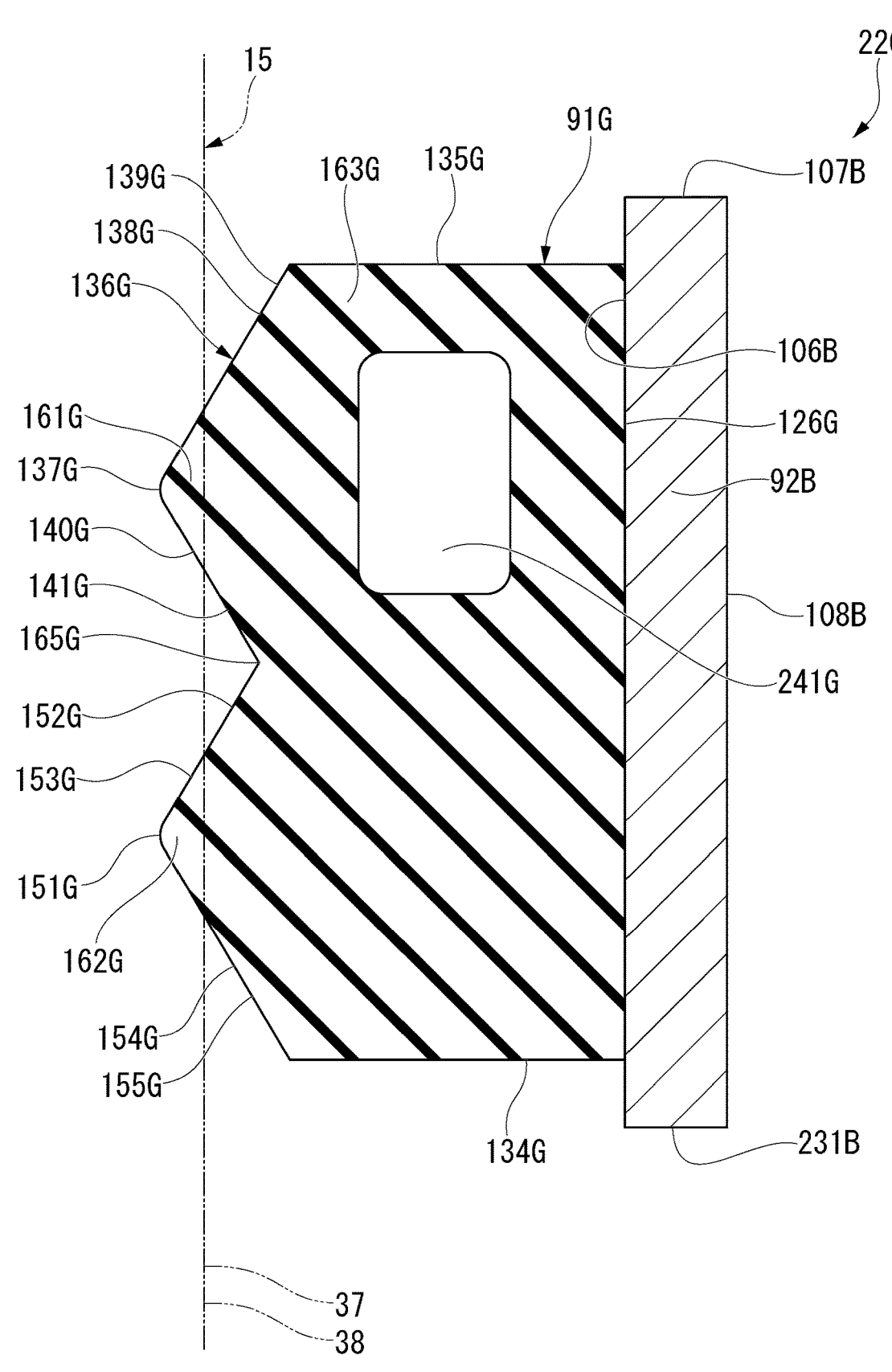
FIG. 12 is a one-side cross-sectional view illustrating a friction member of a shock absorber according to a sixth embodiment of the present invention.

In the sixth embodiment, instead of the friction member 22E of the fifth embodiment, a friction member 22G whose cross section on one side is illustrated in FIG. 12 is provided. Further, also in FIG. 12, the friction member 22G in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22G of the sixth embodiment includes a base part 92B similar to that of the fifth embodiment, and one friction member main body part 91G that is different from the friction member main body part 91E and the friction member main body part 91F of the fifth embodiment.

The friction member main body part 91G is entirely made of an elastic rubber material having good sliding ability such as nitrile rubber or fluoro-rubber similar to that of the friction member main body part 91E, and has an annular shape that is made to coincide with the base part 92B in central axis. An outer circumferential surface 126G of the friction member main body part 91G is fixed to an inner circumferential surface 106B of the base part 92B in its entire surface. The friction member main body part 91G has a distal end surface 135G having a shape similar to that of the distal end surface 135E, an end surface 134G having a shape similar to that of the end surface 134F, and an inner circumferential surface 136G having a shape similar to that of the inner circumferential surfaces 136E and 136F.

The inner circumferential surface 136G includes an inner circumferential surface 138G having a shape similar to that of the inner circumferential surface 138E, a minimum inner diameter part 137G having a shape similar to that of the minimum inner diameter part 137E, an inner circumferential surface 140G having a shape similar to that of the inner circumferential surface 140E, an inner circumferential surface 152G having a shape similar to that of the inner circumferential surface 152F, a minimum inner diameter part 151G having a shape similar to that of the minimum inner diameter part 151F, and an inner circumferential surface 154G having a shape similar to that of the inner circumferential surface 154F.

Therefore, the friction member main body part 91G includes a distal end side tapered part 139G having a shape similar to that of the distal end side tapered part 139E, an intermediate tapered part 141G having a shape similar to that of the intermediate tapered part 141E, an intermediate tapered part 153G having a shape similar to that of the intermediate tapered part 153F, a base end side tapered part 155G having a shape similar to that of the base end side tapered part 155F, a first lip part 161G (friction part) having a shape similar to that of the first lip part 161E, a second lip part 162G (friction part) having a shape similar to that of the second lip part 162F, and a recessed part 165G having a shape similar to that of the recessed part 165E.

In the friction member main body part 91G, a portion other than the first lip part 161E and the second lip part 162F is a base part 163G. A hollow portion 241G is formed in the base part 163G at a portion overlapping the first lip part 161G in position in an axial direction. The hollow portion 241G has an annular shape that is continuous over the entire circumference of the friction member main body part 91G. Further, the hollow portion 241G may be intermittently formed at regular intervals in a circumferential direction of the friction member main body part 91G. The hollow portion 241G is made to coincide with the base part 92B in central axis.

The friction member main body part 91G has a seamless integral shape and is formed of the same elastic material in its entirety. Since the first lip part 161G and the second lip part 162G are included in the friction member main body part 91G, they are formed of an elastic body of the same material.

The minimum inner diameter part 137G and the minimum inner diameter part 151G have the same diameter. Therefore, the first lip part 161G and the second lip part 162G have the same inner diameter. An amount of protrusion of the first lip part 161G from the base part 163G is the same as an amount of protrusion of the second lip part 162G from the base part 163G. A length of the first lip part 161G in the axial direction is the same as a length of the second lip part 162G in the axial direction. Since the hollow portion 241G is formed at a portion of the base part 163G that overlaps the first lip part 161G in position in the axial direction, the first lip part 161G is more likely to be elastically deformed and has a lower rigidity than the second lip part 162G.

Both the minimum inner diameter part 137G and the minimum inner diameter part 151G have a diameter smaller than an outer diameter of the main shaft part 38 of the piston rod 15, that is, a diameter of the outer circumferential surface 37. Therefore, after the piston rod 15 is inserted, both the minimum inner diameter part 137G and the minimum inner diameter part 151G are in contact with the main shaft part 38 of the piston rod 15 with a fastening allowance. In other words, after the piston rod 15 is inserted, both the first lip part 161G and the second lip part 162G are elastically deformed in a radial direction to be in contact with the main shaft part 38 of the piston rod 15 with a fastening allowance. After the piston rod 15 is inserted, the friction member 22G has a gap formed in the radial direction between the recessed part 165G and the main shaft part 38 of the piston rod 15.

The friction member 22G having the above-described structure is fixed when the base part 92B is fitted into the intermediate diameter hole portion 55 of the rod guide 20 illustrated in FIG. 2 in a state in which the first lip part 161G is disposed on an outer side of the second lip part 162G in a cylinder inward and outward direction.

Therefore, the main shaft part 38 of the piston rod 15 is inserted through the inside of the friction member main body part 91G of the friction member 22G with a predetermined fastening allowance. Therefore, the friction member main body part 91G of the friction member 22G is in close contact with the main shaft part 38 of the piston rod 15 at the first lip part 161G and the second lip part 162G. The friction member 22G is fixed to the cylinder 19 via the rod guide 20 such that both the first lip part 161G and the second lip part 162G are in sliding contact with the piston rod 15.

The first lip part 161G and the second lip part 162G have the same inner diameter and axial length as each other when they are not in sliding contact with the piston rod 15, and thus the friction member 22G has a mirror-symmetrical shape. In the friction member 22G, rigidity of the first lip part 161G and the second lip part 162G are different, and specifically, a rigidity of the first lip part 161G that overlaps the hollow portion 241G in position is lower than a rigidity of the second lip part 162G that does not overlap the hollow portion 241G in position. In the friction member 22G, the first lip part 161G and the second lip part 162G are formed of an elastic body of the same material and come into contact with the piston rod 15.

The friction member 22G of the sixth embodiment described above is configured so that, when the piston rod 15 moves to, for example, an extension side from a state in which it is stopped with respect to the cylinder 19, at the beginning of the movement, both the first lip part 161G and the second lip part 162G are elastically deformed to follow the piston rod 15 without slipping. At this time, both the first lip part 161G and the second lip part 162G apply an elastic force to the piston rod 15. Therefore, during this period, both the first lip part 161G and the second lip part 162G are in a dynamic spring region.

Thereafter, of the first lip part 161G and the second lip part 162G, while the first lip part 161G with a low rigidity is elastically deformed and follows the piston rod 15 without slipping to continuously apply an elastic force, the second lip part 162G with a high rigidity slides with respect to the piston rod 15 to generate a frictional force. Therefore, during this period, the first lip part 161G is in the dynamic spring region, and the second lip part 162G is in a dynamic friction region.

Thereafter, both the first lip part 161G and the second lip part 162G slide with respect to the piston rod 15 to generate a frictional force. Therefore, during this period, the first lip part 161G and the second lip part 162G are both in the dynamic friction region.

The same applies to a compression stroke.

That is, in the friction member 22G, the first lip part 161G and the second lip part 162G each start to slide with respect to relative movement of the cylinder 19 and the piston rod 15 at a timing different from each other and generate an adjustable frictional force.

In the sixth embodiment, the first lip part 161G and the second lip part 162G of the friction member 22G each start to slide with respect to the relative movement of the cylinder 19 and the piston rod 15 at a timing different from each other to generate a frictional force. Therefore, an acting force of the friction member 22G on the piston rod 15 can be changed smoothly. Therefore, ride comfort of the vehicle can be made satisfactory as in the first embodiment.

In the sixth embodiment, the first lip part 161G and the second lip part 162G are formed of an elastic body of the same material and are different in rigidity due to the hollow portion 241G formed in the base part 163G, timings at which the first lip part 161G and the second lip part 162G start to slide with respect to the piston rod 15 can be easily made different.

Seventh Embodiment

Next, a seventh embodiment according to the present invention will be described mainly on the basis of FIG. 13, focusing on differences from the sixth embodiment. Further, parts common to those in the sixth embodiment will be denoted by the same terms and the same reference signs.

Figure 13:
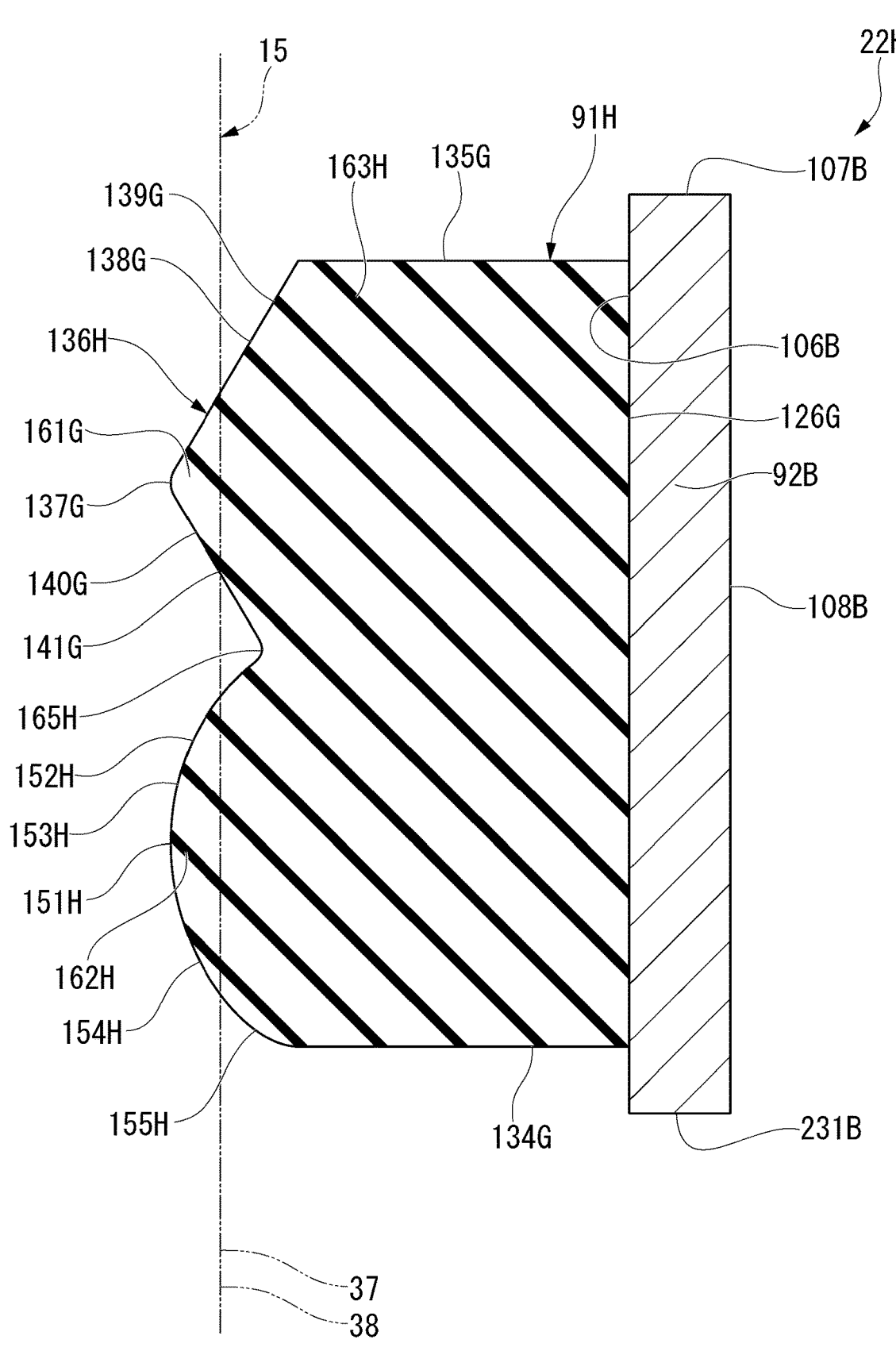
FIG. 13 is a one-side cross-sectional view illustrating a friction member of a shock absorber according to a seventh embodiment of the present invention.

In the seventh embodiment, instead of the friction member 22G of the sixth embodiment, a friction member 22H whose cross section on one side is illustrated in FIG. 13 is provided. Further, also in FIG. 13, the friction member 22H in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22H of the seventh embodiment includes a base part 92B similar to that of the sixth embodiment, and a friction member main body part 91H that is partially different from the friction member main body part 91G of the sixth embodiment.

The friction member main body part 91H includes an outer circumferential surface 126G, a distal end surface 135G, and an end surface 134G which are similar to those of the friction member main body part 91G, and an inner circumferential surface 136H that is partially different from the inner circumferential surface 136G.

In the friction member main body part 91H, an inner circumferential portion thereof includes a minimum inner diameter part 137G, a distal end side tapered part 139G having an inner circumferential surface 138G, and an intermediate tapered part 141G having an inner circumferential surface 140G, all of which are similar to those of the friction member main body part 91G.

In the friction member main body part 91H, an inner circumferential portion thereof includes an annular minimum inner diameter part 151H having a minimum diameter in the friction member main body part 91H and a minimum diameter even in the friction member 22H, an intermediate curved part 153H having a curved inner circumferential surface 152H that becomes larger in diameter with distance away from the minimum inner diameter part 151H toward the distal end surface 135G side in an axial direction from the minimum inner diameter part 151H, and a base end side curved part 155H having a curved inner circumferential surface 154H that becomes larger in diameter with distance away from the minimum inner diameter part 151H toward the end surface 134G side in the axial direction from the minimum inner diameter part 151H. The end surface 134G extends outward in a radial direction from an end portion of the inner circumferential surface 154H of the base end side curved part 155H on a side opposite to the minimum inner diameter part 151H. The inner circumferential surface 152H of the intermediate curved part 153H extends from an end portion of the inner circumferential surface 140G of the intermediate tapered part 141G on a side opposite to the minimum inner diameter part 137G. A cross section of the minimum inner diameter part 151H, the inner circumferential surface 152H, and the inner circumferential surface 154H in a plane including a central axis of the friction member main body part 91H has an arc shape.

In the friction member main body part 91H, the minimum inner diameter part 137G, and the distal end side tapered part 139G and the intermediate tapered part 141G on both sides of the minimum inner diameter part 137G in the axial direction constitute a first lip part 161G (friction part). Therefore, the first lip part 161G includes the minimum inner diameter part 137G, and the inner circumferential surface 138G and the inner circumferential surface 140G on both sides of the minimum inner diameter part 137G in the axial direction.

In the friction member main body part 91H, the minimum inner diameter part 151H, and the intermediate curved part 153H and the base end side curved part 155H on both sides of the minimum inner diameter part 151H in the axial direction constitute a second lip part 162H (friction part). Therefore, the second lip part 162H includes the minimum inner diameter part 151H, and the inner circumferential surface 152H and the inner circumferential surface 154H on both sides of the minimum inner diameter part 151H in the axial direction.

The first lip part 161G and the second lip part 162H are both annular. The first lip part 161G and the second lip part 162H protrude radially inward from an annular base part 163H of the friction member main body part 91H excluding the first lip part 161G and the second lip part 162H. Due to formation of the first lip part 161G and the second lip part 162H, the friction member 22H has an annular recessed part 165H therebetween that is recessed radially outward with respect to the minimum inner diameter part 137G and the minimum inner diameter part 151H. Further, the hollow portion 241G of the sixth embodiment is not formed in the base part 163H.

The friction member main body part 91H has a seamless integral shape and is formed of the same elastic material in its entirety. Since the first lip part 161G and the second lip part 162H are included in the friction member main body part 91H, they are formed of an elastic body of the same material.

The minimum inner diameter part 137G and the minimum inner diameter part 151H have the same diameter. Therefore, the first lip part 161G and the second lip part 162H have the same inner diameter. An amount of protrusion of the first lip part 161G from the base part 163H in the radial direction is the same as an amount of protrusion of the second lip part 162H from the base part 163H in the radial direction. A length of the first lip part 161G in the axial direction is the same as a length of the second lip part 162H in the axial direction. The second lip part 162H has a volume larger than that of the first lip part 161G. The first lip part 161G and the second lip part 162H have different shapes, and therefore the first lip part 161G is more likely to be elastically deformed and has a lower rigidity than the second lip part 162H.

An inner circumferential portion of the friction member main body part 91H is constituted only by the distal end side tapered part 139G, the minimum inner diameter part 137G, the intermediate tapered part 141G, the intermediate curved part 153H, the minimum inner diameter part 151H, and the base end side curved part 155H which are described above. In the inner circumferential portion of the friction member main body part 91H, a boundary portion between the distal end side tapered part 139G and the intermediate tapered part 141G is the minimum inner diameter part 137G that has a smallest diameter, and a boundary portion between the intermediate curved part 153H and the base end side curved part 155H is the minimum inner diameter part 151H that has a smallest diameter.

The inner circumferential surface 138G, the minimum inner diameter part 137G, the inner circumferential surface 140G, the inner circumferential surface 152H, the minimum inner diameter part 151H, and the inner circumferential surface 154H all have an annular shape that is continuous over the entire circumference of the friction member 22H in a circumferential direction. Therefore, the first lip part 161G, the second lip part 162H, and the recessed part 165H also all have an annular shape that is continuous over the entire circumference of the friction member 22H in the circumferential direction. In the friction member main body part 91H, the outer circumferential surface 126G, the distal end surface 135G, the inner circumferential surface 138G, the minimum inner diameter part 137G, the inner circumferential surface 140G, the inner circumferential surface 152H, the minimum inner diameter part 151H, the inner circumferential surface 154H, and the end surface 134G are made to coincide with the base part 92B in central axis.

Both the minimum inner diameter part 137G and the minimum inner diameter part 151H have a diameter smaller than an outer diameter of the main shaft part 38 of the piston rod 15, that is, a diameter of the outer circumferential surface 37. Therefore, after the piston rod 15 is inserted, both the minimum inner diameter part 137G and the minimum inner diameter part 151H are in contact with the main shaft part 38 of the piston rod 15 with a fastening allowance. In other words, after the piston rod 15 is inserted, both the first lip part 161G and the second lip part 162H are elastically deformed in a radial direction to be in contact with the main shaft part 38 of the piston rod 15 with a fastening allowance. After the piston rod 15 is inserted, the friction member 22H has a gap formed in the radial direction between the recessed part 165H and the main shaft part 38 of the piston rod 15.

The friction member 22H having the above-described structure is fixed when the base part 92B is fitted into the intermediate diameter hole portion 55 of the rod guide 20 illustrated in FIG. 2 in a state in which the first lip part 161G is disposed on an outer side of the second lip part 162H in a cylinder inward and outward direction.

Therefore, the main shaft part 38 of the piston rod 15 is inserted through the inside of the friction member main body part 91H of the friction member 22H with a predetermined fastening allowance. Therefore, the friction member main body part 91H of the friction member 22H is in close contact with the main shaft part 38 of the piston rod 15 at the first lip part 161G and the second lip part 162H. The friction member 22H is fixed to the cylinder 19 via the rod guide 20 such that both the first lip part 161G and the second lip part 162H are in sliding contact with the piston rod 15.

In the friction member 22H, the first lip part 161G and the second lip part 162H have the same inner diameter and axial length when they are not in sliding contact with the piston rod 15. A rigidity of the friction member 22H differs due to a difference in shape, and specifically, a rigidity of the second lip part 162H is higher than a rigidity of the first lip part 161G. In the friction member 22H, the first lip part 161G and the second lip part 162H are formed of an elastic body of the same material and come into contact with the piston rod 15.

The friction member 22H of the seventh embodiment described above is configured so that, when the piston rod 15 moves to, for example, an extension side from a state in which it is stopped with respect to the cylinder 19, at the beginning of the movement, both the first lip part 161G and the second lip part 162H are elastically deformed to follow the piston rod 15 without slipping. At this time, both the first lip part 161G and the second lip part 162H apply an elastic force to the piston rod 15. Therefore, during this period, both the first lip part 161G and the second lip part 162H are in a dynamic spring region.

Thereafter, of the first lip part 161G and the second lip part 162H, while the first lip part 161G with a low rigidity is elastically deformed and follows the piston rod 15 without slipping to continuously apply an elastic force, the second lip part 162H with a high rigidity slides with respect to the piston rod 15 to generate a frictional force. Therefore, during this period, the first lip part 161G is in the dynamic spring region, and the second lip part 162H is in a dynamic friction region.

Thereafter, both the first lip part 161G and the second lip part 162H slide with respect to the piston rod 15 to generate a frictional force. Therefore, during this period, the first lip part 161G and the second lip part 162H are both in the dynamic friction region.

The same applies to a compression stroke.

That is, in the friction member 22H, the first lip part 161G and the second lip part 162H each start to slide with respect to relative movement of the cylinder 19 and the piston rod 15 at a timing different from each other and generate an adjustable frictional force. Therefore, an acting force of the friction member 22H on the piston rod 15 can be changed smoothly. Therefore, ride comfort of the vehicle can be made satisfactory as in the first embodiment.

In the seventh embodiment, the first lip part 161G and the second lip part 162H are formed of an elastic body of the same material and are different in rigidity due to a difference in shape, and therefore timings at which the first lip part 161G and the second lip part 162H start to slide with respect to the piston rod 15 can be easily made different.

Eighth Embodiment

Next, an eighth embodiment according to the present invention will be described mainly on the basis of FIG. 14, focusing on differences from the first embodiment. Further, parts common to those in the first embodiment will be denoted by the same terms and the same reference signs.

In the eighth embodiment, instead of the rod guide 20 of the first embodiment, a rod guide 20J partially different from the rod guide 20 is provided. The rod guide 20J includes a rod guide main body 50J that is partially different from the rod guide main body 50. The rod guide main body 50J includes a fitting hole portion 251J formed on a side of a small diameter hole portion 56 opposite to an intermediate diameter hole portion 55 in an axial direction.

Then, in addition to a friction member 22J fitted in the intermediate diameter hole portion 55, a friction member 22K fitted in the fitting hole portion 251J is provided. The friction member 22J includes a base part 92 similar to that of the friction member 22, and a friction member main body part 91J having a second lip part 162J (friction part) that is partially different from the friction member 22. Similarly to the friction member 22, the friction member 22J is fixed by fitting a fixing part 102 of the base part 92 into the intermediate diameter hole portion 55 of the rod guide 20.

The friction member 22K includes a base part 92K, which is similar to the base part 92, having an annular disc part 101K similar to an annular disc part 101 and a fixing part 102K similar to the fixing part 102, and a friction member main body part 91K having a first lip part 161K (friction part) which is different from those of the friction members 22 and 22J. The friction member 22K is fixed by fitting the fixing part 102K of the base part 92K into the fitting hole portion 251J. A communication groove 57K, which is similar to a communication groove 57 formed in the intermediate diameter hole portion 55, is formed in the fitting hole portion 251J, and a communication passage 95K that allows communication between both sides of the friction member 22K in the axial direction is formed in the communication groove 57K.

Both the second lip part 162J of the friction member 22J and the first lip part 161K of the friction member 22K have a diameter smaller than an outer diameter of a main shaft part 38 of a piston rod 15, that is, a diameter of an outer circumferential surface 37. Therefore, after the piston rod 15 is inserted, both the first lip part 161K and the second lip part 162J are in contact with the main shaft part 38 of the piston rod 15 with a fastening allowance.

The friction member 22J is fixed to a cylinder 19 via the rod guide 20 such that the second lip part 162J is in sliding contact with the piston rod 15. The friction member 22K is fixed to the cylinder 19 via the rod guide 20 such that the first lip part 161K is in sliding contact with the piston rod 15.

The second lip part 162J of the friction member 22J and the first lip part 161K of the friction member 22K differ in rigidity like, for example, the first lip part 161C and the second lip part 162D of the fourth embodiment. The friction member main body part 91J including the second lip part 162J is fixed to the fixing part 102 of the base part 92, and the friction member main body part 91K including the first lip part 161K is separated from the fixing part 102K of the base part 92K. Thereby, a rigidity of the first lip part 161K of the friction member 22K is lower than that of the second lip part 162J of the friction member 22J.

The friction members 22K and 22J of the eighth embodiment described above are configured such that, when the piston rod 15 moves to, for example, an extension side from a state in which it is stopped with respect to the cylinder 19, at the beginning of the movement, both the first lip part 161K and the second lip part 162J are elastically deformed to follow the piston rod 15 without slipping. At this time, both the first lip part 161K and the second lip part 162J apply an elastic force to the piston rod 15. Therefore, during this period, both the first lip part 161K and the second lip part 162J are in a dynamic spring region.

Thereafter, of the first lip part 161K and the second lip part 162J, while the first lip part 161K with a low rigidity is elastically deformed and follows the piston rod 15 without slipping to continuously apply an elastic force, the second lip part 162J with a high rigidity slides with respect to the piston rod 15 to generate a frictional force. Therefore, during this period, the first lip part 161K is in the dynamic spring region, and the second lip part 162J is in a dynamic friction region.

Thereafter, both the first lip part 161K and the second lip part 162J slide with respect to the piston rod 15 to generate a frictional force. Therefore, during this period, the first lip part 161K and the second lip part 162J are both in the dynamic friction region.

The same applies to a compression stroke.

That is, in the friction members 22K and 22J, the first lip part 161K and the second lip part 162J each start to slide with respect to relative movement of the cylinder 19 and the piston rod 15 at a timing different from each other and generate an adjustable frictional force. Therefore, an acting force of the friction members 22K and 22J on the piston rod 15 can be changed smoothly. Therefore, ride comfort of the vehicle can be made satisfactory as in the first embodiment.

In the eighth embodiment, since the friction member 22J having the second lip part 162J and the friction member 22K having the first lip part 161K are separately provided, characteristics of the first lip part 161K and the second lip part 162J can each be easily changed.

Further, in the eighth embodiment, in order to make the second lip part 162J of the friction member 22J and the first lip part 161K of the friction member 22K start to slide at different timings with respect to the piston rod 15, shapes of the friction member main body parts 91J and 91K may be made different as in the third, sixth, and seventh embodiments, or materials for the friction member main body parts 91J and 91K may be made different as in the fifth embodiment.

Ninth Embodiment

Next, a ninth embodiment according to the present invention will be described mainly on the basis of FIG. 15, focusing on differences from the fourth embodiment. Further, parts common to those in the fourth embodiment will be denoted by the same terms and the same reference signs.

Figure 15:
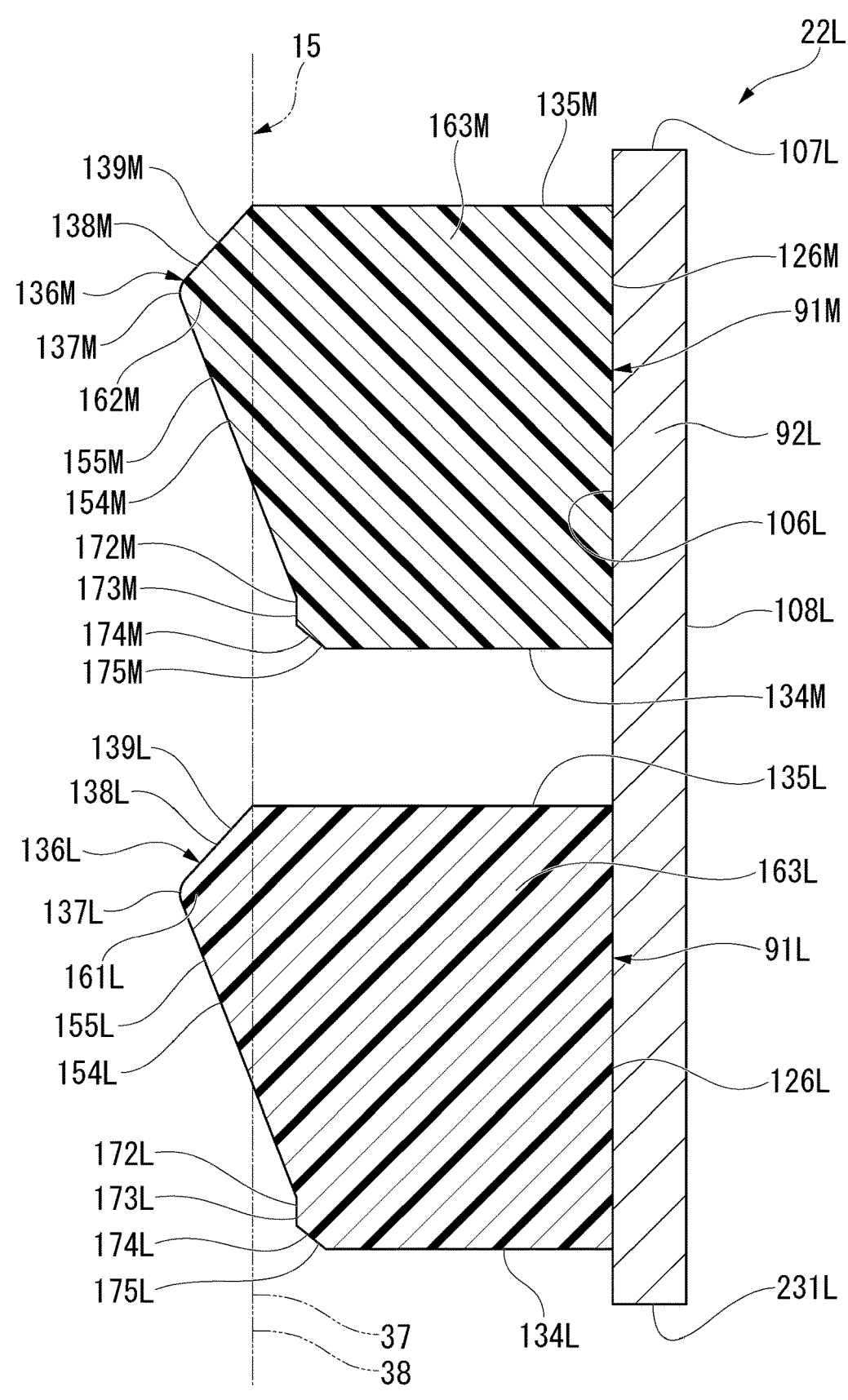
FIG. 15 is a one-side cross-sectional view illustrating a friction member of a shock absorber according to a ninth embodiment of the present invention.

In the ninth embodiment, instead of the friction member 22C of the fourth embodiment, a friction member 22L whose cross section on one side is illustrated in FIG. 15 is provided. Further, also in FIG. 15, the friction member 22L in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22L of the ninth embodiment includes a base part 92L that is different from the base part 92C of the fourth embodiment, an annular friction member main body part 91L that is partially different from the friction member main body part 91C of the fourth embodiment, and a friction member main body part 91M that is partially different from the friction member main body part 91D. The base part 92L and the friction member main body parts 91L and 91M are integrated.

The base part 92L of the friction member 22L has a cylindrical shape. The base part 92L includes an inner circumferential surface 106L formed of a cylindrical surface, a distal end surface 107L formed of a circular flat surface on one side in an axial direction, an outer circumferential surface 108L formed of a cylindrical surface, and a base end surface 231L formed of a circular flat surface on the other side in the axial direction. The distal end surface 107L and the base end surface 231L extend parallel to each other, and the inner circumferential surface 106L and the outer circumferential surface 108L extend coaxially and perpendicular to the distal end surface 107L and the base end surface 231L.

The friction member main body part 91L has a shape similar to that of the friction member main body part 91D. Therefore, the friction member main body part 91L includes an outer circumferential surface 126L having a shape similar to that of the outer circumferential surface 126D and fixed to the inner circumferential surface 106L of the base part 92L, a distal end surface 135L having a shape similar to that of the distal end surface 135D, an end surface 134L having a shape similar to that of the end surface 134D, and an inner circumferential surface 136L having a shape similar to that of the inner circumferential surface 136D.

The inner circumferential surface 136L includes a minimum inner diameter part 137L having a shape similar to that of the minimum inner diameter part 137D, an inner circumferential surface 138L having a shape similar to that of the inner circumferential surface 138D, an inner circumferential surface 154L having a shape similar to that of the inner circumferential surface 154D, an inner circumferential surface 172L having a shape similar to that of the inner circumferential surface 172D, and an inner circumferential surface 174L having a shape similar to that of the inner circumferential surface 174D.

Therefore, the friction member main body part 91L includes a distal end side tapered part 139L having a shape similar to that of the distal end side tapered part 139D, a base end side tapered part 155L having a shape similar to that of the base end side tapered part 155D, a constant diameter part 173L having a shape similar to that of the constant diameter part 173D, a tapered part 175L having a shape similar to that of the tapered part 175D, a first lip part 161L (friction part) having a shape similar to that of the second lip part 162D, and a base part 163L having a shape similar to that of the base part 163D.

The friction member main body part 91M has a shape similar to that of the friction member main body part 91L. Therefore, the friction member main body part 91M includes an outer circumferential surface 126M having a shape similar to that of the outer circumferential surface 126L and fixed to the inner circumferential surface 106L of the base part 92L, a distal end surface 135M having a shape similar to that of the distal end surface 135L, an end surface 134M having a shape similar to that of the end surface 134L, and an inner circumferential surface 136M having a shape similar to that of the inner circumferential surface 136L.

The inner circumferential surface 136M includes a minimum inner diameter part 137M having a shape similar to that of the minimum inner diameter part 137L, an inner circumferential surface 138M having a shape similar to that of the inner circumferential surface 138L, an inner circumferential surface 154M having a shape similar to that of the inner circumferential surface 154L, an inner circumferential surface 172M having a shape similar to that of the inner circumferential surface 172L, and an inner circumferential surface 174M having a shape similar to that of the inner circumferential surface 174L.

Therefore, the friction member main body part 91M includes a distal end side tapered part 139M having a shape similar to that of the distal end side tapered part 139L, a base end side tapered part 155M having a shape similar to that of the base end side tapered part 155L, a constant diameter part 173M having a shape similar to that of the constant diameter part 173L, a tapered part 175M having a shape similar to that of the tapered part 175L, a second lip part 162M (friction part) having a shape similar to that of the first lip part 161L, and a base part 163M having a shape similar to that of the base part 163L.

The minimum inner diameter parts 137L and 137M have the same diameter, and therefore the first lip part 161L and the second lip part 162M have the same inner diameter. The friction member main body part 91L including the first lip part 161L is made of, for example, a soft plastic material such as Pelprene, and the friction member main body part 91M including the second lip part 162M is made of, for example, a hard plastic material such as nylon. Therefore, the friction member main body part 91L including the first lip part 161L is softer and has a lower rigidity than the friction member main body part 91M including the second lip part 162M.

The friction member 22L having the above-described structure is fixed when the base part 92L is fitted into the intermediate diameter hole portion 55 of the rod guide 20 illustrated in FIG. 2 in a state in which the friction member main body part 91L having the first lip part 161L is disposed on an inner side of the friction member main body part 91M having the second lip part 162M in a cylinder inward and outward direction.

Then, the main shaft part 38 of the piston rod 15 is inserted through the inside of the friction member main body parts 91L and 91M of the friction member 22L with a predetermined fastening allowance. Therefore, the friction member main body parts 91L and 91M of the friction member 22L come into close contact with the main shaft part 38 of the piston rod 15 at the first lip part 161L and the second lip part 162M. The friction member 22L is fixed to the cylinder 19 via the rod guide 20 such that both the first lip part 161L and the second lip part 162M are in sliding contact with the piston rod 15.

In the friction member 22L, rigidity of the first lip part 161L and the second lip part 162M are different, and specifically, a rigidity of the first lip part 161L made of soft plastic is lower than a rigidity of the second lip part 162M made of hard plastic.

The friction member main body part 91L and the friction member main body part 91M are formed of materials that are different in coefficient of dynamic friction and coefficient of static friction. Since the first lip part 161L is included in the friction member main body part 91L and the second lip part 162M is included in the friction member main body part 91M, the second lip part 162M is formed of a material different from that of the first lip part 161L in coefficient of dynamic friction and coefficient of static friction. The first lip part 161L made of soft plastic has both coefficients of static friction and dynamic friction higher than those of the second lip part 162M made of hard plastic.

The friction member 22L of the ninth embodiment described above is configured so that, when the piston rod 15 moves to, for example, an extension side from a state in which it is stopped with respect to the cylinder 19, at the beginning of the movement, both the first lip part 161L and the second lip part 162M are elastically deformed to follow the piston rod 15 without slipping. At this time, both the first lip part 161L and the second lip part 162M apply an elastic force to the piston rod 15. Therefore, during this period, both the first lip part 161L and the second lip part 162M are in a dynamic spring region.

Thereafter, of the first lip part 161L and the second lip part 162M, while the first lip part 161L, in which rigidity is low and both coefficients of static friction and dynamic friction are high, is elastically deformed and follows the piston rod 15 without slipping to continuously apply an elastic force, and the second lip part 162M, in which rigidity is high and both coefficients of static friction and dynamic friction are low, slides with respect to the piston rod 15 to generate a frictional force. Therefore, during this period, the first lip part 161L is in the dynamic spring region, and the second lip part 162M is in a dynamic friction region.

Thereafter, both the first lip part 161L and the second lip part 162M slide with respect to the piston rod 15 to generate a frictional force. Therefore, during this period, the first lip part 161L and the second lip part 162M are both in the dynamic friction region.

The same applies to a compression stroke.

That is, in the friction member 22L, the first lip part 161L and the second lip part 162M each start to slide with respect to relative movement of the cylinder 19 and the piston rod 15 at a timing different from each other and generate an adjustable frictional force.

In the ninth embodiment, the friction member main body part 91L having the first lip part 161L and the friction member main body part 91M having the second lip part 162M of the friction member 22L each start to slide with respect to the relative movement of the cylinder 19 and the piston rod 15 at a timing different from each other to generate a frictional force. Therefore, an acting force of the friction member 22L on the piston rod 15 can be changed smoothly. Therefore, ride comfort of the vehicle can be made satisfactory as in the first embodiment.

In the ninth embodiment, the friction member main body part 91L having the first lip part 161L and the friction member main body part 91M having the second lip part 162M of the friction member 22L have the same shape, but they are respectively formed of materials different in both coefficients of dynamic friction and static friction, and thereby timings at which they start to slide with respect to the piston rod 15 are made different. Therefore, a timing of starting to slide with respect to the piston rod 15 can be made different with a simple structure.

In the ninth embodiment, in the friction member 22L, the friction member main body part 91L having the first lip part 161L and the friction member main body part 91M having the second lip part 162M are separately formed with a space therebetween, and therefore respective characteristics can be easily adjusted individually.

Tenth Embodiment

Next, a tenth embodiment according to the present invention will be described mainly on the basis of FIG. 16, focusing on differences from the ninth embodiment. Further, parts common to those in the ninth embodiment will be denoted by the same terms and the same reference signs.

Figure 16:
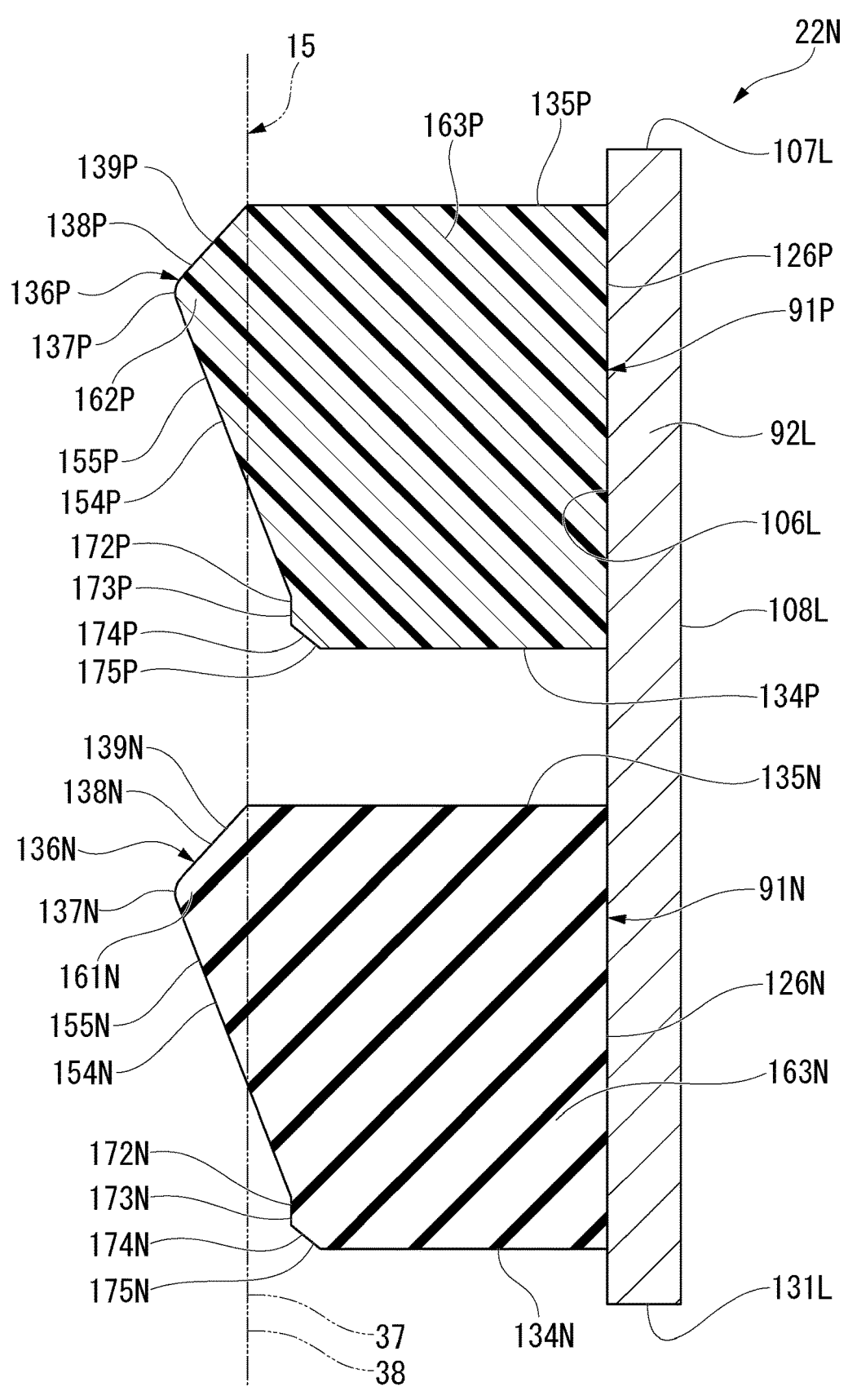
FIG. 16 is a one-side cross-sectional view illustrating a friction member of a shock absorber according to a tenth embodiment of the present invention.

In the tenth embodiment, instead of the friction member 22L of the ninth embodiment, a friction member 22N whose cross section on one side is illustrated in FIG. 16 is provided. Further, also in FIG. 16, the friction member 22N in a natural state before a piston rod 15 is inserted therethrough is illustrated, and an outer circumferential surface 37 of a main shaft part 38 of the piston rod 15 in a case of being inserted is illustrated by a virtual line (two-dot dashed line).

The friction member 22N of the tenth embodiment includes a base part 92L similar to that of the ninth embodiment, a friction member main body part 91N having a shape similar to that of the friction member main body part 91L of the ninth embodiment, and a friction member main body part 91P having a shape similar to that of the friction member main body part 91M of the ninth embodiment. The base part 92L, the friction member main body part 91N, and the friction member main body part 91P are integrated.

The friction member main body part 91N includes an outer circumferential surface 126N having a shape similar to that of the outer circumferential surface 126L and fixed to an inner circumferential surface 106L of the base part 92L, a distal end surface 135N having a shape similar to that of the distal end surface 135L, an end surface 134N having a shape similar to that of the end surface 134L, and an inner circumferential surface 136N having a shape similar to that of the inner circumferential surface 136L.

The inner circumferential surface 136N includes a minimum inner diameter part 137N having a shape similar to that of the minimum inner diameter part 137L, an inner circumferential surface 138N having a shape similar to that of the inner circumferential surface 138L, an inner circumferential surface 154N having a shape similar to that of the inner circumferential surface 154L, an inner circumferential surface 172N having a shape similar to that of the inner circumferential surface 172L, and an inner circumferential surface 174N having a shape similar to that of the inner circumferential surface 174L.

Therefore, the friction member main body part 91N includes a distal end side tapered part 139N having a shape similar to that of the distal end side tapered part 139L, a base end side tapered part 155N having a shape similar to that of the base end side tapered part 155L, a constant diameter part 173N having a shape similar to that of the constant diameter part 173L, a tapered part 175N having a shape similar to that of the tapered part 175L, a first lip part 161N (friction part) having a shape similar to that of the first lip part 161L, and a base part 163N having a shape similar to that of the base part 163L.

The friction member main body part 91P includes an outer circumferential surface 126P having a shape similar to that of the outer circumferential surface 126M and fixed to the inner circumferential surface 106L of the base part 92L, a distal end surface 135P having a shape similar to that of the distal end surface 135M, an end surface 134P having a shape similar to that of the end surface 134M, and an inner circumferential surface 136P having a shape similar to that of the inner circumferential surface 136M.

The inner circumferential surface 136P includes a minimum inner diameter part 137P having a shape similar to that of the minimum inner diameter part 137M, an inner circumferential surface 138P having a shape similar to that of the inner circumferential surface 138M, an inner circumferential surface 154P having a shape similar to that of the inner circumferential surface 154M, an inner circumferential surface 172P having a shape similar to that of the inner circumferential surface 172M, and an inner circumferential surface 174P having a shape similar to that of the inner circumferential surface 174M.

Therefore, the friction member main body part 91P includes a distal end side tapered part 139P having a shape similar to that of the distal end side tapered part 139M, a base end side tapered part 155P having a shape similar to that of the base end side tapered part 155M, a constant diameter part 173P having a shape similar to that of the constant diameter part 173M, a tapered part 175P having a shape similar to that of the tapered part 175M, a second lip part 162P (friction part) having a shape similar to that of the second lip part 162M, and a base part 163P having a shape similar to that of the base part 163M.

The minimum inner diameter parts 137N and 137P have the same diameter, and therefore the first lip part 161N and the second lip part 162P have the same inner diameter. The friction member main body part 91N including the first lip part 161N is made of, for example, an elastic rubber material having good sliding ability such as nitrile rubber or fluoro-rubber, and the friction member main body part 91P including the second lip part 162P is made of, for example, a plastic material such as nylon. Therefore, the friction member main body part 91N including the first lip part 161N has a lower rigidity than the friction member main body part 91P including the second lip part 162P.

The friction member main body part 91N and the friction member main body part 91P are formed of materials that are different in coefficient of dynamic friction and coefficient of static friction. Since the first lip part 161N is included in the friction member main body part 91N and the second lip part 162P is included in the friction member main body part 91P, the second lip part 162P is formed of a material different from that of the first lip part 161N in coefficient of dynamic friction and coefficient of static friction. The first lip part 161N made of a rubber material has both coefficients of dynamic friction and static friction higher than those of the second lip part 162P made of a plastic material.

The friction member 22N having the above-described structure is fixed when the base part 92L is fitted into an intermediate diameter hole portion 55 of a rod guide 20 in a state in which the friction member main body part 91N having the first lip part 161N is disposed on an inner side of the friction member main body part 91P having the second lip part 162P in a cylinder inward and outward direction.

Then, the main shaft part 38 of the piston rod 15 is inserted through the inside of the friction member main body part 91N and the friction member main body part 91P of the friction member 22N with a predetermined fastening allowance. Therefore, the friction member main body parts 91N and the friction member main body part 91P of the friction member 22N come into close contact with the main shaft part 38 of the piston rod 15 at the first lip part 161N and the second lip part 162P. The friction member 22N is fixed to the cylinder 19 via the rod guide 20 such that both the first lip part 161N and the second lip part 162P are in sliding contact with the piston rod 15.

In the friction member 22N, rigidity of the first lip part 161N and the second lip part 162P are different, and specifically, a rigidity of the first lip part 161N made of an elastic rubber material is lower than a rigidity of the second lip part 162P made of a plastic material.

The friction member 22N of the tenth embodiment described above is configured so that, when the piston rod 15 moves to, for example, an extension side from a state in which it is stopped with respect to the cylinder 19, at the beginning of the movement, both the first lip part 161N and the second lip part 162P are elastically deformed to follow the piston rod 15 without slipping. At this time, both the first lip part 161N and the second lip part 162P apply an elastic force to the piston rod 15. Therefore, during this period, both the first lip part 161N and the second lip part 162P are in a dynamic spring region.

Thereafter, of the first lip part 161N and the second lip part 162P, while the first lip part 161N, in which rigidity is low and both coefficients of static friction and dynamic friction are high, is elastically deformed and follows the piston rod 15 without slipping to continuously apply an elastic force, and the second lip part 162P, in which rigidity is high and both coefficients of static friction and dynamic friction are low, slides with respect to the piston rod 15 to generate a frictional force. Therefore, during this period, the first lip part 161N is in the dynamic spring region, and the second lip part 162P is in a dynamic friction region.

Thereafter, both the first lip part 161N and the second lip part 162P slide with respect to the piston rod 15 to generate a frictional force. Therefore, during this period, both the first lip part 161N and the second lip part 162P are in the dynamic friction region.

The same applies to a compression stroke.

That is, in the friction member 22N, the first lip part 161N and the second lip part 162P each start to slide with respect to relative movement of the cylinder 19 and the piston rod 15 at a timing different from each other and generate an adjustable frictional force. Therefore, an acting force of the friction member 22N on the piston rod 15 can be changed smoothly. Therefore, ride comfort of the vehicle can be made satisfactory as in the first embodiment.

In the tenth embodiment, although the friction member main body part 91N having the first lip part 161N and the friction member main body part 91P having the second lip part 162P of the friction member 22N have the same shape, since they are respectively formed of materials different in both coefficients of dynamic friction and static friction and thus timings at which they start to slide with respect to the piston rod 15 are made different, timings of starting to slide with respect to the piston rod 15 can be made different with a simple structure.

In the tenth embodiment, in the friction member 22N, the friction member main body part 91N having the first lip part 161N and the friction member main body part 91P having the second lip part 162P are separately formed with a space therebetween, and therefore respective characteristics can be easily adjusted individually.

Eleventh Embodiment

Next, an eleventh embodiment according to the present invention will be described mainly on the basis of FIGS. 17 and 18, focusing on differences from the first embodiment. Further, parts common to those in the first embodiment will be denoted by the same terms and the same reference signs.

Figure 17:
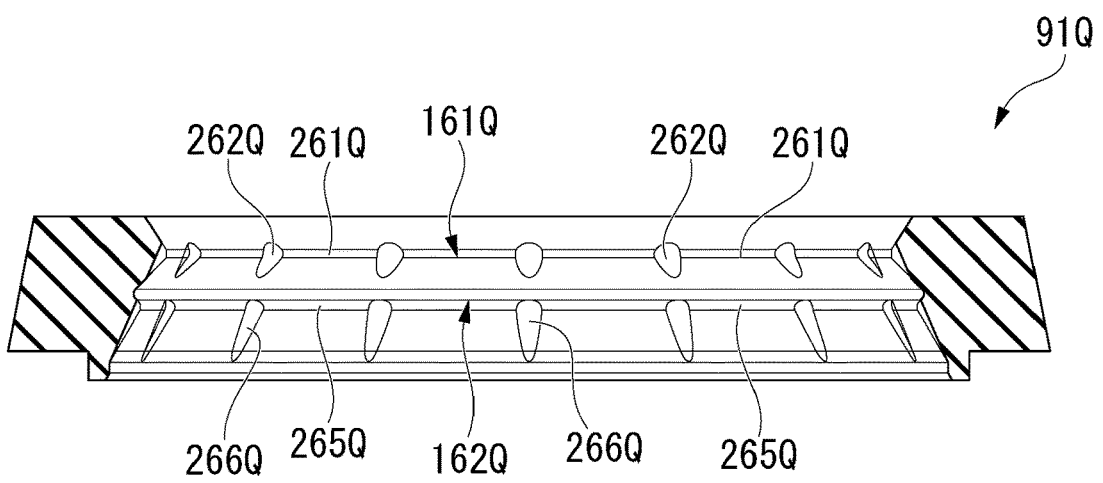
FIG. 17 is a cross-sectional view illustrating a friction member main body part of a shock absorber according to an eleventh embodiment of the present invention.
Figure 18:
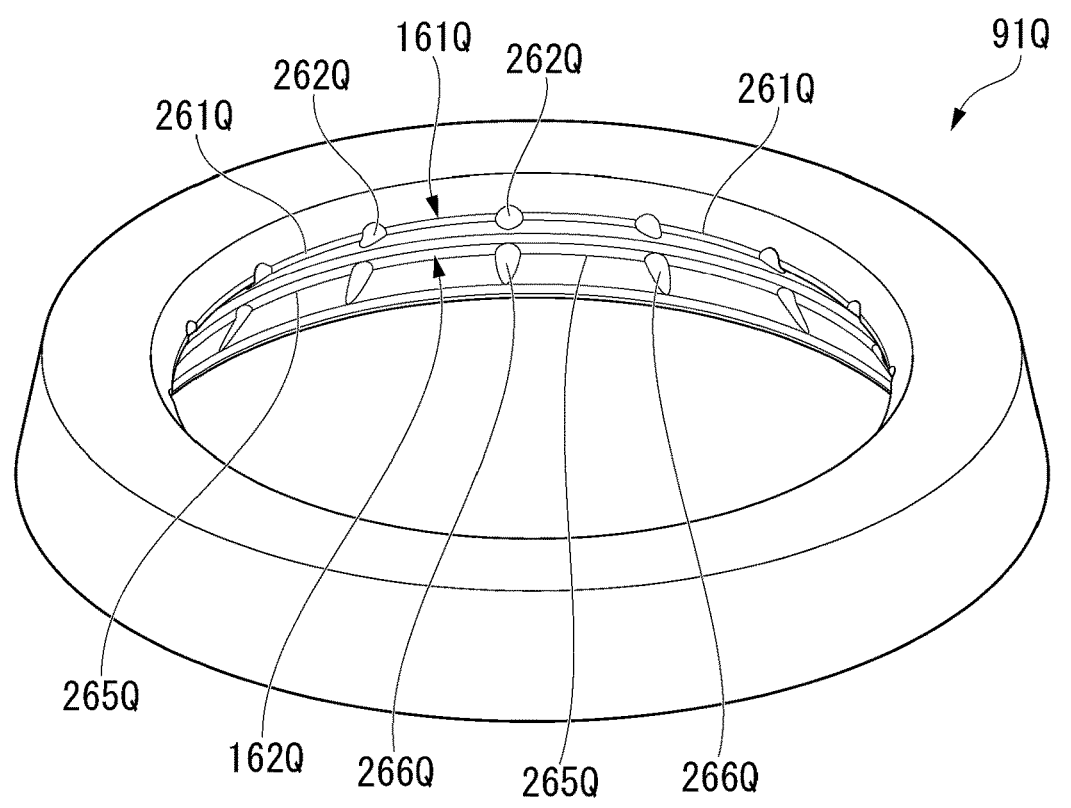
FIG. 18 is a perspective view illustrating the friction member main body part of the shock absorber according to the eleventh embodiment of the present invention.

In the eleventh embodiment, instead of the friction member main body part 91 of the first embodiment, a friction member main body part 91Q illustrated in FIGS. 17 and 18 is provided. The friction member main body part 91Q includes a first lip part 161Q (friction part) partially different from the first lip part 161, and a second lip part 162Q (friction part) partially different from the second lip part 162.

The first lip part 161Q is constituted by a plurality of divided parts 261Q that are divided from the first lip part 161 in a circumferential direction. A groove 262Q for division is provided between the divided parts 261Q adjacent to each other in the circumferential direction of the friction member main body part 91Q. The second lip part 162Q is also constituted by a plurality of divided parts 265Q that are divided from the second lip part 162 in the circumferential direction. A groove 266Q for division is provided between the divided parts 265Q adjacent to each other in the circumferential direction of the friction member main body part 91Q.

With such an eleventh embodiment, the same effects as in the first embodiment can also be achieved.

Twelfth Embodiment

Next, a twelfth embodiment according to the present invention will be described mainly on the basis of FIGS. 19 and 20, focusing on differences from the eleventh embodiment. Further, parts common to those in the eleventh embodiment will be denoted by the same terms and the same reference signs.

Figure 19:
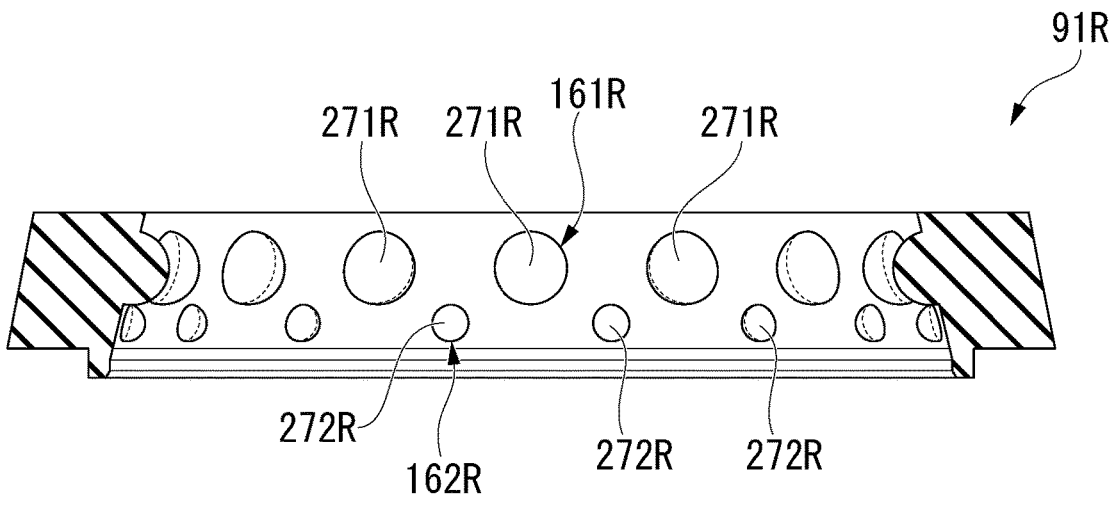
FIG. 19 is a cross-sectional view illustrating a friction member main body part of a shock absorber according to a twelfth embodiment of the present invention.
Figure 20:
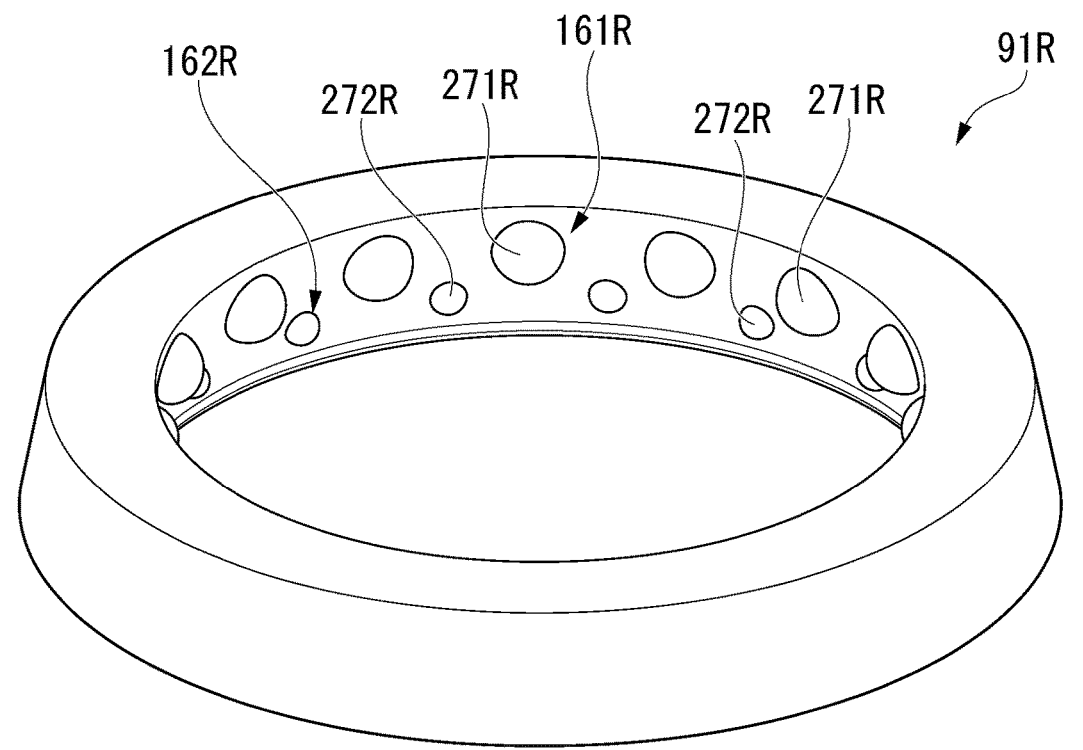
FIG. 20 is a perspective view illustrating the friction member main body part of the shock absorber according to the twelfth embodiment of the present invention.

In the twelfth embodiment, instead of the friction member main body part 91Q of the eleventh embodiment, a friction member main body part 91R illustrated in FIGS. 19 and 20 is provided. The friction member main body part 91R includes a first lip part 161R (friction part) partially different from the first lip part 161Q, and a second lip part 162R (friction part) partially different from the second lip part 162Q.

The first lip part 161R is formed to have a plurality of dimple-shaped protrusions 271R at intervals in a circumferential direction of the friction member main body part 91R, and the second lip part 162R also is formed to have a plurality of dimple-shaped protrusions 272R at intervals in the circumferential direction of the friction member main body part 91R. A minimum diameter of an inscribed circle of the plurality of protrusions 271R in the first lip part 161R is smaller than a minimum diameter of an inscribed circle of the plurality of protrusions 272R in the second lip part 162R.

With such a twelfth embodiment, the same effects as in the eleventh embodiment can also be achieved.

Figure 21:
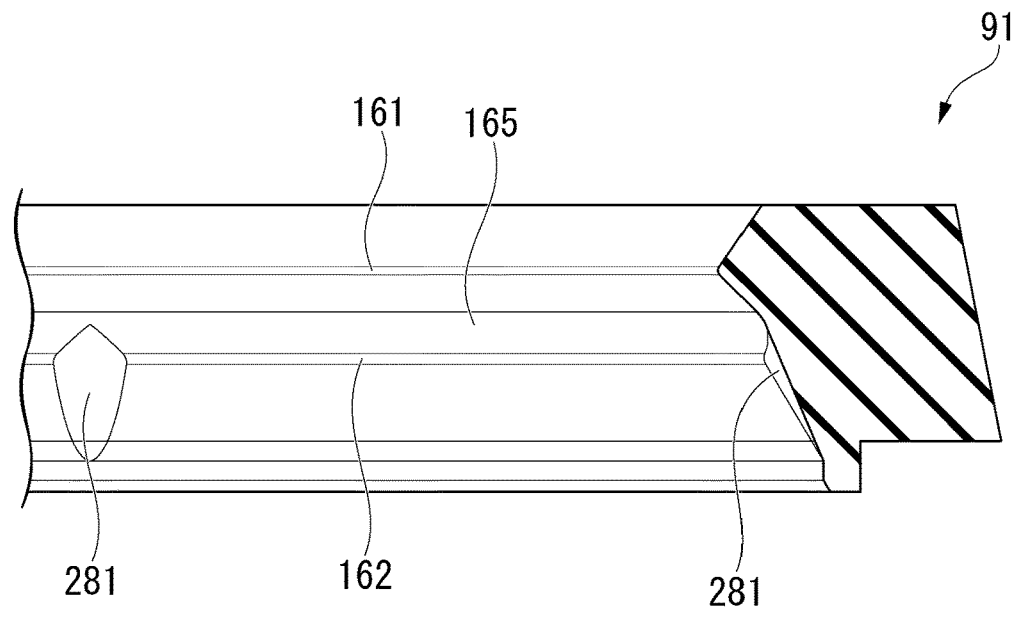
FIG. 21 is a partial cross-sectional view illustrating a modified example of a friction member main body part of the shock absorber according to the first embodiment of the present invention.
Figure 22:
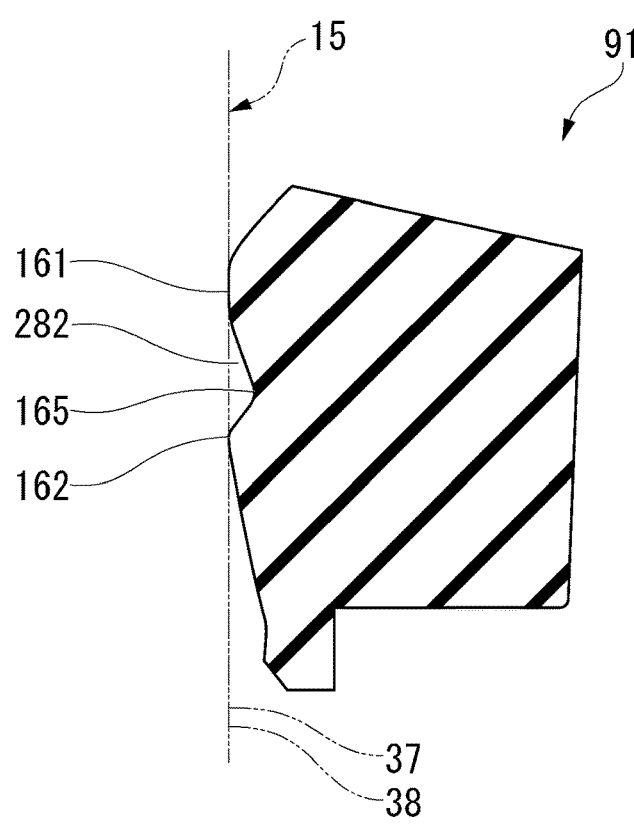
FIG. 22 is a one-side cross-sectional view illustrating the modified example of the friction member main body part of the shock absorber according to the first embodiment of the present invention.

Further, in the first embodiment, a groove 281 as illustrated in FIG. 21 may be provided in the second lip part 162 of the friction member main body part 91. The groove 281 allows a chamber 282 formed between the piston rod 15 and the recessed part 165 when the piston rod 15 is inserted as illustrated in FIG. 22 to constantly communicate with the chamber 96 illustrated in FIG. 2. Thereby, a differential pressure between the chamber 282 in the recessed part 165 and the chamber 96 can be reduced. Alternatively, a groove may be provided in the first lip part 161 so that the chamber 282 in the recessed part 165 formed when the piston rod 15 is inserted constantly communicates with the chamber 85. Thereby, a differential pressure between the chamber 282 in the recessed part 165 and the chamber 85 can be reduced. Alternatively, grooves may be provided in both the first lip part 161 and the second lip part 162 so that the chamber 282 in the recessed part 165 constantly communicates with the chambers 85 and 96 when the piston rod 15 is inserted. Thereby, a differential pressure between the chamber 282 in the recessed part 165 and the chambers 85 and 96 can be reduced.

Similarly, in the second embodiment illustrated in FIG. 8, a groove that allows a chamber in the recessed part 215A to constantly communicate with the chamber 85 when the piston rod 15 is inserted may be provided in the first lip part 161A. Alternatively, a groove that allows a chamber in the recessed part 216A to constantly communicate with the chamber 96 when the piston rod 15 is inserted may be provided in the second lip part 162A. Alternatively, both the groove of the first lip part 161A and the groove of the second lip part 162A may be provided. Alternatively, grooves that allow the chamber in the recessed part 215A and the chamber in the recessed part 216A to constantly communicate with the chamber 96 when the piston rod 15 is inserted may be provided in the second lip part 162A and the third lip part 211A. Alternatively, grooves that allow the chamber in the recessed part 215A and the chamber in the recessed part 216A to constantly communicate with the chamber 85 when the piston rod 15 is inserted may be provided in the first lip part 161A and the third lip part 211A. Alternatively, grooves may be provided in the first lip part 161A, the second lip part 162A, and the third lip part 211A to allow the chamber in the recessed part 215A and the chamber in the recessed part 216A to constantly communicate with the chambers 85 and 96 when the piston rod 15 is inserted.

Similarly, in the third embodiment illustrated in FIG. 9, a groove that allows a chamber in the recessed part 165B to constantly communicate with the chamber 96 when the piston rod 15 is inserted may be provided in the first lip part 161B. Alternatively, a groove that allows the chamber in the recessed part 165B to constantly communicate with the chamber 85 when the piston rod 15 is inserted may be provided in the second lip part 162B. Alternatively, grooves may be provided in both the first lip part 161B and the second lip part 162B to allow the chamber in the recessed part 165B to constantly communicate with the chambers 85 and 96 when the piston rod 15 is inserted.

Similarly, in the fourth embodiment illustrated in FIG. 10, a groove that allows a chamber between the friction member main body parts 91C and 91D to constantly communicate with the chamber 96 when the piston rod 15 is inserted may be provided in the first lip part 161C. Alternatively, a groove that allows the chamber between the friction member main body parts 91C and 91D to constantly communicate with the chamber 85 when the piston rod 15 is inserted may be provided in the second lip part 162D. Alternatively, grooves may be provided in both the first lip part 161C and the second lip part 162D to allow the chamber between the friction member main body parts 91C and 91D to constantly communicate with the chambers 85 and 96 when the piston rod 15 is inserted.

Similarly, in the fifth embodiment illustrated in FIG. 11, a groove that allows a chamber in the recessed part 165E to constantly communicate with the chamber 96 when the piston rod 15 is inserted may be provided in the second lip part 162F. Alternatively, a groove that allows the chamber in the recessed part 165E to constantly communicate with the chamber 85 when the piston rod 15 is inserted may be provided in the first lip part 161E. Alternatively, grooves may be provided in both the first lip part 161E and the second lip part 162F to allow the chamber in the recessed part 165E to constantly communicate with the chambers 85 and 96 when the piston rod 15 is inserted.

Similarly, in the sixth embodiment illustrated in FIG. 12, a groove that allows a chamber in the recessed part 165G to constantly communicate with the chamber 96 when the piston rod 15 is inserted may be provided in the second lip part 162G. Alternatively, a groove that allows the chamber in the recessed part 165G to constantly communicate with the chamber 85 when the piston rod 15 is inserted may be provided in the first lip part 161G. Alternatively, grooves may be provided in both the first lip part 161G and the second lip part 162G to allow the chamber in the recessed part 165G to constantly communicate with the chambers 85 and 96 when the piston rod 15 is inserted.

Similarly, in the seventh embodiment illustrated in FIG. 13, a groove that allows a chamber in the recessed part 165H to constantly communicate with the chamber 96 when the piston rod 15 is inserted may be provided in the second lip part 162H. Alternatively, a groove that allows the chamber in the recessed part 165H to constantly communicate with the chamber 85 when the piston rod 15 is inserted may be provided in the first lip part 161G. Alternatively, grooves may be provided in both the first lip part 161G and the second lip part 162H to allow the chamber in the recessed part 165H to constantly communicate with the chambers 85 and 96 when the piston rod 15 is inserted.

Figure 14:
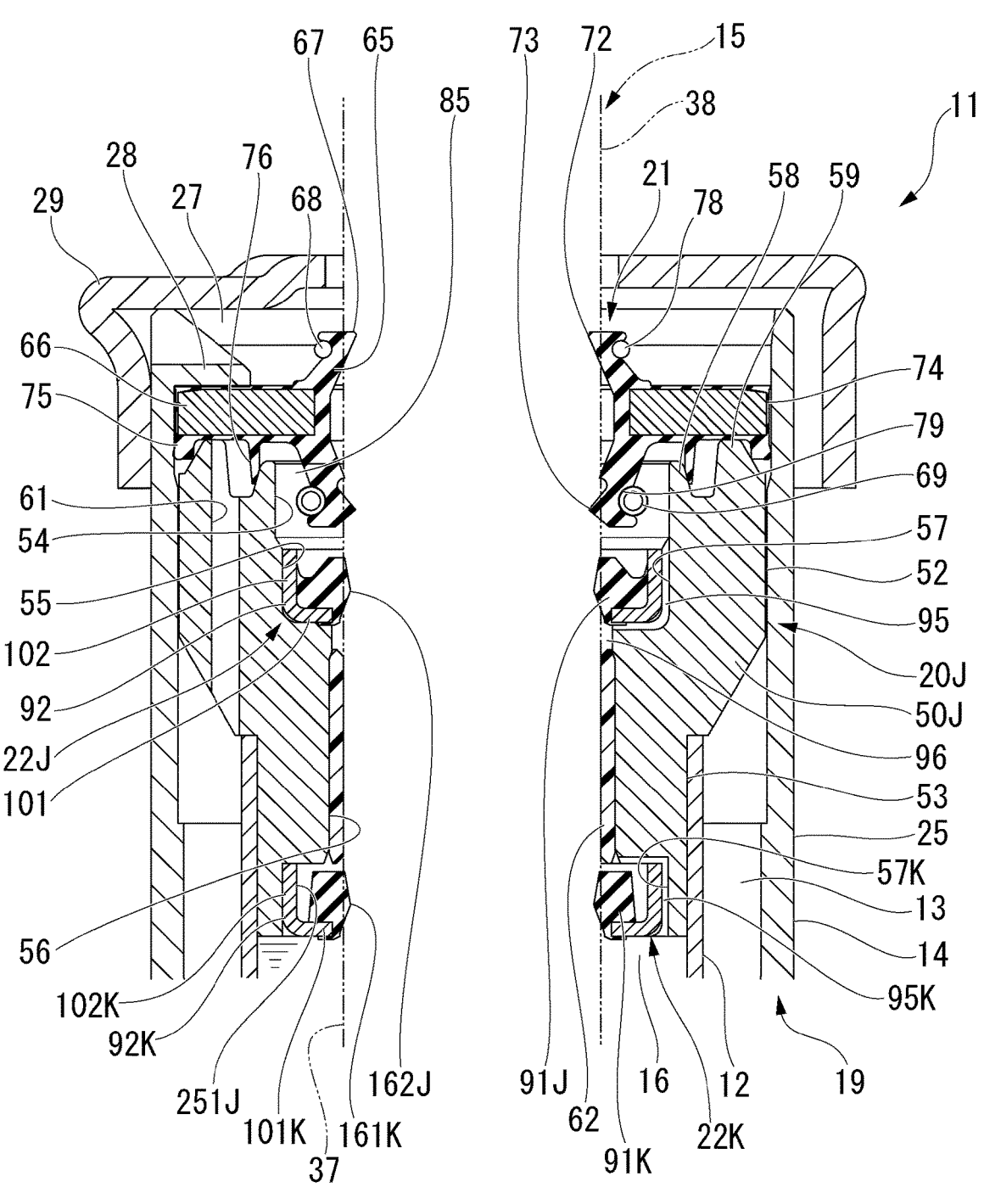
FIG. 14 is a cross-sectional view illustrating a vicinity of a rod guide of a shock absorber according to an eighth embodiment of the present invention.

Similarly, in the eighth embodiment illustrated in FIG. 14, a groove that allows a chamber between the friction members 22K and 22J to constantly communicate with the chamber 16 when the piston rod 15 is inserted may be provided in the first lip part 161K. Alternatively, a groove that allows the chamber between the friction members 22K and 22J to constantly communicate with the chamber 85 when the piston rod 15 is inserted may be provided in the second lip part 162J. Alternatively, grooves may be provided in both the first lip part 161K and the second lip part 162J to allow the chamber between the friction members 22K and 22J to constantly communicate with the chambers 16 and 85 when the piston rod 15 is inserted.

Figure 23:
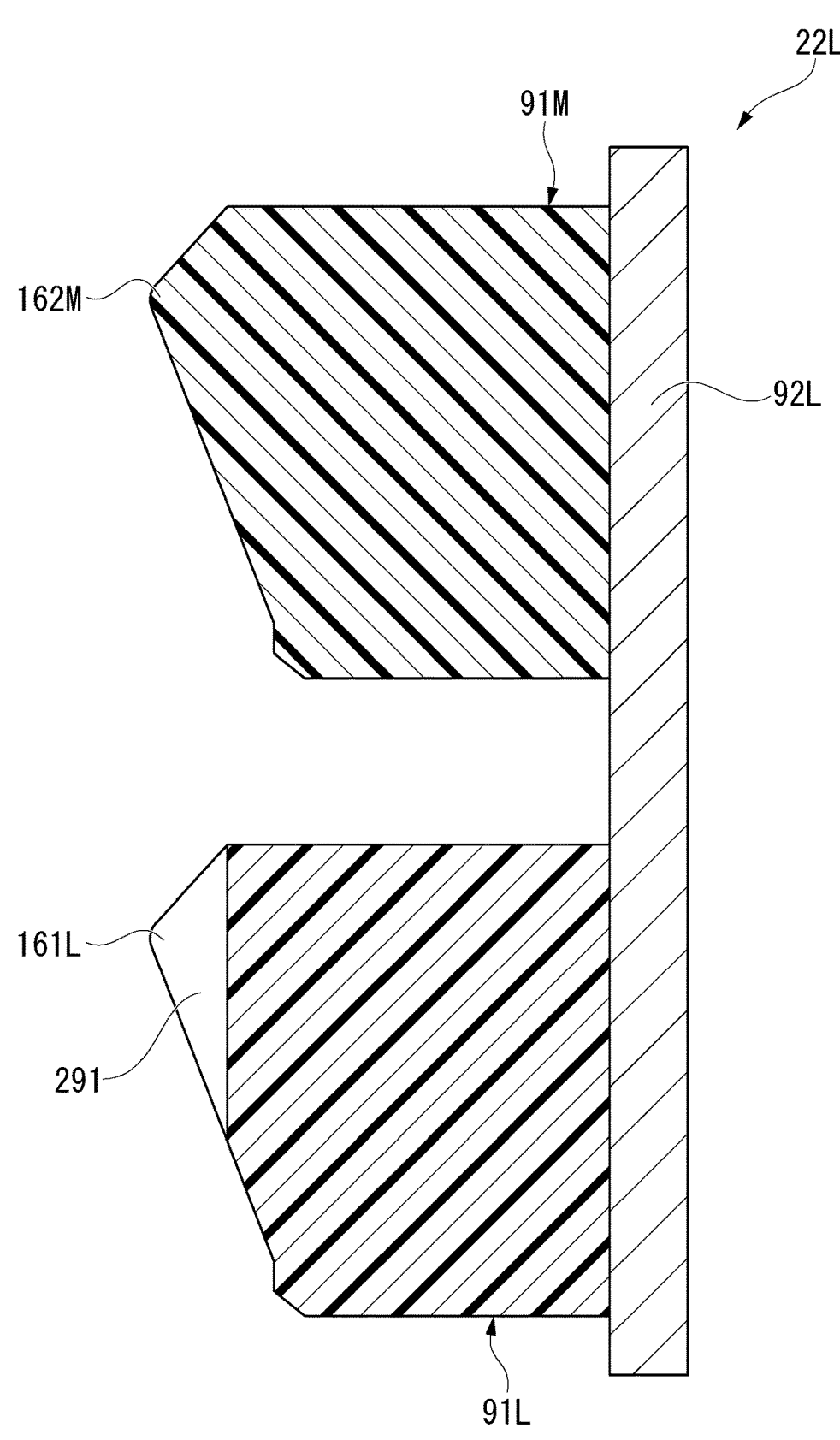
FIG. 23 is a one-side cross-sectional view illustrating a modified example of a friction member main body part of the shock absorber according to the ninth embodiment of the present invention.
Figure 24:
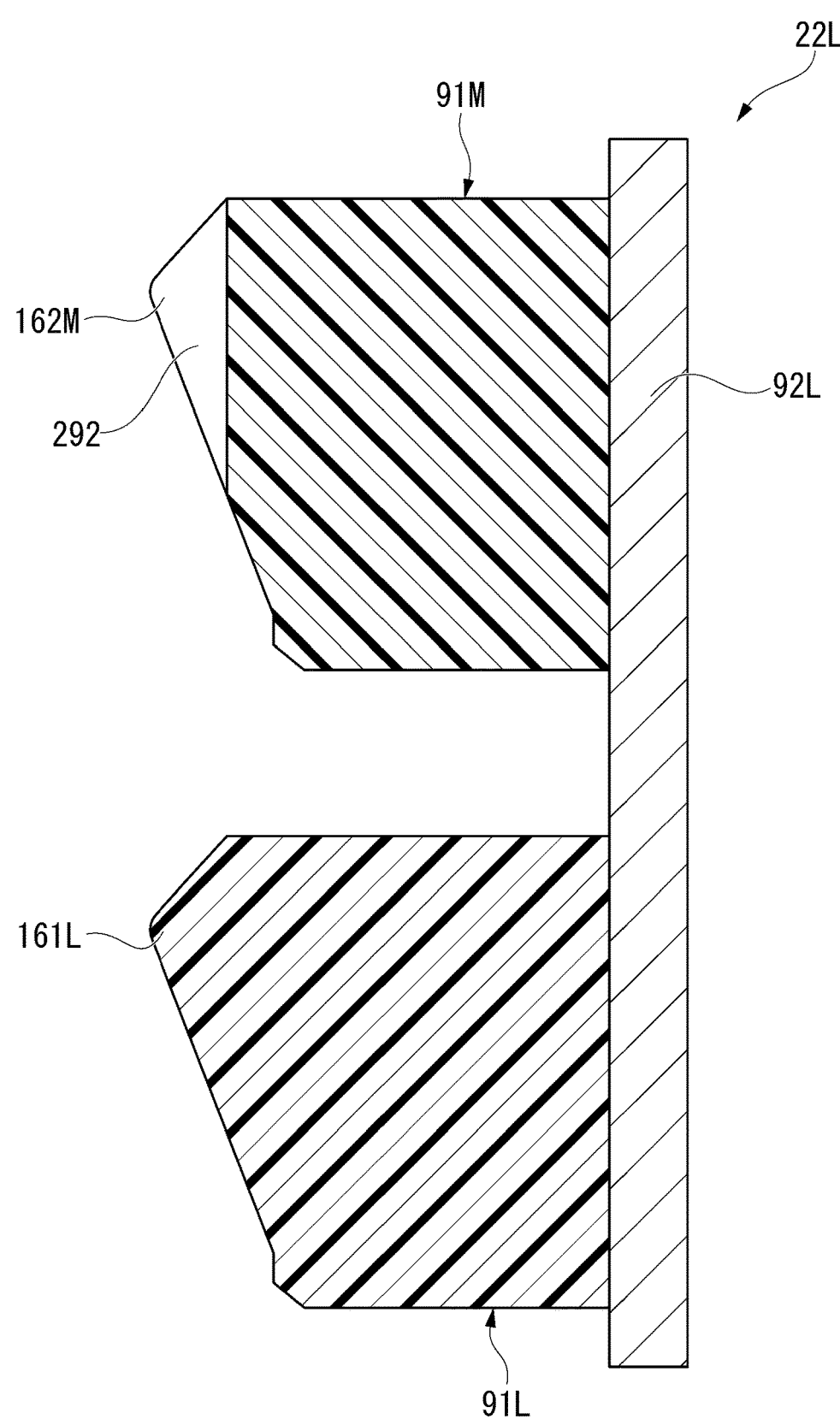
FIG. 24 is a one-side cross-sectional view illustrating another modified example of the friction member main body part of the shock absorber according to the ninth embodiment of the present invention.
Figure 25:
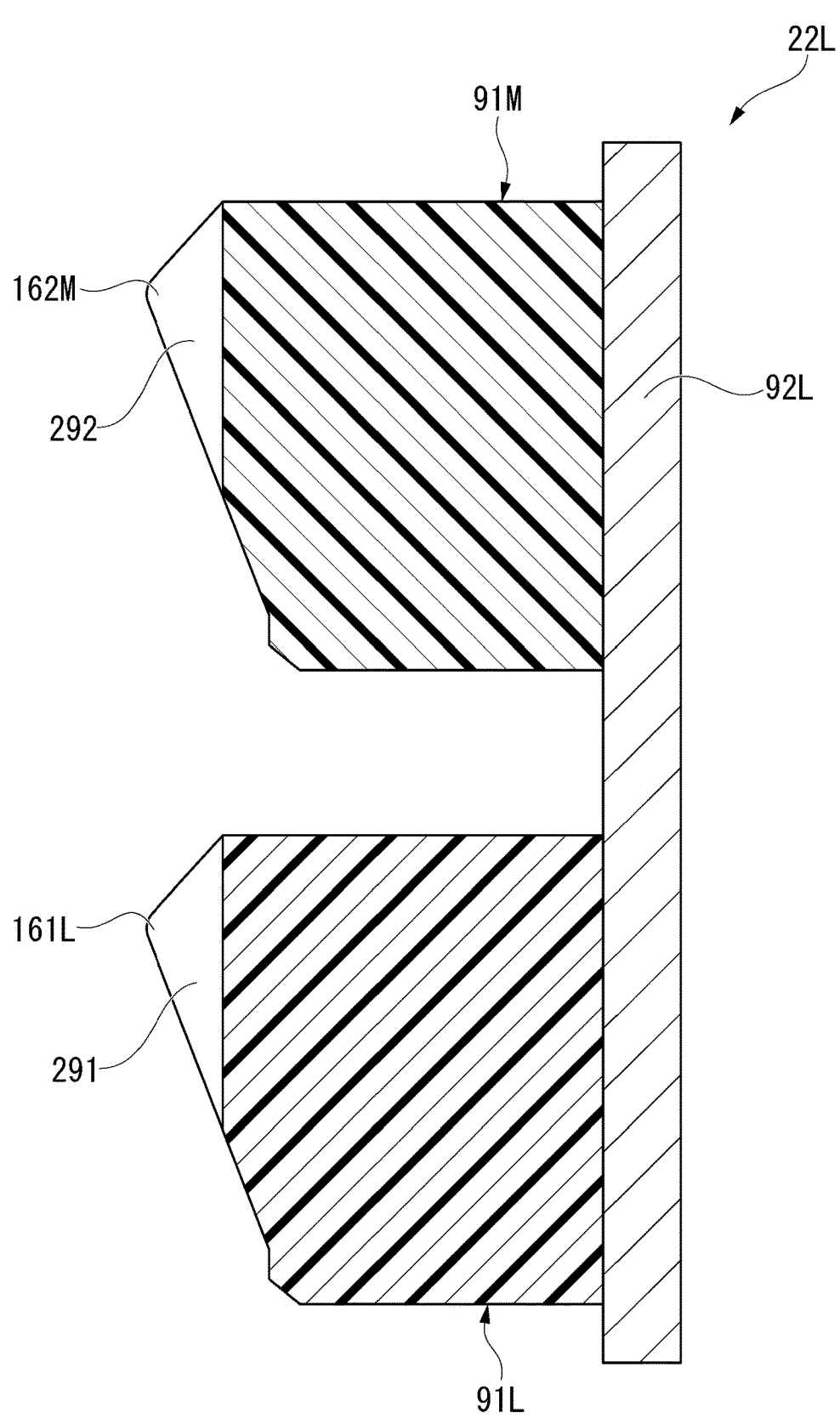
FIG. 25 is a one-side cross-sectional view illustrating still another modified example of the friction member main body part of the shock absorber according to the ninth embodiment of the present invention.

Similarly, in the ninth embodiment illustrated in FIG. 15, a groove 291 that allows a chamber between the friction member main body parts 91L and 91M to constantly communicate with the chamber 96 when the piston rod 15 is inserted may be provided in the first lip part 161L as illustrated in FIG. 23. Alternatively, as illustrated in FIG. 24, a groove 292 that allows the chamber between the friction member main body parts 91L and 91M to constantly communicate with the chamber 85 when the piston rod 15 is inserted may be provided in the second lip part 162M. Alternatively, as illustrated in FIG. 25, the groove 291 may be provided in the first lip part 161L and the groove 292 may be provided in the second lip part 162M to allow the chamber between the friction member main body parts 91L and 91M to constantly communicate with the chambers 85 and 96 when the piston rod 15 is inserted.

Similarly, in the tenth embodiment illustrated in FIG. 16, a groove that allows a chamber between the friction member main body part 91N and the friction member main body part 91P to constantly communicate with the chamber 96 when the piston rod 15 is inserted may be provided in the first lip part 161N. Alternatively, a groove that allows the chamber between the friction member main body part 91N and the friction member main body part 91P to constantly communicate with the chamber 85 when the piston rod 15 is inserted may be provided in the second lip part 162P. Alternatively, grooves may be provided in both the first lip part 161N and the second lip part 162P to allow the chamber between the friction member main body part 91N and the friction member main body part 91P to constantly communicate with the chambers 85 and 96 when the piston rod 15 is inserted.

In the above-described embodiments, a case in which the friction members 22, 22A, 22B, 22C, 22E, 22G, 22H, 22J, 22K, 22L, and 22N are each fixed to the cylinder 19, which is one of the piston rod 15 and the cylinder 19 moving relative to each other, to be in sliding contact with the piston rod 15, which is the other thereof, has been described as an example, but as illustrated in FIG. 40 of Japanese Patent No. 3702416, the present invention can also be applied to a case in which a friction member is provided to a piston rod to be in sliding contact with a cylinder.

Any one of the first lip parts 161, 161A, 161B, 161C, 161E, and 161G may be fixed to the cylinder to be in sliding contact with the piston rod, and one of the second lip parts 162, 162A, 162B, 162D, 162F, 162G, and 162H corresponding thereto may be fixed to the piston rod to be in sliding contact with the cylinder, or vice versa.

Also, in the above-described embodiments, a dual-tube type hydraulic shock absorber has been illustrated as a liquid-pressure shock absorber, but the present invention can also be applied to a single-tube type hydraulic shock absorber, a liquid-pressure shock absorber such as a hydraulic active suspension, and the like.

A first aspect of the above-described embodiment includes a cylinder, a piston rod inserted into the inside of the cylinder to be movable to generate a damping force at the time of moving in the cylinder and having one end which extends to the outside of the cylinder, a seal member fixed to the cylinder to be in sliding contact with the piston rod, and a friction member generating a frictional force with respect to relative movement between the cylinder and the piston rod, in which the friction member has a first friction part fixed to one of the cylinder and the piston rod to be in sliding contact with the other of the cylinder and the piston rod, and a second friction part fixed to one of the cylinder and the piston rod to be in sliding contact with the other of the cylinder and the piston rod and configured to start to slide with respect to relative movement of the cylinder and the piston rod at a timing different from that of the first friction part and generate an adjustable frictional force. Thereby, an acting force of the friction member can be changed smoothly.

According to a second aspect, in the first aspect, the friction member is fixed to the cylinder so that the first friction part and the second friction part are in sliding contact with the piston rod, and inner diameters of the first friction part and the second friction part in a state of not being in sliding contact with the piston rod are different from each other.

A third aspect includes a cylinder having a working fluid therein, a piston provided inside the cylinder to be movable and configured to partition the inside of the cylinder into two chambers, a damping valve provided in the piston, a piston rod connected to the piston and having one end which extends to the outside of the cylinder, a seal member fixed to the cylinder to be in contact with the piston rod, and a friction member fixed to the cylinder to be in contact with the piston rod, in which the friction member has a first friction part formed of an elastic body and in contact with the piston rod, and a second friction part formed of an elastic body made of the same material as the first friction part and having a portion in contact with the piston rod that is different in shape from that of the first friction part. Thereby, an acting force of the friction member can be changed smoothly.

A fourth aspect includes a first member connected to a wheel side, a second member connected to a vehicle body side to be movable relative to the first member and configured to generate a damping force at the time of moving with respect to the first member, and a friction member generating a frictional force with respect to relative movement between the first member and the second member, in which the friction member has a first friction part fixed to one of the first member and the second member to be in contact with the other of the first member and the second member, and a second friction part formed of a material different from that the first friction part in coefficient of dynamic friction and coefficient of static friction and fixed to one of the first member and the second member to be in contact with the other of the first member and the second member. Thereby, an acting force of the friction member can be changed smoothly.

INDUSTRIAL APPLICABILITY

According to the above-described aspects of the present invention, an acting force of the friction member can be changed smoothly. Therefore, industrial applicability is high.

REFERENCE SIGNS LIST

11 Shock absorber
15 Piston rod 16, 17 Chamber
18 Piston
19 Cylinder
21 Seal member
22, 22A, 22B, 22C, 22E, 22G, 22H, 22J, 22K, 22L, 22N Friction member
41, 42 Disc valve (damping valve)
161, 161A, 161B, 161C, 161E, 161G, 161K, 161L, 161N, 161Q, 161R First lip part (friction part)
162, 162A, 162B, 162D, 162F, 162G, 162H, 162J, 162M, 162P, 162Q, 162R Second lip part (friction part)

The invention claimed is:

1. A shock absorber comprising:
a cylinder;
a piston rod inserted into an inside of the cylinder to be movable to generate a damping force at a time of moving in the cylinder and having one end which extends to an outside of the cylinder;
a seal member fixed to the cylinder to be in sliding contact with the piston rod; and
a friction member generating a frictional force with respect to a relative movement between the cylinder and the piston rod,
wherein the friction member includes:
a first friction part fixed to one of the cylinder and the piston rod to be constantly in sliding contact with another of the cylinder and the piston rod; and
a second friction part fixed to one of the cylinder and the piston rod to be constantly in sliding contact with another of the cylinder and the piston rod and configured to start to slide with respect to a relative movement of the cylinder and the piston rod at a timing different from that of the first friction part and has a higher rigidity than the first friction part, and
wherein the friction member is a unitary member.

2. The shock absorber according to claim 1,
wherein the friction member is fixed to the cylinder so that the first friction part and the second friction part are in sliding contact with the piston rod, and
wherein inner diameters of the first friction part and the second friction part in a state of not being in sliding contact with the piston rod are different from each other.

3. The shock absorber according to claim 1,
wherein, in an extension direction of the piston rod, the first friction part is disposed closer to the one end of the piston rod which extends to an outside of the cylinder than the second friction part.

4. A shock absorber comprising:
a first member connected to a wheel side;
a second member connected to a vehicle body side to be movable relative to the first member and configured to generate a damping force at a time of moving with respect to the first member;
a seal member provided to the first member; and
a friction member generating a frictional force with respect to a relative movement between the first member and the second member,
wherein the friction member includes:
a first friction part fixed to one of the first member and the second member to be constantly in contact with another of the first member and the second member; and
a second friction part, formed of a material different from that of the first friction part such that a coefficient of dynamic friction and a coefficient of static friction of the material of the second friction part is different than a material of the first friction part, and fixed to one of the first member and the second member to be constantly in contact with another of the first member and the second member.

5. The shock absorber according to claim 4, wherein the friction member is a unitary member.

6. The shock absorber according to claim 4, wherein, in an extension direction of the second member, the first friction part is disposed closer to an end of the second member which extends to an outside of the first member than the second friction part.

* * * * *